US012780563B2

(12) United States Patent
Luecke et al.

(10) Patent No.: US 12,780,563 B2
(45) Date of Patent: Nov. 3, 2026

(54) BUFFER DEVICE

(71) Applicant: Krones AG, Neutraubling (DE)

(72) Inventors: Jens Luecke, Flensburg (DE); Christian Depner, Silberstedt (DE); Niels Clausen, Dollerup (DE)

(73) Assignee: Krones AG, Neutraubling (DE)

( * ) Notice: Subject to any disclaimer, the term of this patent is extended or adjusted under 35 U.S.C. 154(b) by 245 days.

(21) Appl. No.: 18/712,629

(22) PCT Filed: Nov. 17, 2022

(86) PCT No.: PCT/EP2022/082179

§ 371 (c)(1),
(2) Date: May 22, 2024

(87) PCT Pub. No.: WO2023/088989

PCT Pub. Date: May 25, 2023

(65) Prior Publication Data

US 2024/0417188 A1 Dec. 19, 2024

(30) Foreign Application Priority Data

Nov. 22, 2021 (DE) ..................... 10 2021 130 465.2

(51) Int. Cl.
*B65G 47/51* (2006.01)

(52) U.S. Cl.
CPC ................................ *B65G 47/5118* (2013.01)

(58) Field of Classification Search
CPC ............ B65G 47/5118; B65G 47/5113; B65G 47/682; B65G 47/5145; B65G 47/5104;
(Continued)

(56) References Cited

U.S. PATENT DOCUMENTS 2,763,359 A * 9/1956 Rose .................... B65G 47/684 198/417
3,040,870 A * 6/1962 Carter ................ B65G 47/5113 198/347.2
(Continued)

FOREIGN PATENT DOCUMENTS

DE 3715577 A1 11/1988
DE 4434176 A1 3/1996
(Continued)

OTHER PUBLICATIONS

International Search Report and the Written Opinion of the International Searching Authority dated Jun. 16, 2023, in connection with International Application No. PCT/EP2022/082179, 23 pages.
(Continued)

*Primary Examiner* — William R Harp

(57) ABSTRACT

The invention relates to a buffer device comprising a container feed device, a buffer which is arranged downstream of the container feed device, and a container discharge device which is arranged downstream of the buffer. In order to feed containers to the buffer, the container feed device is designed to transport containers in a first direction by means of first conveyor belts. The buffer comprises a drivable buffer belt or multiple drivable buffer belts which are parallel to one another and each of which is designed to transport containers in a second direction, said second direction running transversely to the first direction. The container discharge device is designed to discharge and separate containers from the buffer in the first direction or in a third direction which is opposite the first direction.

23 Claims, 44 Drawing Sheets

(58) Field of Classification Search

CPC .. B65G 47/5109; B65G 47/51; B65G 47/763; B65G 47/684; B65G 47/261; B65G 47/268

See application file for complete search history.

(56) References Cited

U.S. PATENT DOCUMENTS

| | | | | |
|---|---|---|---|---|
| 3,104,753 A | | 9/1963 | Osborne | |
| 3,604,551 A | | 9/1971 | Fink | |
| 4,054,199 A | * | 10/1977 | Polderman | B65B 35/54 198/452 |
| 4,361,759 A | * | 11/1982 | King | B65G 47/682 250/223 R |
| 4,401,207 A | | 8/1983 | Garvey | |
| 6,959,803 B1 | * | 11/2005 | Layne | B65G 17/08 198/600 |
| 7,198,147 B2 | | 4/2007 | Petrovic | |
| 7,222,718 B2 | * | 5/2007 | Tarlton | B65G 47/684 198/452 |
| 9,038,808 B2 | * | 5/2015 | Seger | B65G 47/51 198/347.4 |
| 9,845,201 B1 | | 12/2017 | Trinh | |
| 2022/0177236 A1 | | 6/2022 | Schuesslburner et al. | |

FOREIGN PATENT DOCUMENTS

| | | | |
|---|---|---|---|
| DE | 60308498 | T2 | 6/2007 |
| DE | 202014105593 | U1 | 2/2016 |
| DE | 102015202660 | A1 | 8/2016 |
| DE | 102019204536 | A1 | 10/2020 |
| EP | 2161226 | A1 | 3/2010 |
| EP | 3495291 | A1 | 6/2019 |
| GB | 623482 | A | 5/1949 |
| GB | 919770 | A | 2/1963 |

OTHER PUBLICATIONS

Search Report dated Oct. 25, 2023, in connection with German Application No. 10 2021 130 465.2, 12 pages.

* cited by examiner

BUFFER DEVICE

CROSS-REFERENCE TO RELATED APPLICATIONS

This application is a 371 National Stage of International Application No. PCT/EP2022/082179, filed Nov. 17, 2022, which claims priority to German Patent Application No. 10 2021 130 465.2, filed Nov. 22, 2021, the disclosures of which are incorporated herein by reference.

TECHNICAL FIELD

The invention relates to a buffer apparatus.

BACKGROUND

It is known from the field of filling technology that products filled into containers in a system with a filler must be pasteurized, for example in a pasteurizer. Other processes, such as inspecting the containers in an inspection machine and drying the containers in a dry section, can follow the pasteurization process. In order to be able to take account of any errors that may occur in these machines-filler, pasteurizer, inspection machine, dry section-a buffer can be provided between the filler and the pasteurizer, between the pasteurizer and inspection machine and between the inspection machine and the dry section. The buffers can each be designed to buffer the containers for a period of up to 60 seconds. Using these multiple buffers, possible errors in the individual machines can be rectified without having to stop the entire production line.

The nominal line output in such a system can correspond to the nominal output of the pasteurizer. The filler upstream of the pasteurizer can be oversized by 10% to 20%, for example, in order to be able to refill the buffer between the filler and the pasteurizer after an error in the filler. The machines downstream of the pasteurizer can be oversized by 20%, for example, in order to be able to maintain high line efficiency and to be able to reduce the number of containers accumulated on the respective buffer after an error, for example.

A large amount of space is required to move the buffers in mass transport. In addition, the buffer between the filler and the pasteurizer, for example, is only used to buffer containers in the event of errors in the filler. It is not intended to use the buffer between the filler and the pasteurizer for buffering in the event of errors in the pasteurizer and/or the inspection machine and/or the dry section.

DE 44 34 176 A1 discloses a method for an output-based supply of machines in container treatment systems, so that otherwise unavoidable machine stops within such a container treatment system can be avoided or reduced. The method provides that, depending on the throughput rate or the degree of filling of the conveyors and/or machines upstream and downstream of the cleaning machine, the filling state of the cleaning machine can be adjusted by changing the number of containers to be cleaned. If there is a container shortage in the system, the downstream machines can continue to operate without any problems as a result of the reserve in the cleaning machine, without having to stop prematurely.

The task of the invention is to provide a buffer apparatus that can be operated in a space-saving manner and in which the forces acting on the containers can be reduced.

SUMMARY

This object is achieved by the buffer apparatus. Further features of the invention are disclosed.

The buffer apparatus comprises a container feed apparatus, a buffer downstream of the container feed apparatus and a container discharge apparatus downstream of the buffer. The container feeding apparatus for feeding containers to the buffer is designed to transport containers in a first direction by means of first conveyor belts. The buffer comprises a drivable buffer belt or a plurality of drivable buffer belts arranged in parallel or in series, which is/are each designed to transport containers in a second direction, the second direction running transversely to the first direction. The container discharge apparatus is for discharging and separating containers from the buffer in the first direction or in a third direction opposite to the first direction.

The container discharge apparatus can be located on an opposite side to the container feed apparatus. The container discharge apparatus can work in the same or opposite direction as the container feed apparatus.

The drivable buffer belt can be designed or the several drivable buffer belts arranged in parallel can each be designed to be drivable in the second direction or to stand still. It may be provided that it is not possible to drive the drivable buffer belt or the several drivable buffer belts arranged in parallel in a direction opposite to the second direction. Containers cannot be transported in a direction that is opposite to the second direction.

The drivable buffer belt can be further designed or the several drivable buffer belts arranged in parallel can each be further designed to transport containers in a fourth direction, wherein the second and the fourth direction can be opposite to each other and the fourth direction can run transversely to the first direction.

The buffer belt or the buffer belts can each be driven at a speed of 0 m/min to 20 m/min, for example in the second direction or in the fourth direction.

The terms "first" and "second" are used here and hereafter only to distinguish between identical terms and have no further limiting meaning.

A compact and space-saving design of the buffer apparatus is possible by feeding separated containers by means of the container feed apparatus, which transports containers in the first direction transversely to the buffer and thus feeds the containers to the buffer, and by removing and separating containers from the buffer by means of the container discharge apparatus, which removes and separates containers in the first or third direction transversely to the buffer.

At least one transition area can be arranged between the container feed apparatus and the buffer, wherein a length of the transition area can be shorter than a length of the buffer. It is also conceivable that the length of the transition area could be greater than the length of the buffer. For example, the transition area can be designed as a single drivable belt that can transport containers in the second direction or in the third direction. Or, for example, the transition area can comprise the same number of drivable belts as the buffer, wherein the drivable belts can be designed to transport containers in the second or third direction. The transition area can also be designed in such a way that it can only transport containers in the second direction, but not in the third direction; the transition area can also be stationary. The transition area can be designed to be driven only in the second direction.

The transition area can serve as a buffer feed, so that containers that can be fed by the container feed apparatus first enter the transition area and only then the buffer, for example onto the one or more buffer belts.

The buffer belt or buffer belts can be driven at a speed of −20 m/min to 60 m/min (m/min corresponds to meters per minute), for example −10 m/min to 30 m/min or for example −5 m/min to 15 m/min. For example, if there are several drivable buffer belts arranged in parallel, a separate drive can be provided for each of the buffer belts or, for example, a common drive can be provided for the buffer belts. With a separate drive for each of the buffer belts, the buffer belts can have the same or different speeds. With a common drive, the buffer belts each had the same speed. The buffer belts can also be driven together, but not at the same speed. For this end, individual sprockets of the buffer belts are different sizes and have different speeds due to a different transmission ratio.

The specified limit values of the speed ranges may be included. A speed with a positive value can correspond to a drive in which containers can be transported in the second direction, for example by the drivable buffer belt or one or more or all of the several buffer belts arranged in parallel. A speed of 0 m/min can correspond to a standstill of the drivable buffer belt or one or more or all of the several buffer belts arranged in parallel. A speed with a negative value can correspond to a drive in which containers can be transported in the third direction, for example by the drivable buffer belt or one or more or all of the several buffer belts arranged in parallel.

One length of the buffer belt or buffer belts can be dimensioned such that, in buffer operation, buffering of containers is possible on the buffer belt or belts for a period of from 0 to 30 minutes, 0 to 20 minutes, 0 to 10 minutes, 0.15 to 15 minutes, or for example 0.1 to 10 minutes or for example 0.1 to 5 minutes.

To determine the length, for example, a speed of the buffer belt, generally an average speed, during the buffer operation can be taken into account.

The buffer device may further comprise a control device for the buffer, which may be designed to execute a method for controlling the buffer.

The extraction nozzle can further be designed after the occurrence of a fault downstream from the buffer, requiring buffering of containers on the buffer belt or belts:

switching a normal operation of the buffer to a buffer operation of the buffer, wherein the switching comprises:

maintaining a first speed of the main conveyor belt in the first direction, wherein the first speed has a first value, and simultaneously decelerating the buffer belt from a second speed at a second value in the second direction to a third speed at a third value in the second direction.

or simultaneously decelerating the buffer belts from a second speed at a respective second value in the second direction to a third speed at a respective third value in the second direction.

In normal operation, the main conveyor belt can be driven at the first speed at the first value in the first direction, and the buffer belt can be driven at the second speed at the second value in the first direction.

Furthermore, the switching can comprise:

if the fault has been corrected, switching from the buffer operation of the buffer to the normal operation, wherein said switching comprises:

further maintaining the first speed of the container feed apparatus in the first direction, wherein the first speed has the first value, and simultaneously increasing the third speed of the buffer belt back to the second speed in the second direction and maintaining the second speed in the second direction.

or simultaneously increasing the respective third speed of the buffer belts back to the second speed in the second direction and maintaining the second speed in the second direction.

The simultaneous increase of the third speed of the buffer belt/belts back to the second speed in the second direction can take place incrementally over one or more, in each case higher intermediate speeds, or continuously.

"Incrementally" can mean that the third speed can be increased by a given or adjustable percentage to a particular intermediate speed until the second speed is reached. For example, an increase by 15 to 20% can be provided in each case. The intermediate speed reached can be maintained for a given or adjustable period of time before increasing to a next intermediate speed or to the second speed. The given or adjustable periods of time can be of different duration or the same duration for the different intermediate speeds.

Alternatively, the switching from the normal operation to the buffer operation of the thermal container treatment apparatus can further comprise:

further maintaining the first speed of the container feed apparatus in the first direction, wherein the first speed has the first value, and simultaneously decelerating the buffer belt from the third speed at a third value in the second direction to a speed of 0 m/min and subsequently accelerating the buffer belt from the speed of 0 m/min to a fourth speed in the third direction, wherein the fourth speed has a fourth value that is smaller than the second value, and maintaining the fourth speed in the third direction.

or simultaneously decelerating the buffer belts from the third speed at a third value in the second direction to a speed of 0 m/min and subsequently accelerating the buffer belts from the speed of 0 m/min to a respective fourth speed in the third direction, wherein the fourth speed has a respective fourth value that is smaller than the second value, and maintaining the fourth speed in the third direction.

The deceleration of the buffer belt from the second speed at the second value in the second direction (via the third speed at the third value in the second direction) to the fourth speed at the fourth value in the third direction can take place continuously or substantially continuously; or instead, the deceleration can take place incrementally.

The switching from the normal operation to buffer operation of the buffer belt can further comprise:

if the containers transported from the container feed apparatus to the buffer belt and the containers returned from the buffer belt fill a starting region of the buffer belt, further maintaining the first speed of the container feed apparatus in the first direction, wherein the first speed has the first value, and simultaneously decelerating the buffer belt from the fourth speed in the third direction to a fifth speed at a fifth value of 0 m/min and subsequent acceleration of the buffer belt from the fifth speed to a sixth speed in the second direction, wherein the sixth speed has a sixth value that is equal to the first value.

or

- if the containers transported from the container feed apparatus to the buffer belts and the containers returned from the buffer belts fill a starting region of the buffer belt,
- further maintaining the first speed of the container feed apparatus in the first direction, wherein the first speed has the first value, and
- simultaneously decelerating the buffer belts from the respective fourth speed in the third direction to a fifth speed at a fifth value of 0 m/min and subsequently accelerating the buffer belts from the fifth speed to a sixth speed in the second direction, wherein the sixth speed has a sixth value that is equal to the first value.

For example, 30% to 40% of the buffer belt or buffer belts can be filled if the containers transported onto the buffer belt or buffer belts by the container feed apparatus and the containers returned from the buffer belt or buffer belts fill the starting area of the buffer belt.

The sixth speed in the second direction can be maintained as long as the fault downstream of the buffer has not been corrected and until the buffer belt or belts is/are completely filled with containers or as long as the buffer belt or belts is/are not completely or substantially not completely filled with containers, for example as long as the buffer belt is less than 90% to 95% filled with containers.

The control method may further comprise:

- if the fault has been corrected, switching from the buffer operation of the buffer to the normal operation, wherein said switching comprises:
- further maintaining the first speed of the container feed apparatus in the first direction, wherein the first speed has the first value, and
- simultaneously increasing the sixth speed of the buffer belt to a seventh speed in the second direction, the seventh value being equal to the second value, and maintaining the seventh speed in the second direction.
- or
- simultaneously increasing the sixth speed of the buffer belts to a respective seventh speed in the second direction, the respective seventh value being equal to the respective second value, and maintaining the respective seventh speed in the second direction.

The simultaneous increase can take place incrementally over one or more, in each case higher intermediate speeds or continuously.

"Incrementally" can mean that the sixth speed can be increased by a given or adjustable percentage to a particular intermediate speed until the seventh speed is reached. For example, an increase by 15 to 20% can be provided in each case. The intermediate speed reached can be maintained for a given or adjustable period of time before increasing to a next intermediate speed or to the seventh speed. The given or adjustable periods of time can be of different duration or the same duration for the different intermediate speeds.

If the fault downstream of the buffer has not been corrected and the buffer belt or buffer belts is/are completely or substantially completely filled with containers, for example if the buffer belt or the buffer belts is/are filled to equal or more than 90% to 95% with containers, the method can further comprise:

- decelerating the container feed apparatus from the first speed in the first direction to a ninth speed at a ninth value of 0 m/min, and
- simultaneously decelerating the buffer belt or buffer belts from the sixth speed in the second direction to a tenth speed at a tenth value of 0 m/min.

These steps of the method can also be part of the switching from the normal operation to the buffer operation of the buffer. The transition area can also be braked when the buffer belt or buffer belts are braked in this method.

The method can further comprise:

- if the fault has been corrected, switching from the buffer operation of the buffer to the normal operation, wherein said switching comprises:
- increasing the ninth speed of the container feed apparatus to an eleventh speed in the first direction, wherein the eleventh value is equal to the first value, and maintaining the eleventh speed in the first direction, and
- simultaneously increasing the tenth speed of the buffer belt to a twelfth speed in the second direction.
- or
- simultaneously increasing the tenth speed of the buffer belts to a respective twelfth speed in the second direction.

The twelfth value can result from a permissible overpower of the buffer belt, which allows the containers present on the buffer belt to be transferred to the outlet belts with the permissible overpower.

The simultaneous increase can take place incrementally over one or more, in each case higher intermediate speeds or continuously.

For example, the one or more, in each case higher intermediate speeds can be the same when simultaneously increasing (a) from the sixth speed to reach the seventh speed and (b) from the tenth speed (0 m/min) to reach the twelfth speed. In the two cases (a) and (b), the given or adjustable periods of time for which the intermediate speeds achieved are maintained before increasing to a next intermediate speed or to the seventh or twelfth speed can be the same or different. The given or adjustable periods of time can be of different duration or the same duration for the different intermediate speeds.

The control device can also be designed to:

Acquire error data of a fault upstream or downstream of the buffer, for example error data of a further apparatus which may be upstream or downstream of the buffer, analyzing the error data and obtaining control data for controlling the buffer and controlling a fill level of the buffer belt or buffer belts during normal operation on the basis of the control data.

In order to be able to flexibly take into account any faults that may occur before or after the buffer by buffering containers on the buffer belt or buffer belts, the error data and/or control data of the fault are recorded before or after the buffer. By analyzing the error data, control data are obtained which are then used for controlling the buffer and a fill level of the buffer belt or buffer belts during normal operation. During a fault, the fill level of the buffer belt or the buffer belts may deviate from the fill level during normal operation.

If there is a fault upstream of the buffer, the buffer belt or buffer belts may gradually run empty during the fault. In the event of a fault downstream of the buffer, the buffer belt can gradually fill up during the fault.

Therefore, by controlling the fill level of the buffer belt or buffer belts during normal operation, the available buffer time in the event of faults can be adjusted. For example, if it is considered that more faults occur upstream of the buffer, a higher fill level of the buffer conveyor during normal operation can ensure a longer buffer time than a lower fill level. For example, if it is considered that more faults occur downstream of the buffer, a lower fill level of the buffer belt or buffer belts during normal operation can ensure a longer buffer time than a higher fill level.

Another apparatus that can be placed upstream of the buffer can be a filler. The filler can also comprise an inspection, rejection and/or turning device in addition to the filler. A capper can also be provided. In the case of glass containers, a washing apparatus can be provided and in the case of PET containers, a neck sterilizer can be provided.

A further apparatus that can be arranged downstream of the buffer can be an inspection machine or a dry section. Both an inspection machine and a dry section can also be provided. A labeling machine can also be provided. In the case of glass containers, a packer can be provided.

When controlled to a fill level of 30%, also referred to as the first fill level, a fault upstream of the buffer can be buffered by the buffer belt or buffer belts for at least 20, 30, 40, 50 or 60 seconds, and a fault downstream of the buffer can be buffered by the buffer belt or buffer belts for at least 20, 30, 40, 50, 60, 70, 80, 90, 100, 110 or 120 seconds.

Furthermore, when controlling for a second fill level that is lower than the first fill level, a fault before the buffer can be buffered by the buffer belt or buffer belts for less than 60 seconds and a fault after the buffer can be buffered by the buffer belt or buffer belts for more than 120 seconds.

By providing a lower fill level, for example, it is possible to take account of the fact that more faults have been found to occur downstream of the buffer.

For example, when controlling to a third fill level that is greater than the first fill level, a fault upstream of the buffer can be buffered by the buffer belt or buffer belts for more than 60 seconds and a fault downstream of the buffer can be buffered by the buffer belt or buffer belts for less than 120 seconds.

By providing a higher fill level, it is possible, for example, to take account of the fact that more faults have been found to occur upstream of the buffer.

The terms “first”, “second” and “third” fill level are only used to distinguish between the different fill levels mentioned.

Controlling can arrange the fill level of the buffer conveyor to 30%.

A buffer time for a fault upstream from the buffer can be at least 60 seconds.

It can be provided that a buffer time for a fault downstream from the buffer can be at least 120 seconds.

Alternatively, it can be provided that a first buffer time for a first fault upstream from the buffer can be at least 60 seconds and that a second buffer time for a second fault of a second fault downstream from the buffer can be at least 60 seconds.

The error data may comprise: information that a fault has occurred upstream or downstream of the buffer and/or information on downtimes, including, for example, frequency of faults, fault duration and/or reduced output, and/or information on time dependencies of faults during production, and/or information on ambient pressure and/or ambient temperature and/or time of day during faults, and/or the number of faults upstream and/or downstream of the buffer and/or the number of faults upstream and/or downstream of the buffer that have caused the buffer belt or the buffer belts to run completely empty or completely full, and/or accumulated duration of faults, and/or classified error data.

For example, a classification may take into account why an error occurred and whether it could occur again within a given time frame. If the error could occur again within the given time frame, this can be taken into account for controlling the buffer apparatus within the given time frame. If the error could not occur again within the given time frame, the error does not need to be taken into account for controlling the buffer apparatus.

For example, an error may occur in the dry section if foil is not added in time. The dry section then stops because there is no more foil. Once the foil supply has been replenished, the error has ended and will not occur again within a given time frame, for example one hour, as the foil supply has been replenished.

The control data can be obtained by means of automatic analysis, for example by means of an analysis program and/or machine learning.

A setpoint value for the fill level of the buffer belt or buffer belts can be increased or decreased on the basis of the error data and the increased or decreased setpoint value can be used to control the fill level.

Capturing the error data for the fault, analyzing the error data and obtaining control data and controlling the fill level of the buffer belt or buffer belts during normal operation can be performed at regular intervals, for example every 10 seconds to 20 seconds, every 5 minutes to 45 minutes, once per hour, once per day or once per week, on the basis of the control data.

It can also be provided that only the error data of the fault are captured at regular intervals, for example every 10 seconds to 20 seconds, every 5 minutes to 45 minutes, once per hour, once per day or once per week. Analyzing the error data, obtaining control data and controlling the fill level of the buffer belt or buffer belts during normal operation on the basis of the control data are not carried out, for example, directly after the error data relating to the fault are captured at regular intervals.

Alternatively, it may be provided that capturing the error data relating to the fault and analyzing the error data and obtaining control data can be performed at regular intervals, for example every 10 seconds to 20 seconds, every 5 minutes to 45 minutes, once per hour, once per day or once per week. Controlling the fill level of the buffer belt or buffer belts during normal operation, performed on the basis of the control data, for example, is not directly linked to the regular capturing of error data relating to the fault, analysis of the error data and obtaining of control data.

Controlling the fill level of the buffer belt or buffer belts during normal operation on the basis of the control data can be performed after capturing the error data relating to the fault and analyzing the error data and obtaining control data.

Controlling the fill level of the buffer belt or buffer belts during normal operation of the filling line on the basis of the control data can occur: after exceeding a first given maximum number of faults upstream and/or downstream of the buffer and/or after exceeding a second given maximum number of faults upstream and/or downstream of the buffer that have caused the buffer belt or buffer belts to run completely empty or completely full.

The fill level of the buffer belt or buffer belts during normal operation can be controlled using the control data after a given maximum number of accumulated fault durations of faults before and/or after the buffer belt have been exceeded.

The container feed apparatus comprises a single-track infeed conveyor that can be driven in the third direction and is designed to convey containers in the third direction. Further, the container feed apparatus comprises a first group of several first conveyors arranged in parallel adjacent to the single-track infeed conveyor, wherein the former can be driven in the third direction and are designed to convey containers in the third direction, and a second group of several second conveyors arranged in parallel adjacent to the first group of several first conveyors arranged in parallel, wherein the former can be driven in the first direction and are designed to convey containers in the first direction. The containers can be discharged from the second group of several parallel second conveyors transversely to the first direction in the second direction to the buffer.

The containers can include glass bottles, PET bottles and/or cans. Also included are screw-top jars for food as well as food or tin cans.

The single-track infeed conveyor can be regarded as an infeed to the first group. The first group can comprise a number of n>1 first conveyors, for example n=3. The first (n=1) of the first conveyors can be arranged adjacent to the single-track infeed conveyor, the second (n=2) of the first conveyors can be arranged adjacent to the first (n=1) of the first conveyors and the third (n=3) of the first conveyors can be arranged adjacent to the second (n=2) of the first conveyors.

The second group can comprise a number of m>1 second conveyors, for example m=3 (the number of conveyors in the first and second group can also be different). The first (m=1) of the second conveyors can be arranged adjacent to the third (n=3) of the first conveyors, the second (m=2) of the second conveyors can be arranged adjacent to the first (m=1) of the second conveyors and the third (m=3) of the second conveyors can be arranged adjacent to the second (m=2) of the second conveyors and the buffer.

Parallel can mean that between the single-track infeed conveyor and/or the conveyors and/or a conveyor and the buffer, a distance can be provided that can be smaller than the diameter of a container, or a transfer plate with a width that can be smaller than the diameter of a container.

The first group can summarily describe the several first conveyors that can be driven in the first direction. The multiple first conveyors can be designed to be individually drivable. Drive speeds can be controlled by means of a control device, which can be included in the container feed apparatus. The drive speeds can be the same or different for the several first conveyors. The first conveyors can each comprise a transport surface, wherein the transport surfaces can be coplanar. The same applies to the second group, which can summarily describe the several second conveyors that can be driven in the first direction.

Downstream of the buffer, the container discharge apparatus can comprise a first group of several first conveyors arranged in parallel, which can be driven in a first direction transverse to the second direction of the buffer and are designed to separate containers and convey them in the first direction. Further, the container discharge apparatus comprises, following in parallel the first group of several first conveyors arranged in parallel, a second group of several second conveyors arranged in parallel, which can be driven in a third direction and are designed to convey the separated containers in the third direction, and one or more third conveyors, whose number is smaller than the number of second conveyors, wherein the third conveyor or conveyors is/are designed to transport away the separated containers.

By providing conveyors arranged in parallel which are arranged transversely to the buffer and which are also used to separate the containers, a compact design and thus a saving of space can be achieved.

The terms "first", "second", "third" or "fourth" are merely used to differentiate, but are not otherwise to be understood as further limiting.

A buffer apparatus comprises a container cleaning apparatus, a buffer downstream of the container cleaning apparatus and a container discharge apparatus downstream of the buffer, wherein the container cleaning apparatus is designed to transport containers in a first direction. The buffer comprises a drivable buffer belt or several drivable buffer belts arranged in parallel, each of which is designed to transport containers in a second direction, wherein the first direction and the second direction extend in the same direction. The container discharge apparatus is designed to discharge and separate containers from the buffer in a third direction, which is transverse to the first and second directions. Features of the container discharge apparatus may correspond to the examples and embodiments of the container discharge apparatus as described above and below. The first direction mentioned there in connection with the container discharge apparatus is then a fourth direction (to distinguish it from the first direction of the container cleaning device), wherein the fourth direction may be opposite to the third direction. Properties of the buffer may correspond to the examples and embodiments of the buffer as described above and below.

The drivable buffer belt can be further designed or the several drivable buffer belts arranged in parallel can each be further designed to transport containers in a fourth direction, wherein the second and the fourth direction can be opposite to each other and the third direction can run transversely to the fourth direction. Features of the container discharge apparatus may correspond to the examples and embodiments of the container discharge apparatus as described above and below. The first direction mentioned there in connection with the container discharge apparatus is then a fifth direction (to distinguish it from the first direction of the container cleaning apparatus), wherein the fifth direction may be opposite to the fourth direction. Properties of the buffer may correspond to the examples and embodiments of the buffer as described above and below.

The container cleaning apparatus can be used for reusable glass containers.

The containers can be unpacked from boxes in which they can be transported, for example, and then placed on a mass conveyor belt that can feed the containers to the inlet of a container cleaning apparatus. At the infeed, the containers can be guided into lanes over a fixed width (e.g. 3 to 5 meters) and fed into the container cleaning apparatus, for example by means of bottle carriers.

BRIEF DESCRIPTION OF THE DRAWINGS

The accompanying figures show, by way of example, aspects and embodiments of the invention for better understanding and illustration. In the figures.

DETAILED DESCRIPTION

Figure 1A:
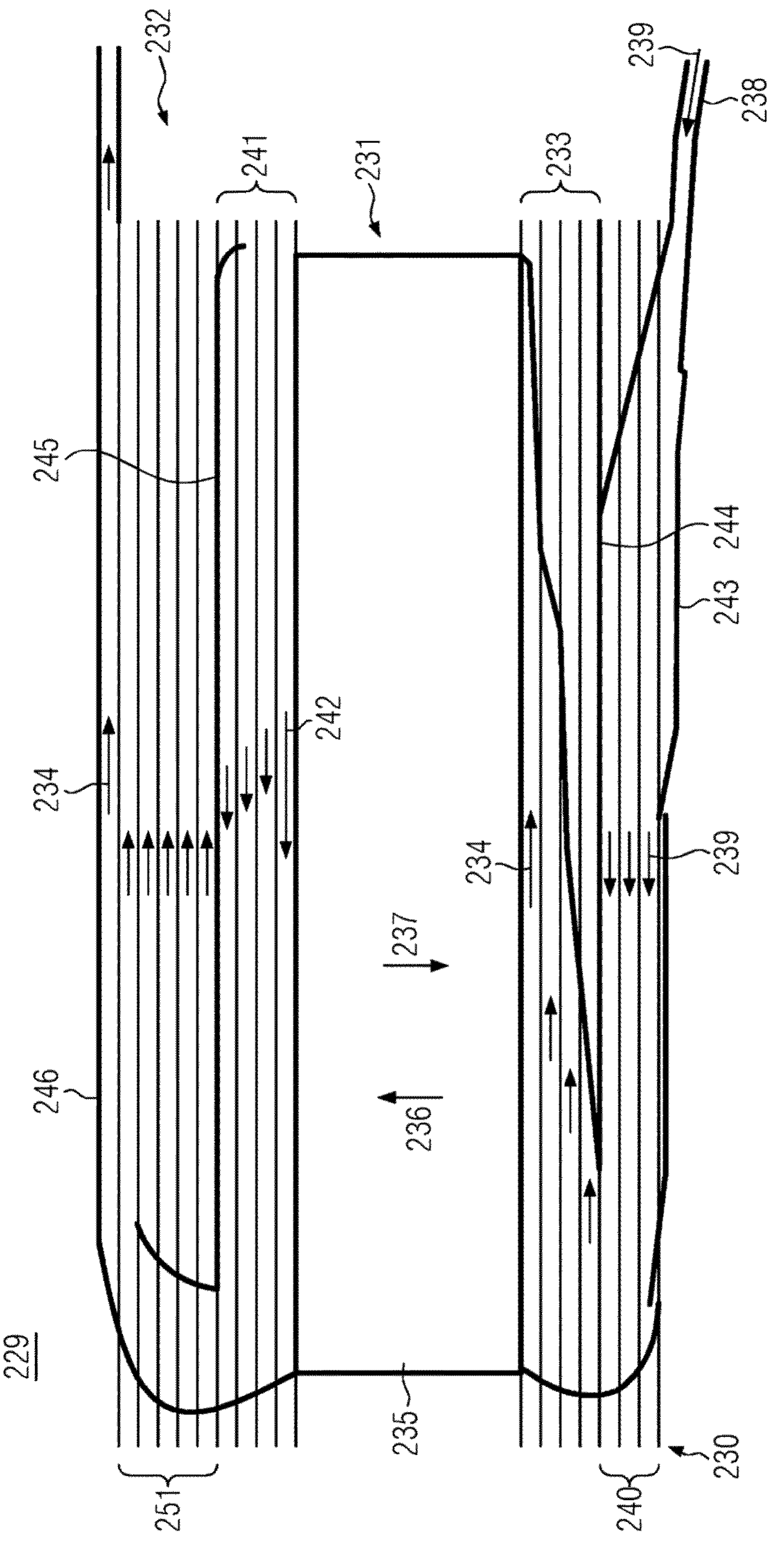
FIG. 1A shows a schematic plan view of a first embodiment of a buffer apparatus.

FIG. 1A shows a schematic plan view of a first embodiment of a buffer apparatus 229. The buffer device 229 comprises a container feed apparatus 230, a buffer 231 downstream of the container feed apparatus 230 and a container discharge apparatus 232 downstream of the buffer 231. The container feed apparatus 230 for feeding containers to the buffer 231 is designed to transport containers in a first direction 234 by means of first conveyor belts. The buffer 231 comprises a drivable buffer belt 235 which is designed to transport containers in a second direction 236 or to transport containers in a third direction 237, wherein the second 236 and the third direction 237 are opposite to each other and each extend transversely to the first direction 234. Alternatively, it may be provided that the drivable buffer belt 235 is not designed to transport containers in the third direction, i.e. that it cannot be driven in the third direction. The container discharge apparatus 232 for removing and separating containers from the buffer 231 in a fourth direction 242, which is opposite to the first direction 234.

The container feed 230 is shown in detail in FIGS. 9 to 12.

The container feed apparatus 229 shown in FIG. 1A comprises a single-track infeed conveyor 238 which is drivable in the fourth direction 239 and can, for example, convey containers transported on its transport surface in the fourth direction 239.

A first group 240 of several first conveyors arranged in parallel, each of which can be driven in the fourth direction 239, is provided parallel to the single-track infeed conveyor 238. Containers can be conveyed in the fourth direction 239 on the respective transport surfaces of the first conveyors.

Parallel to the first group 240, a second group 233 of several second conveyors arranged in parallel is provided, each of which can be driven in the first direction 234. Containers can be conveyed in the first direction 234 on the respective transport surfaces of the second conveyors. The first and fourth directions 234, 239 are opposite to each other.

Above the transport surfaces of the single-track infeed conveyor 238 and the transport surfaces of the first and second groups 240, 233, railings 243, 244 are provided, which are explained in more detail in connection with FIGS. 9 and 10.

The container discharge apparatus is explained in more detail in FIGS. 3A to 8E.

The container discharge apparatus 232 shown in FIG. 1A comprises, downstream from the buffer 231, a first group 241 of first conveyors arranged in parallel, which are drivable in the fourth direction 242 transversely to the second direction 236 of the buffer 231. The first conveyors are designed in such a way that they can separate containers and convey them in the first direction 242.

Furthermore, the container discharge apparatus 232 comprises, following in parallel the first group 241, a second group 251 of second conveyors arranged in parallel, which can be driven in a second direction 234. The second conveyors are designed such that they can convey the separated containers in the first direction 234.

In addition, the container discharge apparatus 232 here comprises a third conveyor which is designed such that it can transport the separated containers away in the first direction 234.

Above the transport surfaces of the third conveyor and the transport surfaces of the first and second groups 241, 251, railings 245, 246 are provided, which are explained in more detail in connection with FIGS. 3A to 8E.

Figure 1B:
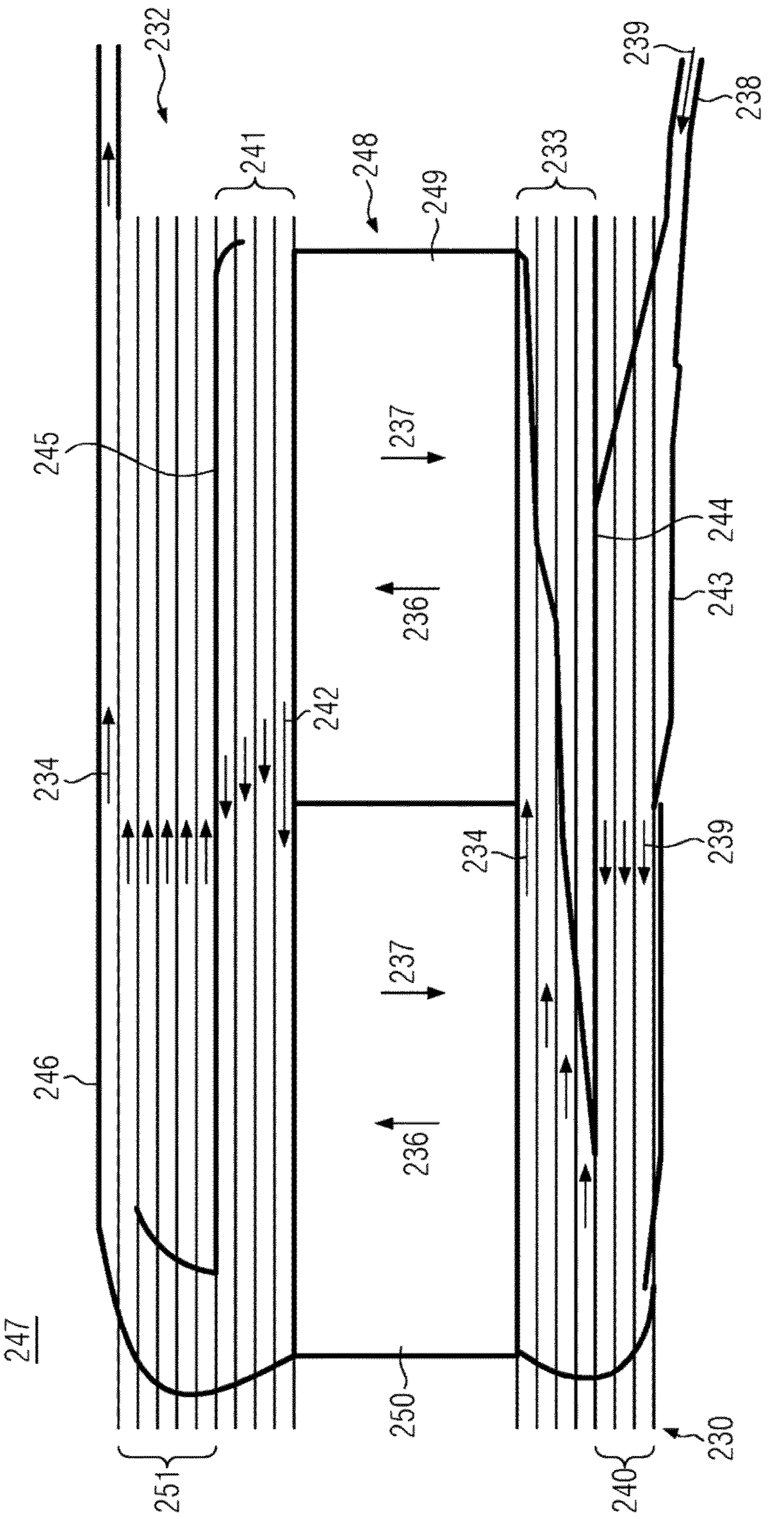
FIG. 1B shows a schematic plan view of a second embodiment of a buffer apparatus.

FIG. 1B is a schematic plan view of a second embodiment of a buffer apparatus 247.*s* The container feed apparatus 230 and the container discharge apparatus 232 are identical in construction to those of FIG. 1A. However, the buffer 248 here comprises two drivable buffer belts 249, 250 arranged in parallel, which are each designed to transport containers in the second direction 236 or to transport containers in the third direction 237. Alternatively, it may be provided that the two buffer belts 249, 250 are not designed to transport containers in the third direction, i.e. that they cannot be driven in the third direction.

Figure 2A:
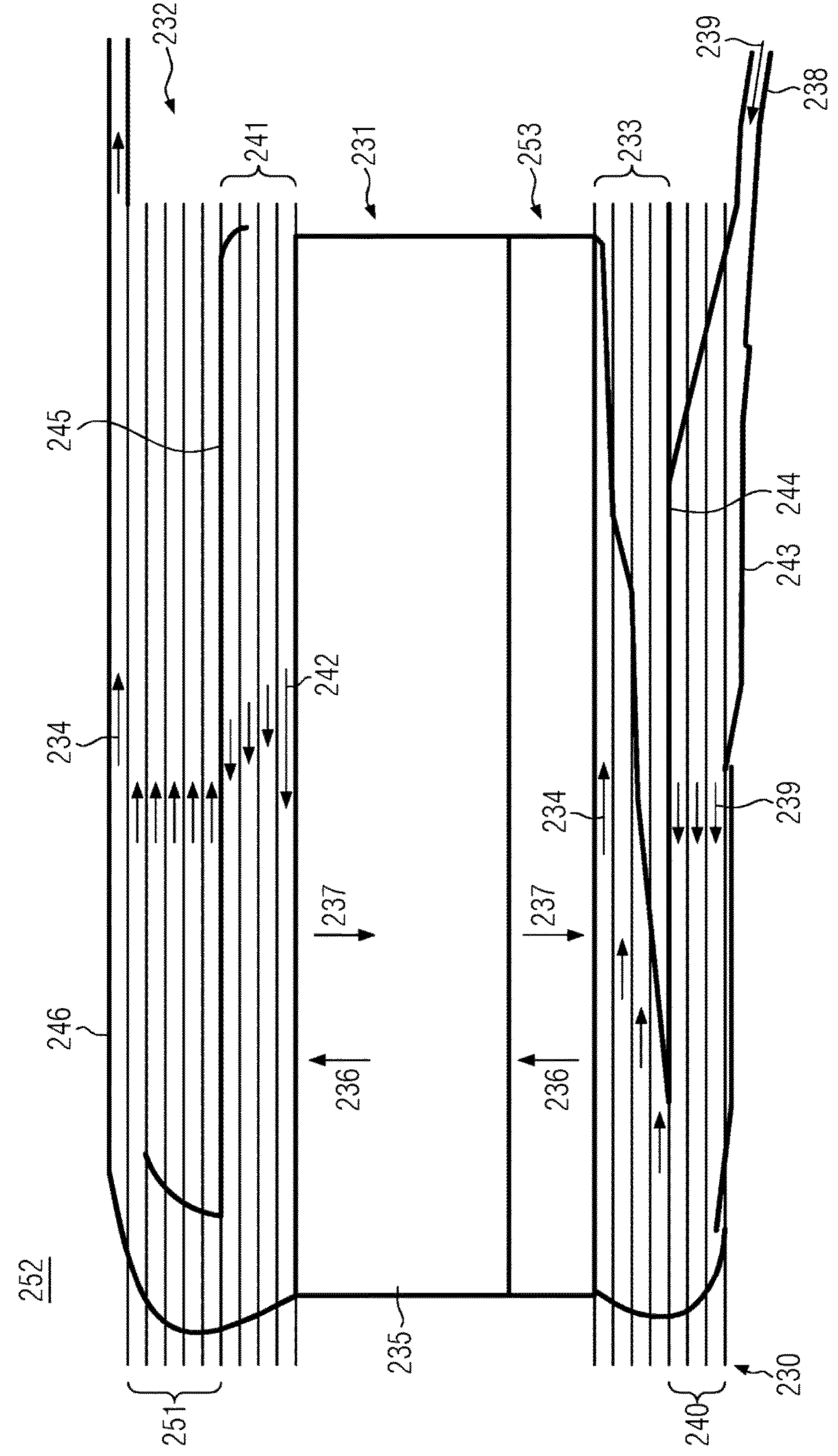
FIG. 2A shows a schematic plan view of a third embodiment of a buffer apparatus.

FIG. 2A is a schematic plan view of a third embodiment of a buffer apparatus 252. The container feed apparatus 230, the buffer 231 and the container discharge apparatus are identical in construction to those of FIG. 1A. A transition region 253 is arranged between the container feed apparatus 230 and the buffer 231, which is designed as a single drivable belt that can transport containers in the second direction 236 or in the third direction 237. Alternatively, it may be provided that the drivable buffer belt 235 is not designed to transport containers in the third direction, i.e. that it is not drivable in the third direction, but only in the second direction; the drivable buffer belt 235 may also be stationary. The transition region 253 can be designed such that it can only transport containers in the second direction 236, but not in the third direction; the transition region 253 can also be stationary.

Figure 2B:
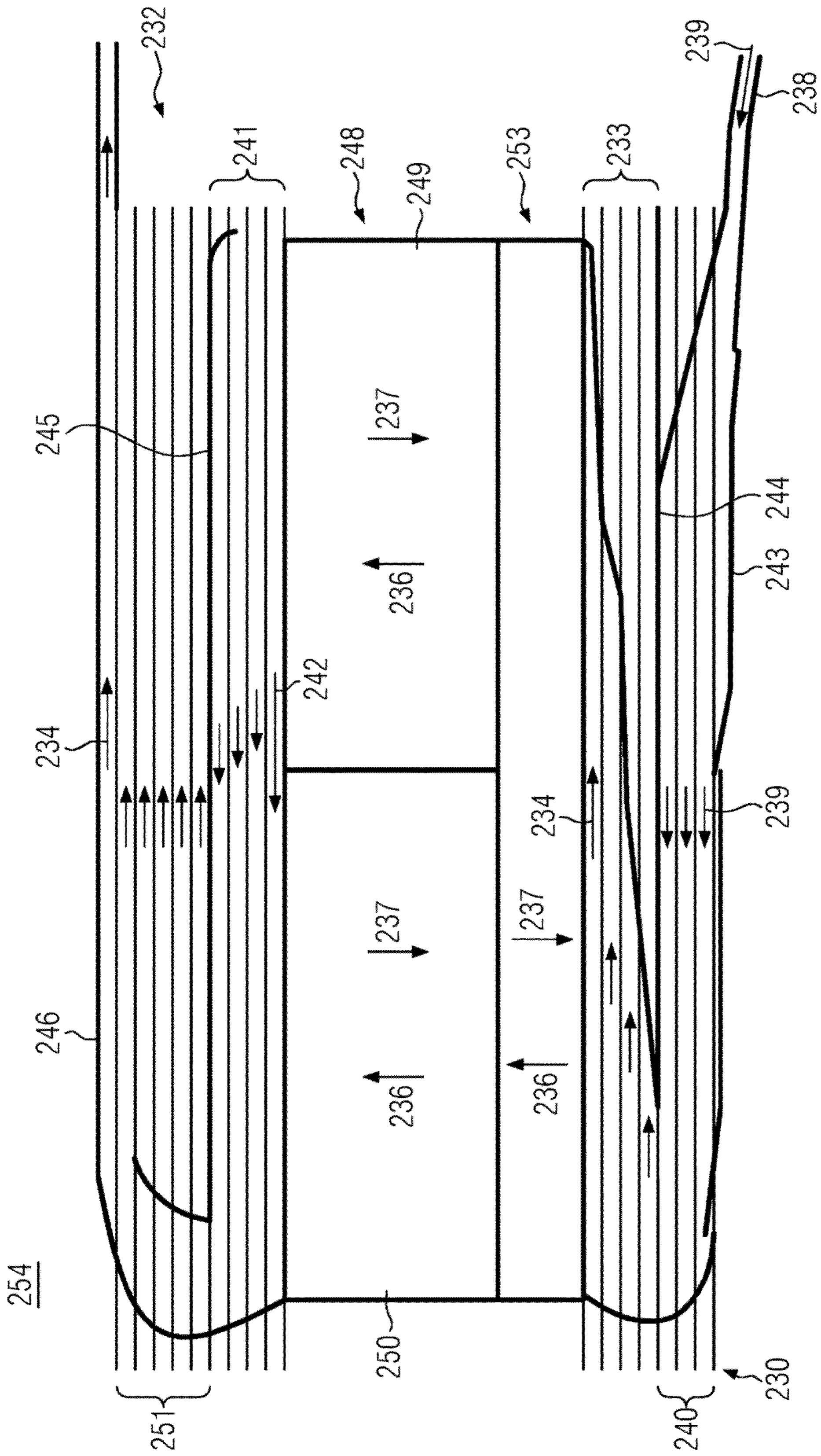
FIG. 2B shows a schematic plan view of a fourth embodiment of a buffer apparatus.

FIG. 2B is a schematic plan view of a fourth embodiment of a buffer apparatus 254. The container feed apparatus 230, the buffer 248 and the container discharge apparatus 232 are identical in construction to those of FIG. 1B. A transition region 253 is arranged between the container feed apparatus 230 and the buffer 231, which is designed as a single drivable belt that can transport containers in the second direction 236 or in the third direction 237. Alternatively, it may be provided that the two buffer belts 249, 250 are not designed to transport containers in the third direction, i.e. that they cannot be driven in the third direction, but only in the second direction; the buffer belts 249, 250 may also be stationary. The transition region 253 can be designed such that it can only transport containers in the second direction 236, but not in the third direction; the transition region 253 can also be stationary.

Figure 2C:
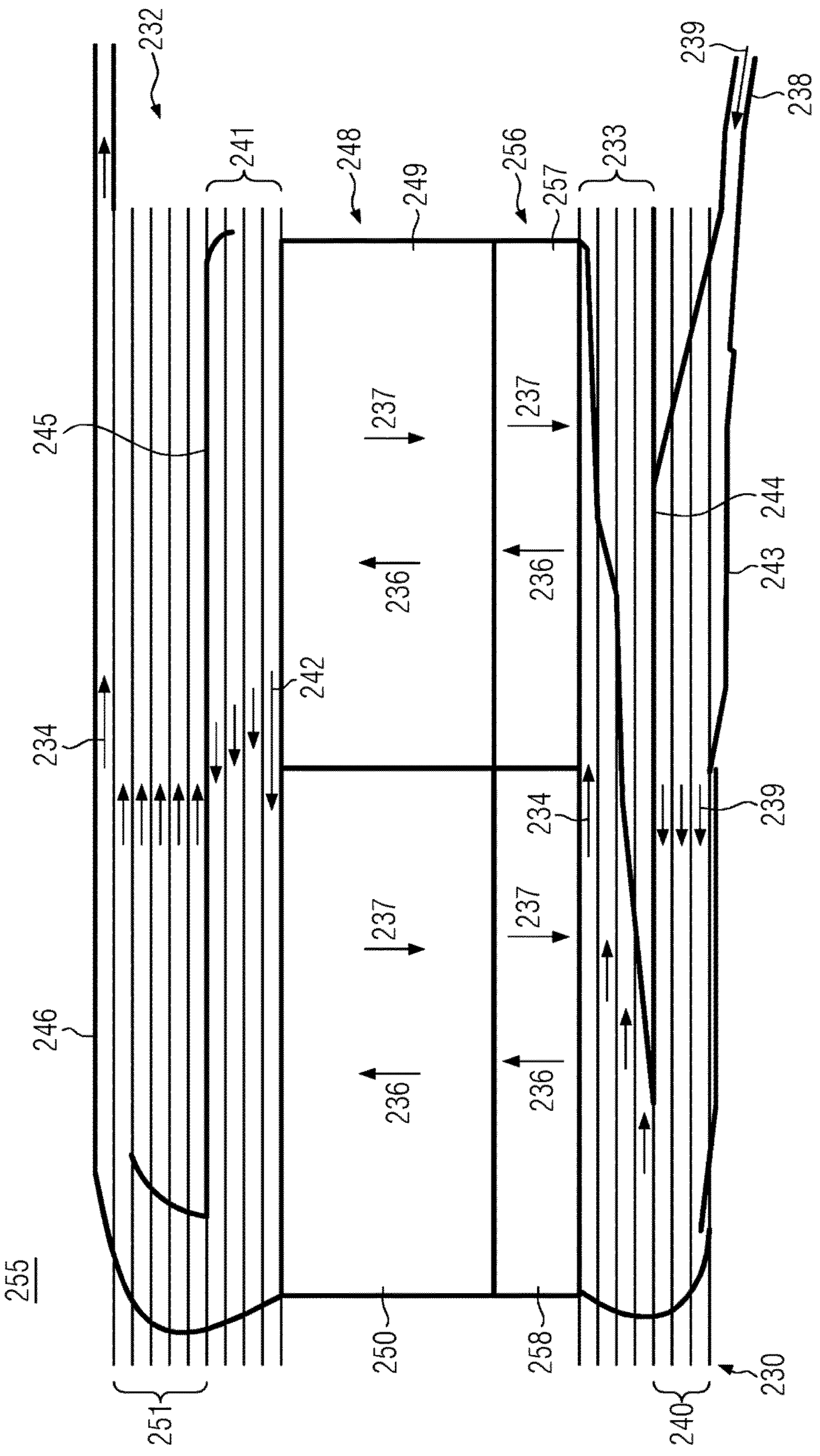
FIG. 2C shows a schematic plan view of a fifth embodiment of a buffer apparatus.

FIG. 2C is a schematic plan view of a fifth embodiment of a buffer apparatus 255. The container feed apparatus 230, the buffer 248 and the container discharge apparatus 232 are identical in construction to those of FIG. 1B. A transition region 256 is arranged between the container feed apparatus 230 and the buffer 248, which comprises an equal number of drivable belts 257, 258, in this case two, as the buffer 248, wherein the drivable belts 257, 258 are configured to transport containers in the second 236 or in the third direction 237. Alternatively, it may be provided that the two buffer belts 249, 250 are not designed to transport containers in the third direction, i.e. that they cannot be driven in the third direction, but only in the second direction; the buffer belts 249, 250 may also be stationary. The belts 257, 258 of the transition region 256 can be designed in such a way that they can only transport containers in the second direction 236, but not in the third direction; the belts 257, 258 of the transition region 256 can also be stationary.

Figure 3A:
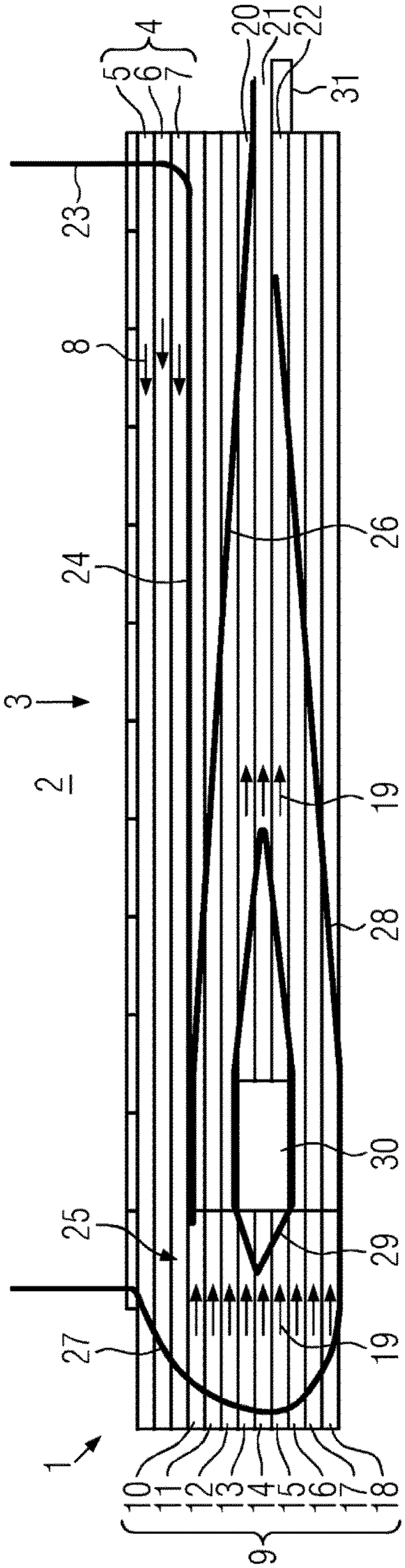
FIG. 3A shows a schematic plan view of a first embodiment of the container discharge apparatus.

FIG. 3A shows a schematic plan view of a first embodiment of the container discharge apparatus 1 for discharging containers from a buffer 2 and for separating the containers. The buffer 2 can transport containers in a transport direction 3. The container discharge apparatus 1 comprises, downstream of the buffer 2, a first group 4 of, here, three first conveyors 5, 6, 7 arranged in parallel, which can be driven in a first direction 8 transverse to the transport direction 3 of the buffer 2. The first conveyors 5-7 are designed such that they can separate containers and convey them in the first direction 8.

Furthermore, the container discharge apparatus 1 comprises, following in parallel the first group 4 of the three parallel first conveyors 5, 6, 7, a second group 9 of, here, nine second conveyors 10, 11, 12, 13, 14, 15, 16, 17, 18 arranged in parallel, which can be driven in a second direction 19. The second direction 19 is opposite the first direction 8. The second conveyors 10-18 are designed such that they can convey the separated containers in the second direction 19.

In addition, the container discharge apparatus 1 here comprises three third conveyors 20, 21, 22, which are designed in such a way that they can transport the separated containers away in the second direction 19.

At the beginning of the first conveyors 5-7, a first railing 23 is arranged above the transport surfaces of the first conveyors 5-7, the straight portion of which railing extends transversely to the first conveyors 5-7, with a 90° curve following the straight portion.

Above the transport surfaces, a second railing 24 is provided between the first group 4 and the second group 9, which railing is straight and is designed in such a way that a transition region 25 for containers is provided between the first group 4 and the second group 9. The second railing 24 is connected to the first railing 23.

Above the transport surfaces of three of the second conveyors 10, 11, 12, a third railing 26 is provided which leaves the transition region 25 free and extends to the middle of the third conveyor 21. The third railing 26 is straight and is connected to the second railing 24.

At the end of the three first conveyors 5-7 and at the beginning of the nine second conveyors 10-18, a concave railing 27 is provided above the transport surfaces. Here, the concave railing 27 comprises a curve that describes an angle of 180°.

Following the concave railing 27, a fourth railing 28 is provided, which is initially provided above and to the side of one of the second conveyors 18 and then above three of the second conveyors 16, 17, 18, and extends to the middle of the third conveyor 21.

Furthermore, the container discharge apparatus 1 comprises a flexible element 29, which is provided at a distance above, i.e., above the transport surfaces, of five of the second conveyors 12-16. In addition, the flexible element 29 extends at a distance above, i.e., above the transport surfaces, of the three third conveyors 20-22. Because the flexible element 29 is provided at a distance above the transport surfaces of five of the second conveyors 12-16, overturned containers and broken containers, for example, can be ejected into a first collecting apparatus 30 which is arranged below the container discharge apparatus 1. Three second conveyors 13-15 of the five second conveyors 12-16 are made shorter than the remaining second conveyors 10-12, 16-18. This ensures access to the first collecting apparatus 30.

A second collecting apparatus 31 can be provided below, next to the middle one of the third conveyors 21 and following one of the third conveyors 22. For example, overturned containers and broken containers can be ejected into the second collecting apparatus 31.

Figure 3B:
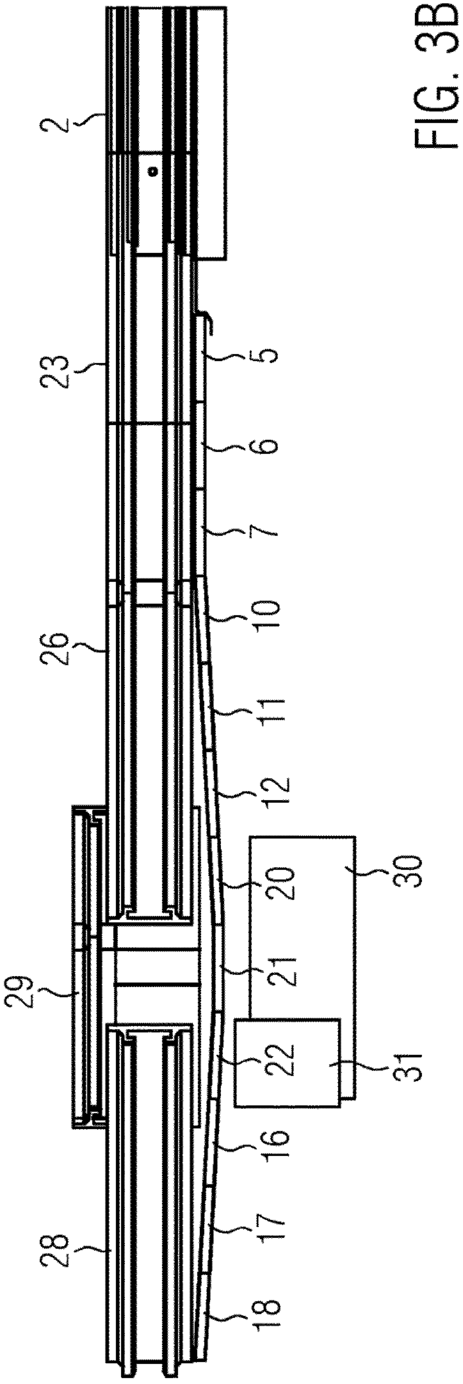
FIG. 3B shows a schematic side view of the first embodiment of the container discharge apparatus.

FIG. 3B shows a schematic side view of the first embodiment of the container discharge apparatus 1, viewed in the first direction 8. In addition to the first railing 23, the third railing 26, the fourth railing 28, and the flexible element 29, the first conveyors 5-7, the second conveyors 10-12, 16-18, the third conveyors 20-22, the first collecting apparatus 30, and the second collecting apparatus 31 are visible.

The transport surfaces of the first conveyors 5-7 are arranged without steps in adjacent regions, and the individual transport surfaces enclose an angle of 0° with a plane perpendicular to the direction of action of gravity, i.e., they run horizontally.

The transport surface of the first conveyor 7 and the transport surface of the second conveyor 10 are arranged without steps in adjacent regions.

The transport surfaces of four of the second conveyors 10-13 (only the second conveyors 10-12 are visible) are arranged in adjacent regions without steps, and the individual transport surfaces enclose an angle of −5° with a plane perpendicular to the direction of action of gravity. The transport surface of the second conveyor 14 (not visible) encloses an angle of 0° with a plane perpendicular to the direction of action of gravity. The transport surfaces of four of the second conveyors 15-18 (only the second conveyors 16-18 are visible) are arranged in adjacent regions without steps, and the individual transport surfaces enclose an angle of +5° with a plane perpendicular to the direction of action of gravity. All transport surfaces of the second conveyors 10-18 are arranged in adjacent regions without steps.

The transport surface of the third conveyor 20 encloses an angle of −5° with a plane perpendicular to the direction of action of gravity. The transport surface of the third conveyor 21 encloses an angle of 0° with a plane perpendicular to the direction of action of gravity. The transport surface of the third conveyor 22 encloses an angle of +5° with a plane perpendicular to the direction of action of gravity.

Figure 3C:
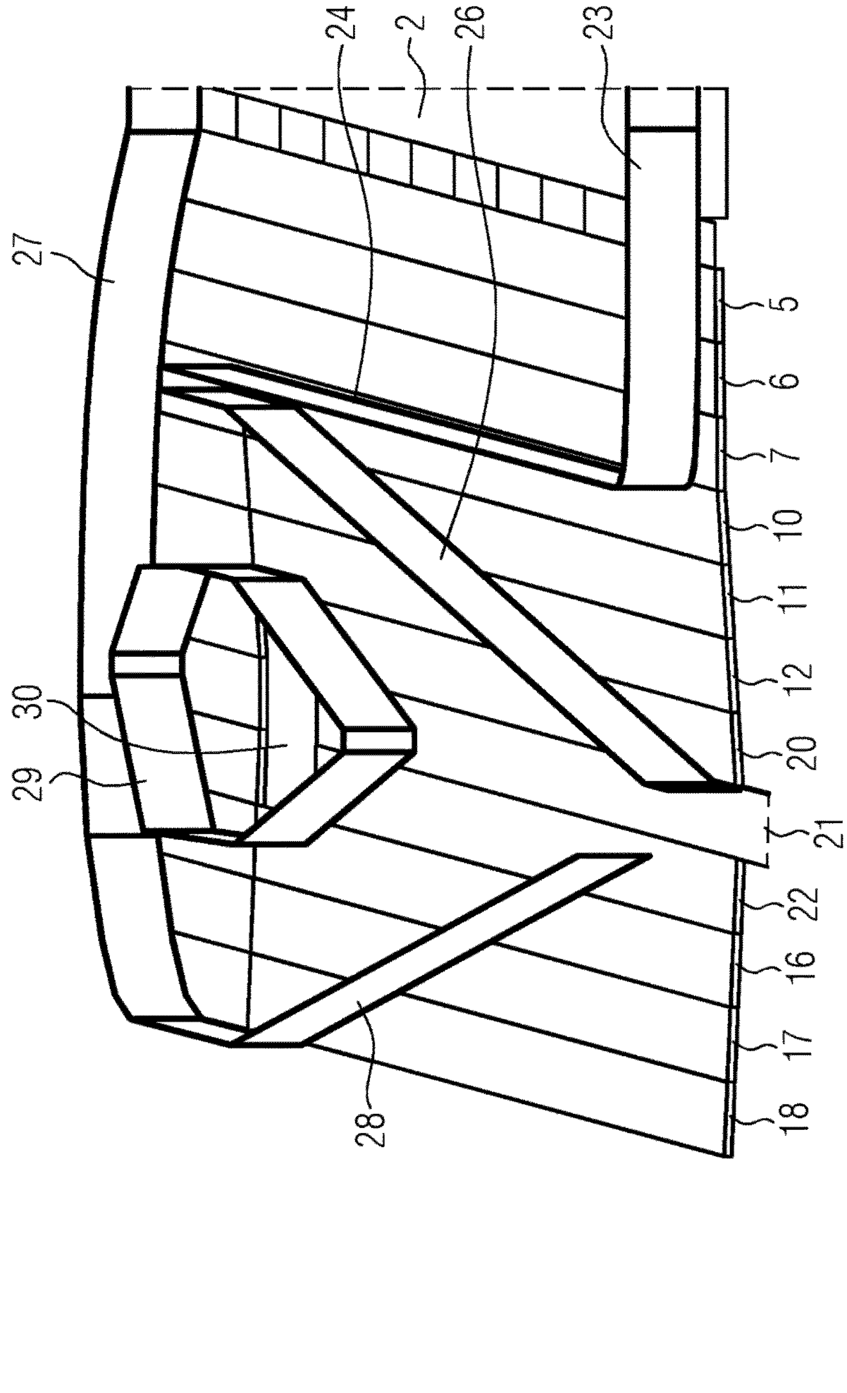
FIG. 3C shows a schematic oblique view of the first embodiment of the container discharge apparatus from above with a viewing direction in the first direction.

FIG. 3C shows a schematic oblique view of the first embodiment of the container discharge apparatus 1 from above with a viewing direction in the first direction 8. In addition to the first railing 23, the second railing 24, the third railing 26, the concave railing 27, the fourth railing 28, and the flexible element 29, the first conveyors 5-7, the second conveyors 10-18, the third conveyors 20-22, the first collecting apparatus 30, and the second collecting apparatus 31 are visible.

Figure 3D:
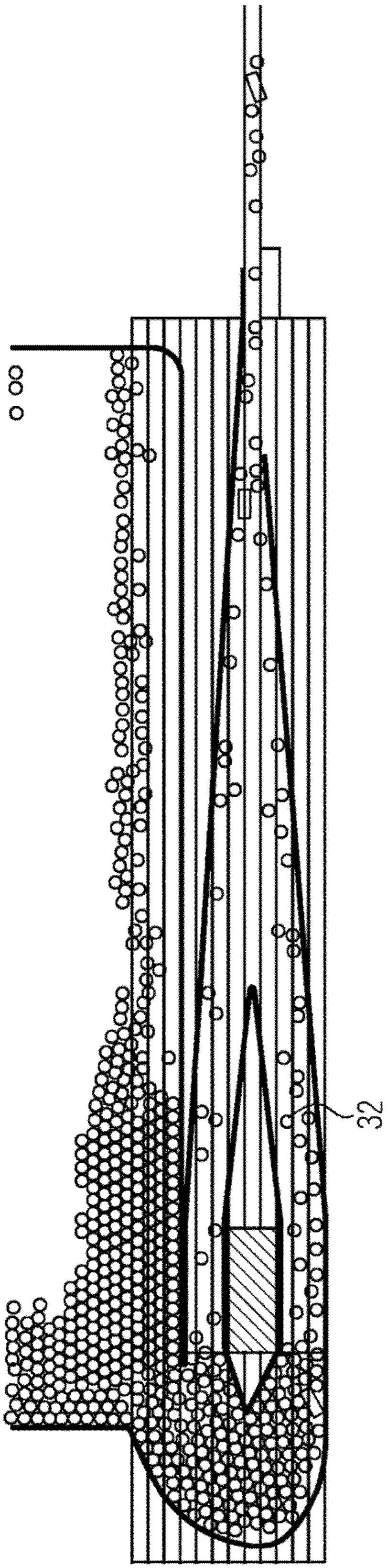
FIG. 3D shows a schematic plan view of the first embodiment of the container discharge apparatus with containers arranged therein.

FIG. 3D shows a schematic plan view of the first embodiment of the container discharge apparatus 1 with containers 32 arranged therein. As containers are transported by the first conveyors 5-7 in the first direction 8, the containers jostle at the end of the first conveyors 5-7 and as a result, and due to the concave railing 27, reach the transition region 25 and move towards the second conveyors 10-18, by which they are moved in the second direction 19. The third railing 26 and the fourth railing 28 as well as the inclined design of the second conveyors 10-13, 15-18 and of the third conveyors 20, 22 transport the containers 55 towards the third conveyor 21, which can transport away the separated containers 55.

Figure 4A:
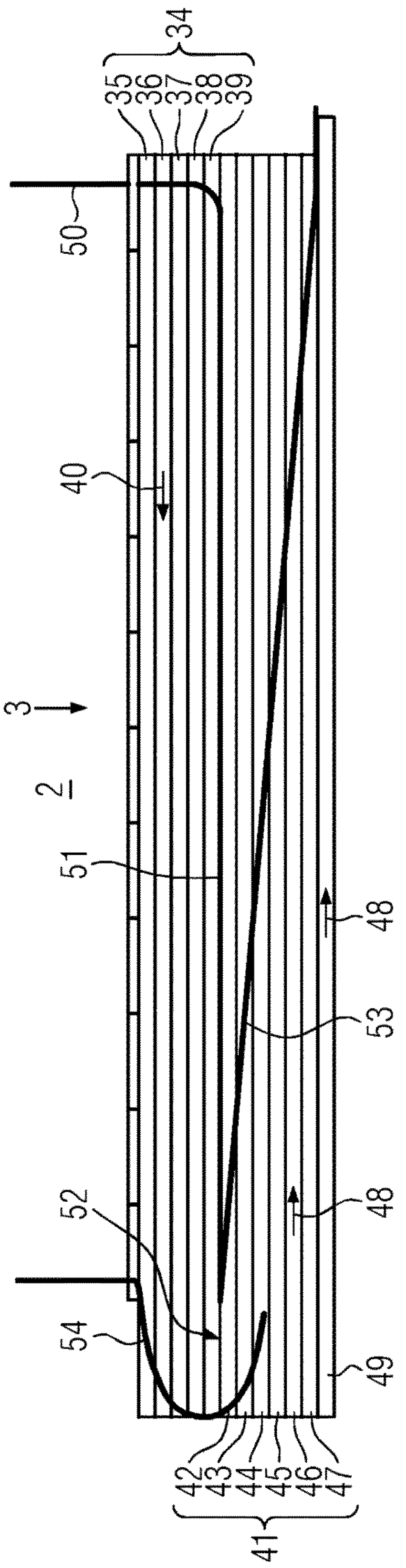
FIG. 4A shows a schematic plan view of a second embodiment of the container discharge apparatus.

FIG. 4A shows a schematic plan view of a second embodiment of the container discharge apparatus 33 for discharging containers from the buffer 2 and for separating the containers. The container discharge apparatus 33 comprises, downstream of the buffer 2, a first group 34 of, here, five first conveyors 35, 36, 37, 38, 39 arranged in parallel, which can be driven in a first direction 40 transverse to the transport direction 3 of the buffer 2. The first conveyors 35-39 are designed in such a way that they can separate containers and convey them in the first direction 40.

Furthermore, the container discharge apparatus 33 comprises, following in parallel the first group 34 of the five first conveyors 35-39 arranged in parallel, a second group 41 of, here, six second conveyors 42, 43, 44, 45, 46, 47 arranged in parallel, which can be driven in a second direction 48. The second direction 48 is opposite to the first direction 40. The second conveyors 42-46 are designed such that they can convey the separated containers in the second direction 47.

In addition, the container discharge apparatus 33 here comprises a third conveyor 49 which is designed such that it can transport the separated containers away in the second direction 48.

At the beginning of the first conveyors 35-39, a first railing 50 is arranged above the transport surfaces of the first conveyors 35-39, the straight portion of which railing extends transversely to the first conveyors 35-39, with a 90° curve following the straight portion.

Above the transport surfaces, a second railing 51 is provided between the first group 34 and the second group 41, which railing is straight and is designed in such a way that a transition region 52 for containers is provided between the first group 34 and the second group 41. The second railing 51 is connected to the first railing 50.

A third railing 53 is provided above the transport surfaces of the second conveyors 42-47, which railing leaves the transition region 52 free and extends to the third conveyor 49. The third railing 53 is straight and is connected to the second railing 51.

At the end of the five first conveyors 35-39 and at the beginning of three of the six second conveyors 42-44, a concave railing 54 is provided above the transport surfaces. Here, the concave railing 54 comprises a curve that describes an angle of 180°.

Figure 4B:
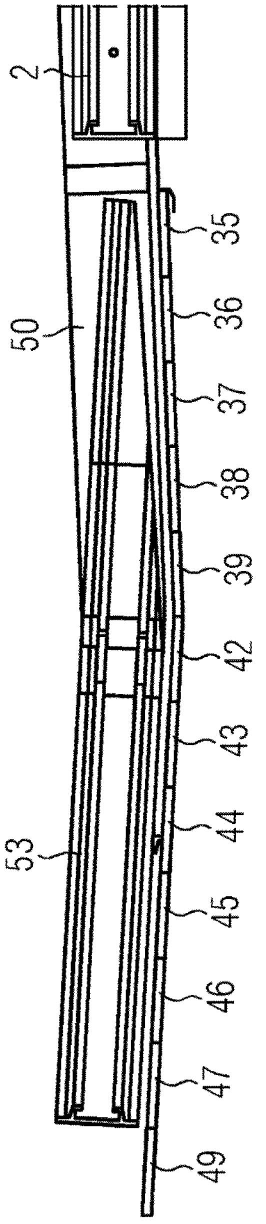
FIG. 4B shows a schematic side view of the second embodiment of the container discharge apparatus.

FIG. 4B shows a schematic side view of the second embodiment of the container discharge apparatus 33, viewed in the first direction 40. In addition to the first railing 50 and the third railing 53, the first conveyors 35-39, the second conveyors 42-47, and the third conveyor 48 can be seen.

The transport surfaces of the first conveyors 35-39 are arranged without steps in adjacent regions, and the individual transport surfaces enclose an angle of −10° with a plane perpendicular to the direction of action of gravity.

The transport surface of the first conveyor 39 and the transport surface of the second conveyor 42 are arranged without steps in adjacent regions.

The transport surfaces of the second conveyors 42-47 are arranged without steps in adjacent regions, and the individual transport surfaces enclose an angle of +5° with a plane perpendicular to the direction of action of gravity.

The transport surface of the third conveyor 49 encloses an angle of +5° with a plane perpendicular to the direction of action of gravity.

Figure 4C:
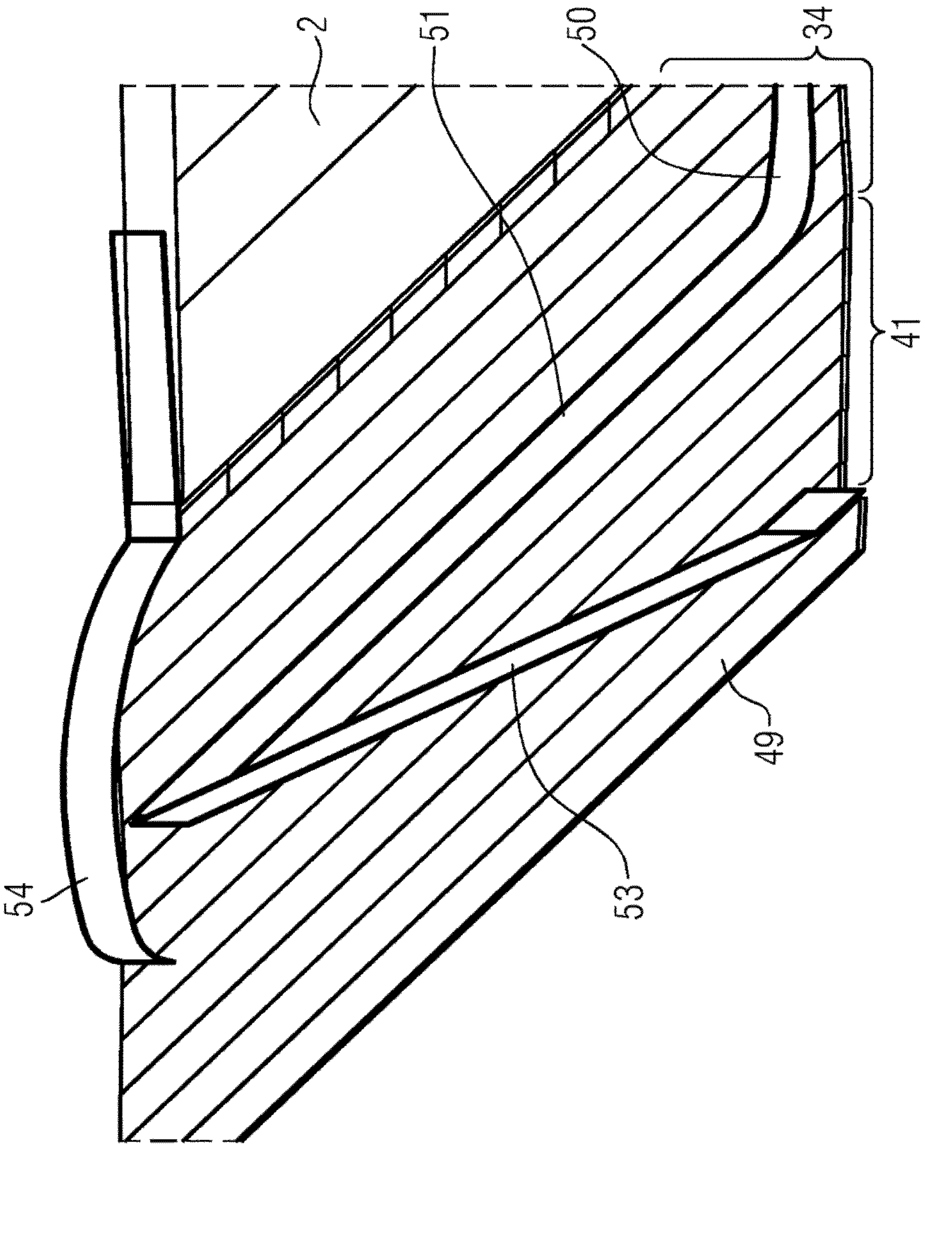
FIG. 4C shows a schematic oblique view of the second embodiment of the container discharge apparatus from above with a viewing direction in the first direction.

FIG. 4C shows a schematic oblique view of the second embodiment of the container discharge apparatus 33 from above with a viewing direction in the first direction 40. In addition to the first railing 50, the second railing 51, the third railing 53, and the concave railing 54, the first conveyors 35-39, the second conveyors 42-47, and the third conveyor 49 can be seen.

Figure 4D:
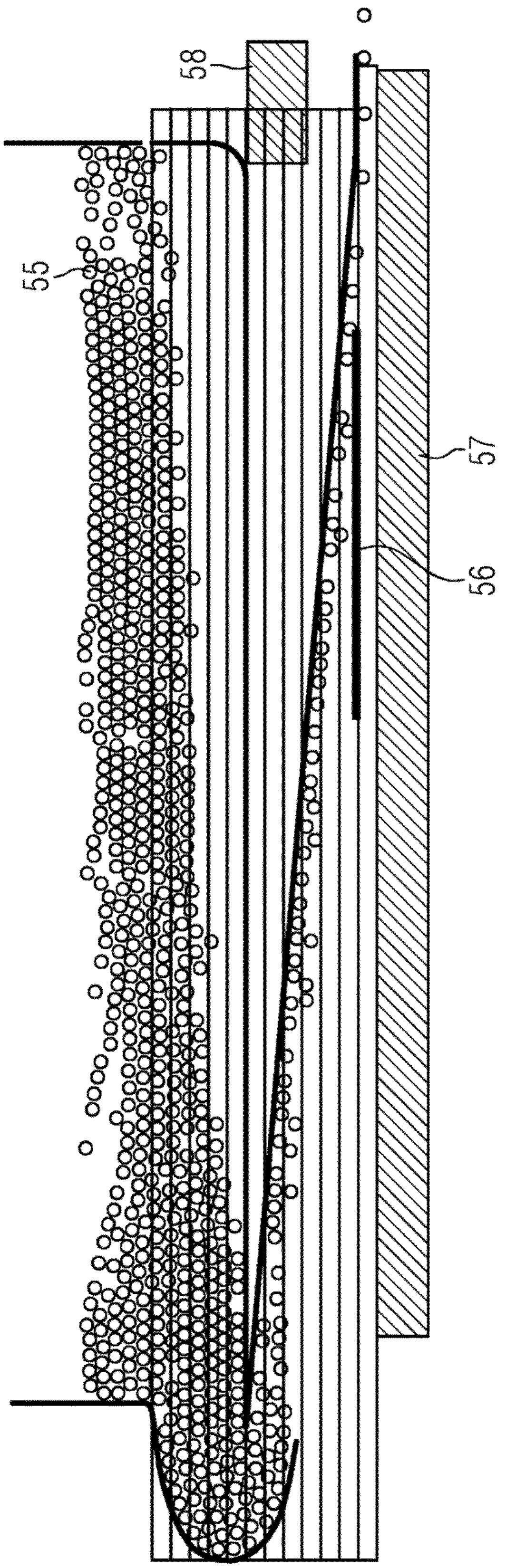
FIG. 4D shows a schematic plan view of the second embodiment of the container discharge apparatus with containers arranged therein.

FIG. 4D shows a schematic plan view of the second embodiment of the container discharge apparatus with containers 55 located therein. Due to the transport of containers 55 by means of the first conveyors 35-39 in the first direction 40, the containers jostle at the end of the first conveyors 35-39 and as a result, and due to the concave railing 54, reach the transition region 52 and move towards the second conveyors 42-47, by which they are moved in the second direction 48. Due to the third railing 53 and the transport in the second direction 47 by the second conveyors 42-47, the containers 55 are transported towards the third conveyor 49, which can transport away the separated containers 55.

Optionally, the container discharge apparatus 33 can comprise a flexible element 56 arranged in a region between the second conveyor 47 and the third conveyor 49. A first collecting apparatus 57 can be provided parallel below and next to the third conveyor 49. A second collecting apparatus 58 can be provided arranged partly below the end of the second conveyors 42-44.

Figure 5A:
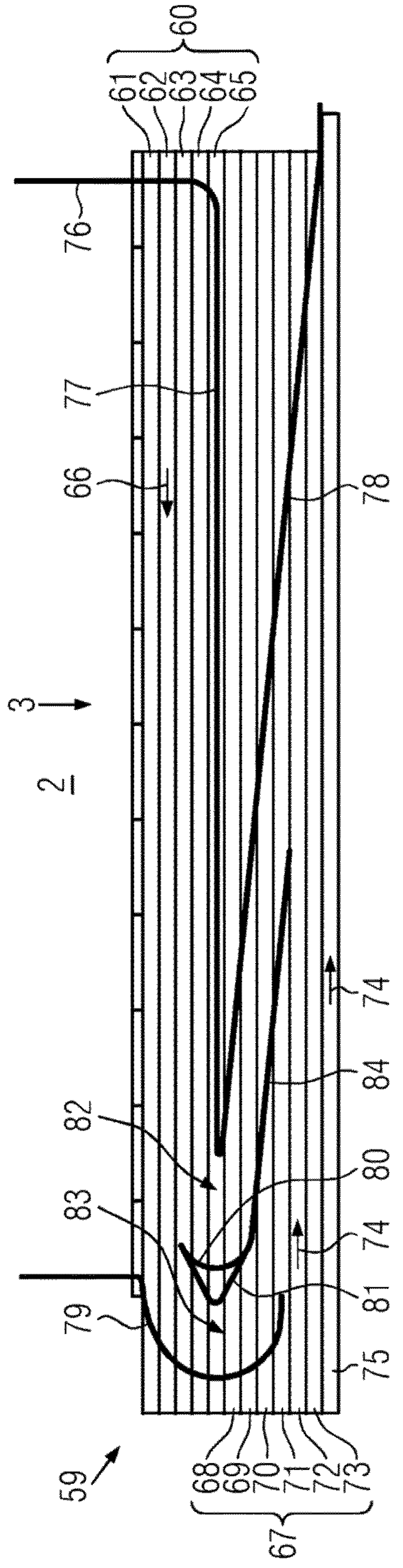
FIG. 5A shows a schematic plan view of a third embodiment of the container discharge apparatus.

FIG. 5A shows a schematic plan view of a third embodiment of the container discharge apparatus 59 for discharging containers from the buffer 2 described above, and for separating the containers. The container discharge apparatus 59 comprises, downstream of the buffer 2, a first group 60 of, here, five first conveyors 61, 62, 63, 64, 65 arranged in parallel, which can be driven in a first direction 66 transverse to the transport direction 3 of the buffer 2. The first conveyors 61-65 are designed such that they can separate containers and convey them in the first direction 66.

Furthermore, the container discharge apparatus 59 comprises, following in parallel the first group 60, a second group 67 of, here, six second conveyors 68, 69, 70, 71, 72, 73 arranged in parallel, which can be driven in a second direction 74. The second direction 74 is opposite the first direction 66. The second conveyors 68-73 are designed such that they can convey the separated containers in the second direction 74.

In addition, the container discharge apparatus 59 here comprises a third conveyor 75 which is designed such that it can transport the separated containers away in the second direction 74.

At the beginning of the first conveyors 61-65, a first railing 76 is arranged above the transport surfaces of the first conveyors 61-65, the straight portion of which railing extends transversely to the first conveyors 61-65, with a 90° curve following the straight portion.

Above the transport surfaces, a second railing 77 is provided between the first group 60 and the second group 67, which railing is straight and designed in such a way that there is a transition region for containers between the first group 60 and the second group 67. The second railing 77 is connected to the first railing 76.

A third railing 78 is provided above the transport surfaces of the second conveyors 68-73, which railing leaves the transition region free and extends to the third conveyor 75. The third railing 78 is straight and is connected to the second railing 77.

At the end of the five first conveyors 61-65 and at the beginning of four of the six second conveyors 68-71, a first concave railing 79 is provided above the transport surfaces. Here, the first concave railing 79 comprises a curve that describes an angle of 180°.

The transition region is divided by a second concave railing 80 into a first partial transition region 82 and a second partial transition region 83, wherein the second concave railing 80 is arranged above three of the first conveyors 63, 64, 65 and two of the second conveyors 68, 69. The second concave railing 80 is triangularly tapered on the surface 81 opposite the concave surface. Following the end of the second concave railing 80, which is located above the second conveyor 69, a fourth railing 84 is provided which extends parallel to the third railing 78 and up to the second conveyor 72.

Figure 5B:
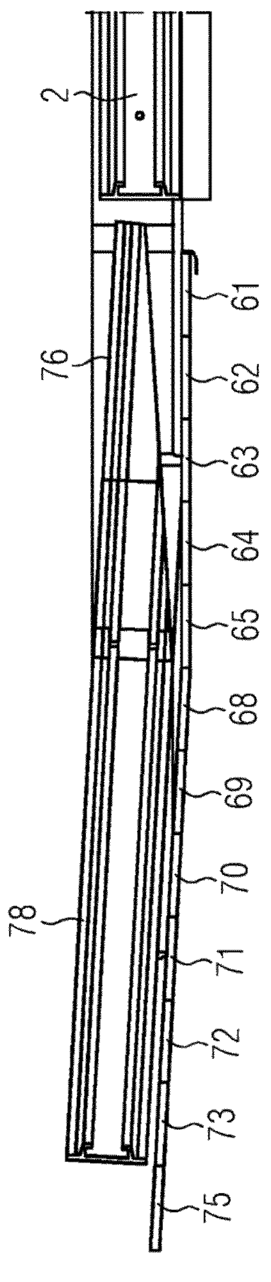
FIG. 5B shows a schematic side view of the third embodiment of the container discharge apparatus.

FIG. 5B shows a schematic side view of the third embodiment of the container discharge apparatus 59, viewed in the first direction 66. In addition to the first railing 76 and the third railing 78, the first conveyors 361-65, the second conveyors 68-73, and the third conveyor 75 can be seen.

The transport surfaces of the first conveyors 61-65 are arranged without steps in adjacent regions, and the individual transport surfaces enclose an angle of 0° with a plane perpendicular to the direction of action of gravity.

The transport surface of the first conveyor 65 and the transport surface of the second conveyor 68 are arranged without steps in adjacent regions.

The transport surfaces of the second conveyors 68-73 are arranged without steps in adjacent regions, and the individual transport surfaces enclose an angle of +15° with a plane perpendicular to the direction of action of gravity.

The transport surface of the third conveyor 75 encloses an angle of +15° with a plane perpendicular to the direction of action of gravity.

Figure 5C:
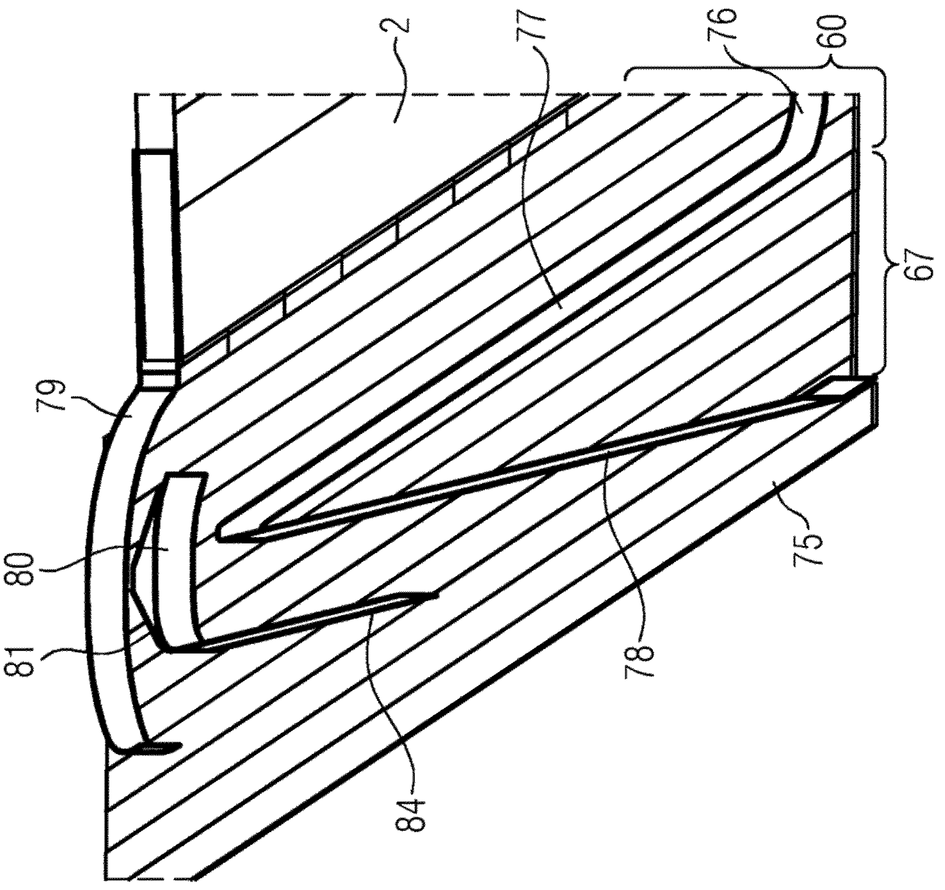
FIG. 5C shows a schematic oblique view of the third embodiment of the container discharge apparatus from above with a viewing direction in the first direction.

FIG. 5C shows a schematic oblique view of the third embodiment of the container discharge apparatus 59 from above with a viewing direction in the first direction 66. In addition to the first railing 76, the second railing 77, the third railing 78, the first concave railing 79, the second concave railing 80 with a triangular tapered surface 81, and the fourth railing 84, the first conveyors 61-65, the second conveyors 68-73, and the third conveyor 75 can be seen.

Figure 5D:
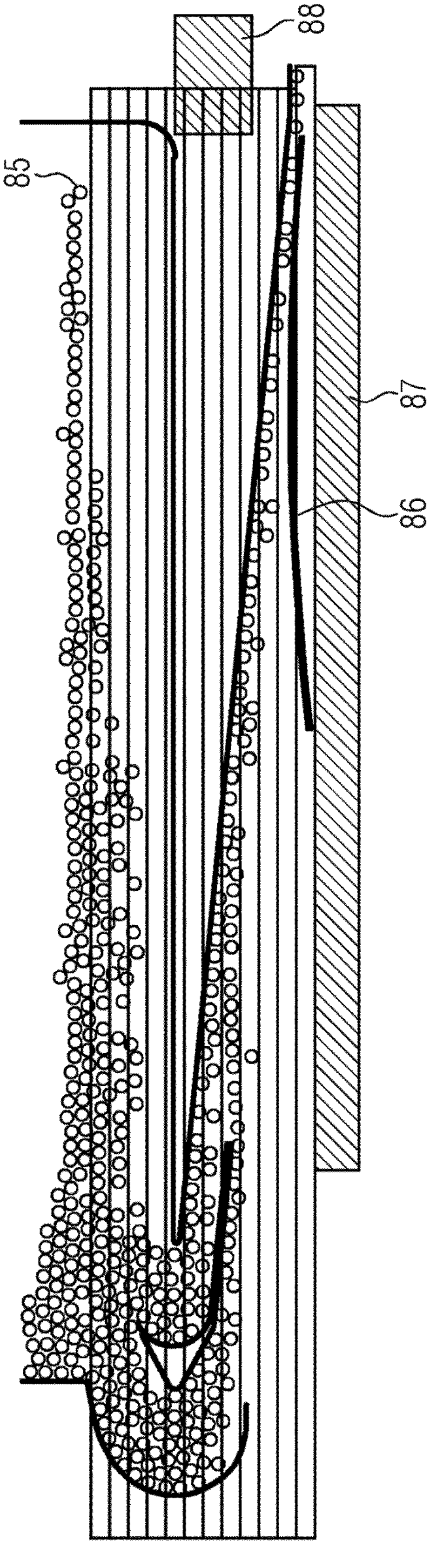
FIG. 5D shows a schematic plan view of the third embodiment of the container discharge apparatus with containers arranged therein.

FIG. 5D shows a schematic plan view of the third embodiment of the container discharge apparatus 59 with containers 85 arranged therein. Due to the transporting of containers 85 by means of the first conveyors 61-65 in the first direction 66, the containers (i) jostle at the second concave railing 80 and as a result reach the first partial transition region 82 and move towards the second conveyors 68-73, and (ii) jostle at the end of the first conveyors 61-65 and as a result, and due to the concave railing 79 and the triangularly tapering surface 81, reach the second partial transition region 83 and move towards the second conveyors 68-73, by which they are moved in the second direction 74. Due to the third railing 78, the fourth railing 84, and the transport in the second direction 74 by the second conveyors 68-73, the containers 85 are transported towards the third conveyor 75, which can transport the separated containers 85 away.

Optionally, the container discharge apparatus 59 can comprise a flexible element 86, which is arranged partially above the second conveyor 73 and the third conveyor 75. A first collecting apparatus 87 can be provided parallel below and next to the third conveyor 75. A second collecting apparatus 88 can be provided arranged partly below the end of the second conveyors 68-71.

Figure 6A:
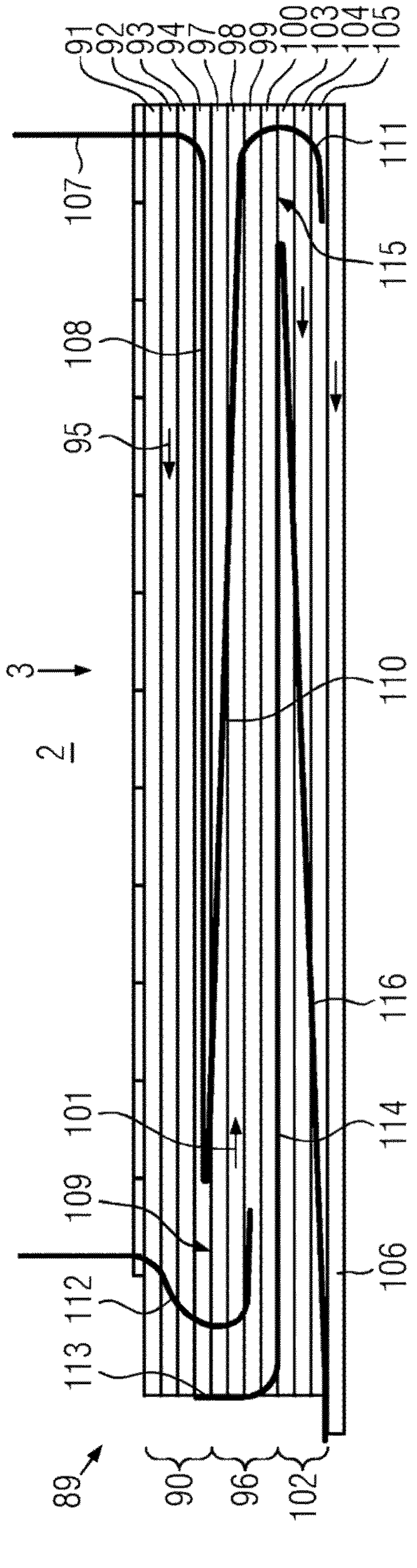
FIG. 6A shows a schematic plan view of a fourth embodiment of the container discharge apparatus.

FIG. 6A shows a schematic plan view of a fourth embodiment of the container discharge apparatus 89 for discharging containers from the buffer 2 described above, and for separating the containers. The container discharge apparatus 89 comprises, downstream of the buffer 2, a first group 90 of, here, four first conveyors 91, 92, 93, 94 arranged in parallel, which can be driven in a first direction 95 transverse to the transport direction 3 of the buffer 2. The first conveyors 91-94 are designed such that they can separate containers and convey them in the first direction 95.

Furthermore, the container discharge apparatus 89 comprises, following in parallel the first group 90, a second group 96 of, here, four second conveyors 97, 98, 99, 100 arranged in parallel, which can be driven in a second direction 101. The second direction 101 is opposite the first direction 95. The second conveyors 97-100 are designed such that they can convey the separated containers in the second direction 101.

Furthermore, the container discharge apparatus 89 comprises, following in parallel the first group 96, a third group 102 of, here, three third conveyors 103, 104, 105 arranged in parallel, which can be driven in the first direction 95. The third conveyors 103-105 are designed in such a way that they can convey the separated containers in the first direction 95.

Furthermore, the container discharge apparatus 89 comprises a fourth conveyor 106, which is designed such that it can transport away the separated containers in the first direction 95.

At the beginning of the first conveyors 91-94, a first railing 107 is arranged above the transport surfaces of the first conveyors 91-94, the straight portion of which railing extends transversely to the first conveyors 91-94, with a 90° curve following the straight portion.

Above the transport surfaces, a second railing 108 is provided between the first group 90 and the second group 96, which railing is straight and is designed such that there is a first transition region 109 for containers between the first group 90 and the second group 96. The second railing 108 is connected to the first railing 107.

A third railing 110 is provided above the transport surfaces of the second conveyors 97-100, which railing leaves the first transition region 109 free and extends to the second conveyor 98. The third railing 110 is straight and is connected to the second railing 108. A first concave railing 111 is provided downstream of the third railing 110. Here, the concave railing 111 comprises a curve that describes an angle of 180°. The concave railing 111 extends to the third conveyor 105.

At the end of the first conveyors 91-94 and at the beginning of three of the second conveyors 97-99, a second concave railing 112 is provided above the transport surfaces. Here, the second concave railing 112 comprises a curve that describes an angle of 180°.

At the beginning of the second conveyors 97-100, a first railing 113 is arranged above the transport surfaces of the second conveyors 97-100, the straight portion of which railing extends transversely to the second conveyors 97-100, with a 90° curve following the straight portion.

Above the transport surfaces, a fifth railing 114 is provided between the second group 96 and the third group 102, which railing is straight and is designed such that there is a second transition region 115 for containers between the second group 96 and the third group 102. The fifth railing 114 is connected to the fourth railing 113.

Above the transport surfaces of the third conveyors 103-105, a fifth railing 116 is provided, which leaves the second transition region 115 free and extends to the fourth conveyor 106. The fifth railing 116 is straight and is connected to the fourth railing 114.

Figure 6B:
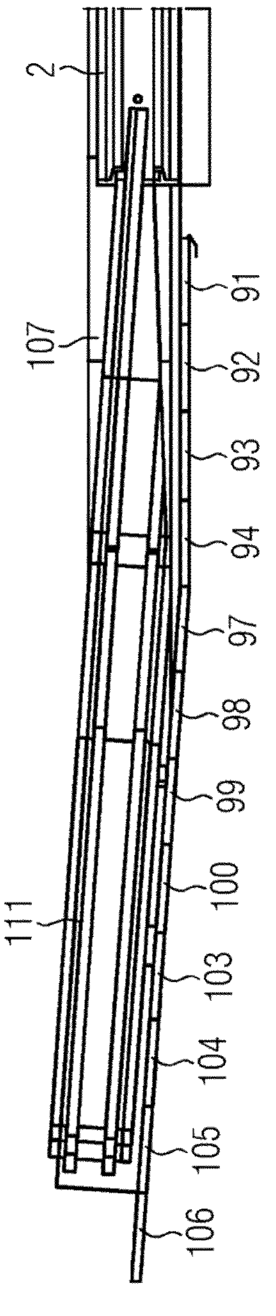
FIG. 6B shows a schematic side view of the fourth embodiment of the container discharge apparatus.

FIG. 6B shows a schematic side view of the fourth embodiment of the container discharge apparatus 89, viewed in the first direction 95. In addition to the first railing 107 and the first concave railing 111, the first conveyors 91-94, the second conveyors 97-100, the third conveyors 103-105, and the fourth conveyors 106 can be seen.

The transport surfaces of the first conveyors 91-94 are arranged without steps in adjacent regions, and the individual transport surfaces enclose an angle of 0° with a plane perpendicular to the direction of action of gravity.

The transport surface of the first conveyor 94 and the transport surface of the second conveyor 97 are arranged without steps in adjacent regions.

The transport surfaces of the second conveyors 97-100 are arranged without steps in adjacent regions, and the individual transport surfaces enclose an angle of +10° with a plane perpendicular to the direction of action of gravity.

The transport surface of the second conveyor 100 and the transport surface of the third conveyor 103 are arranged without steps in adjacent regions.

The transport surfaces of the third conveyors 103-105 are arranged without steps in adjacent regions, and the individual transport surfaces enclose an angle of +10° with a plane perpendicular to the direction of action of gravity.

The transport surface of the third conveyor 105 and the transport surface of the fourth conveyor 106 are arranged without steps in adjacent regions.

The transport surface of the fourth conveyor 106 encloses an angle of +10° with a plane perpendicular to the direction of action of gravity.

Figure 6C:
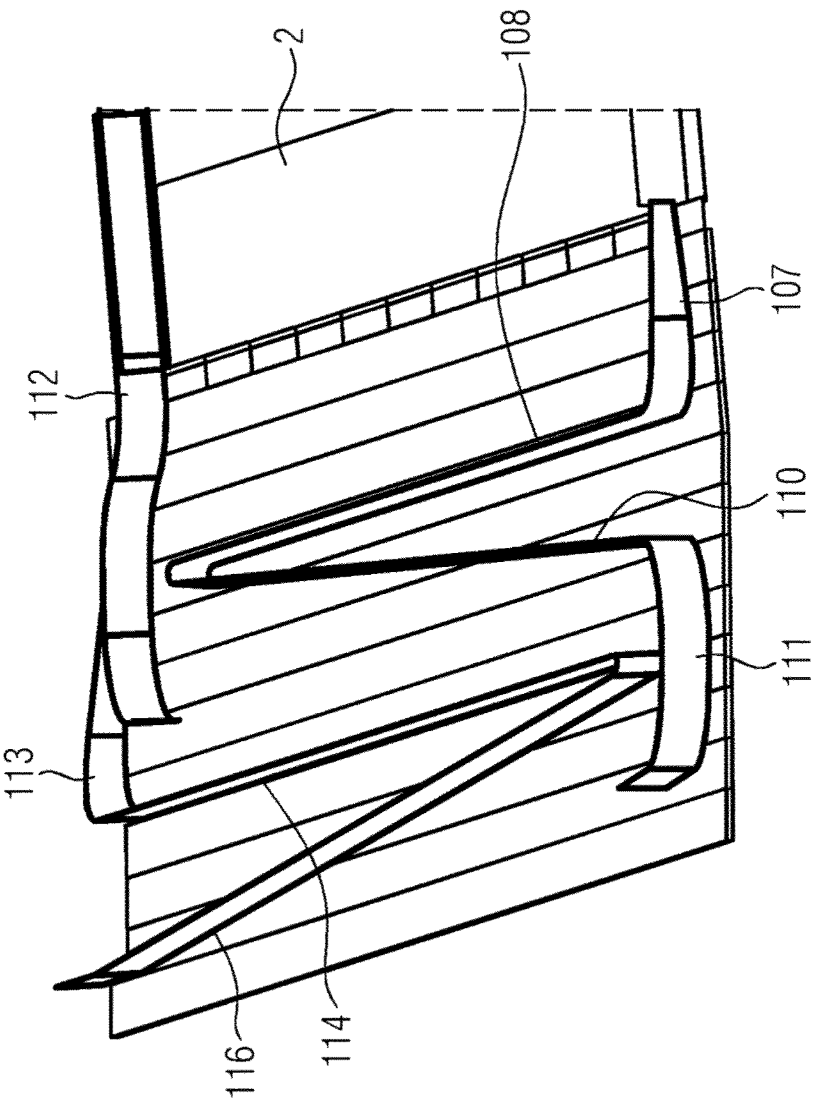
FIG. 6C shows a schematic oblique view of the fourth embodiment of the container discharge apparatus from above with a viewing direction in the first direction.

FIG. 6C shows a schematic oblique view of the fourth embodiment of the container discharge apparatus 89 from above with a viewing direction in the first direction 95. In addition to the first railing 107, the second railing 108, the third railing 110, the first concave railing 111, the second concave railing 112, the fourth railing 113, the fifth railing 114, and the sixth railing 116, the first conveyors 91-94, the second conveyors 97-100, the third conveyors 103-105, and the fourth conveyor 106 can be seen.

Figure 6D:
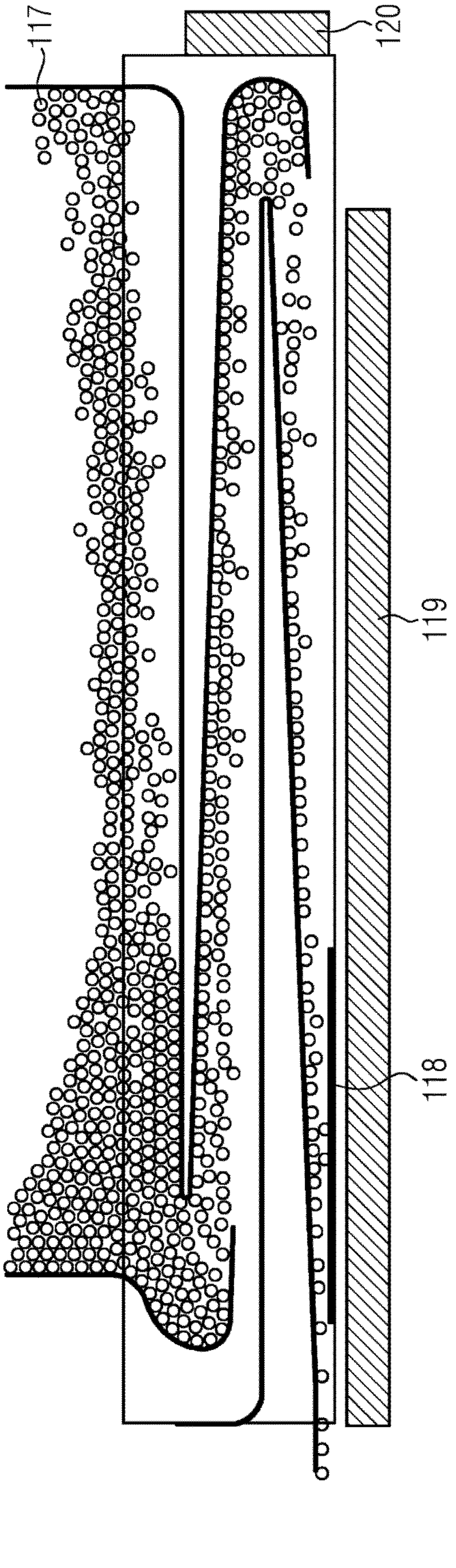
FIG. 6D shows a schematic plan view of the fourth embodiment of the container discharge apparatus with containers arranged therein.

FIG. 6D shows a schematic plan view of the fourth embodiment of the container discharge apparatus 89 with containers 117 located therein. Due to the transport of containers 117 by means of the first conveyors 91-94 in the first direction 95, the containers 117 jostle at the end of the first conveyors 91-94 and as a result, and due to the first concave railing 111, reach the first transition region 109 and move towards the second conveyors 97-100, by which they are moved in the second direction 101. Due to the third railing 110 and the transport in the second direction 101 by the second conveyors 97-100, the containers 117 are transported towards the third conveyors 103-105.

At the end of the second conveyors 97-100, the containers 117 jostle and as a result, and due to the second concave railing 112, reach the second transition region 115 and move towards the third conveyors 9103-105, by which they are moved in the first direction 95. Due to the fifth railing 116 and the transport in the first direction 95 by the third conveyors 103-105, the containers 117 are transported towards the fourth conveyor 106.

Optionally, the container discharge apparatus 89 can include a flexible element 118 arranged in a region between the third conveyor 105 and the fourth conveyor 106. A first collecting apparatus 119 can be provided parallel below and next to the fourth conveyor 106. A second collecting apparatus 120 can be provided arranged partly below the end of the second conveyors 97-100 and of the third conveyors 103-105.

Figure 7A:
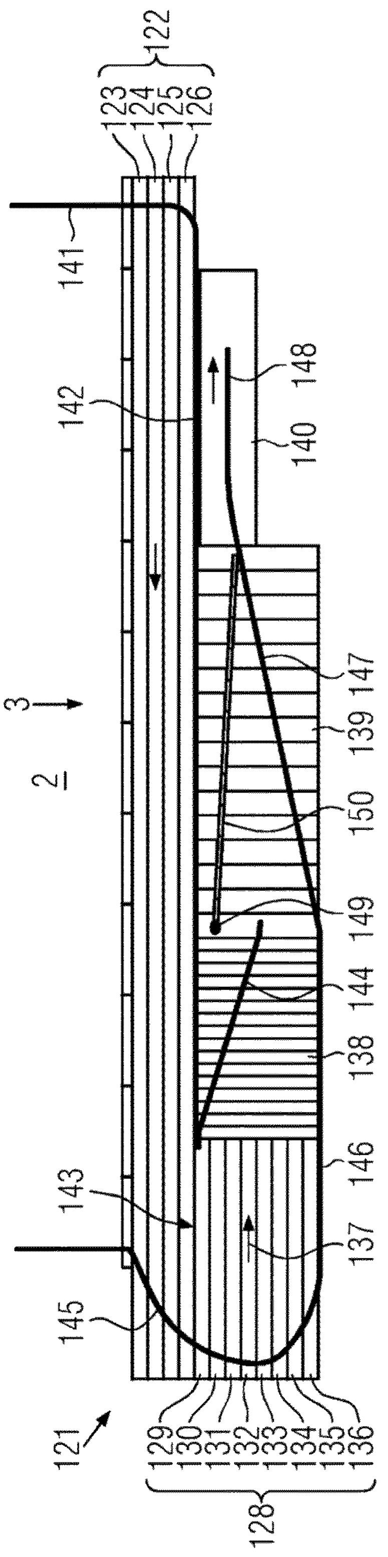
FIG. 7A shows a schematic plan view of a fifth embodiment of the container discharge apparatus.

FIG. 7A shows a schematic plan view of a fifth embodiment of the container discharge apparatus 121 for discharging containers from the buffer 2 described above, and for separating the containers. The container discharge apparatus 121 comprises, downstream of the buffer 2, a first group 122 of, here, four first conveyors 123, 124, 125, 126 arranged in parallel, which can be driven in a first direction 127 transverse to the transport direction 3 of the buffer 2. The first conveyors 123-126 are designed such that they can separate containers and convey them in the first direction 127.

Furthermore, the container discharge apparatus 121 comprises, following in parallel the first group 122, a second group 128 of, here, eight second conveyors 129, 130, 131, 132, 133, 134, 135, 136 arranged in parallel which can be driven in a second direction 137. The second direction 137 is opposite to the first direction 127. The second conveyors 129-136 are designed such that they can convey the separated containers in the second direction 137.

In addition, the container discharge apparatus 121 comprises, following the second conveyors 129-136, a first roller belt 138 arranged transversely thereto and, following the first roller belt 138, a second roller belt 139, also arranged transversely to the second conveyors 129-136. Following the second roller belt 139, there is arranged a third conveyor 140, which can be driven in the second direction 137 and which is designed such that it can transport away the separated containers in the second direction 137.

At the beginning of the first conveyors 123-126, a first railing 141 is arranged above the transport surfaces of the first conveyors 123-126, the straight portion of which railing extends transversely to the first conveyors 123-126, with a 90° curve following the straight portion.

Above the transport surfaces, a second railing 142 is provided between the first group 122 and the second group 128, which railing is straight and is designed in such a way that a transition region 143 for containers is provided between the first group 122 and the second group 128. The second railing 142 is connected to the first railing 141.

A third railing 144 is provided above the transport surfaces of the first roller belt 138, which third railing is oriented obliquely over the one half of the first roller belt 138 and extends up to the second roller belt 139. The third railing 144 is straight and is connected to the second railing 142.

At the end of the first conveyors 123-126 and at the beginning of the second conveyors 129-136, a concave railing 145 is provided above the transport surfaces. Here, the concave railing 145 comprises a curve that describes an angle of 180°. Following the concave railing 145, a fourth railing 146 is arranged above and next to the second conveyor 136, which railing runs parallel to the second conveyor 136 and is straight. Following the fourth railing 146, there is arranged a fifth railing 147 which is oriented above the transport surfaces of the second roller belt 139 at an angle, over two-thirds of the second roller belt 139, and extends to above the third conveyor 140. Following the fifth railing 147, there is provided a sixth railing 148 which extends above the third conveyor 140 and is arranged parallel to the second railing 142.

In addition, a flexible element 150 is arranged above the transport surface of the second roller belt 139 in the region accessible for containers to be discharged and separated, which element is designed to be movable at one end about a pivot point 149.

Figure 7B:
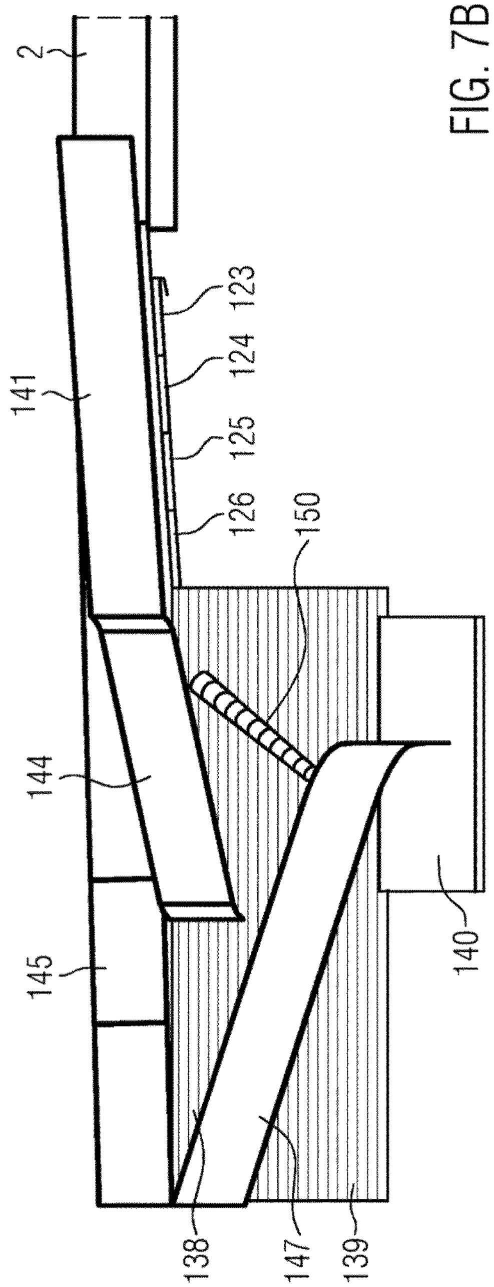
FIG. 7B shows a first schematic side view of the fifth embodiment of the container discharge apparatus.

FIG. 7B shows a schematic side view of the fifth embodiment of the container discharge apparatus 121, viewed in the first direction 127. In addition to the first railing 141, the third railing 144, the concave railing 145, the fifth railing 147, and the flexible element 150, the first conveyors 123-126, the first roller belt 138, the second roller belt 139, and the third conveyor 140 can be seen.

The transport surfaces of the first conveyors 123-126 are arranged without steps in adjacent regions, and the individual transport surfaces enclose an angle of −5° with a plane perpendicular to the direction of action of gravity.

The transport surface of the first conveyor 126 and the transport surface of the second conveyor 129 are arranged without steps in adjacent regions.

The transport surfaces of the second conveyors 129-1367 are arranged without steps in adjacent regions, and the individual transport surfaces enclose an angle of 0° with a plane perpendicular to the direction of action of gravity.

The transport surfaces of the first roller belt 138, the second roller belt 139, and the third conveyor 140 enclose an angle of −15° with a plane perpendicular to the direction of action of gravity.

Figure 7C:
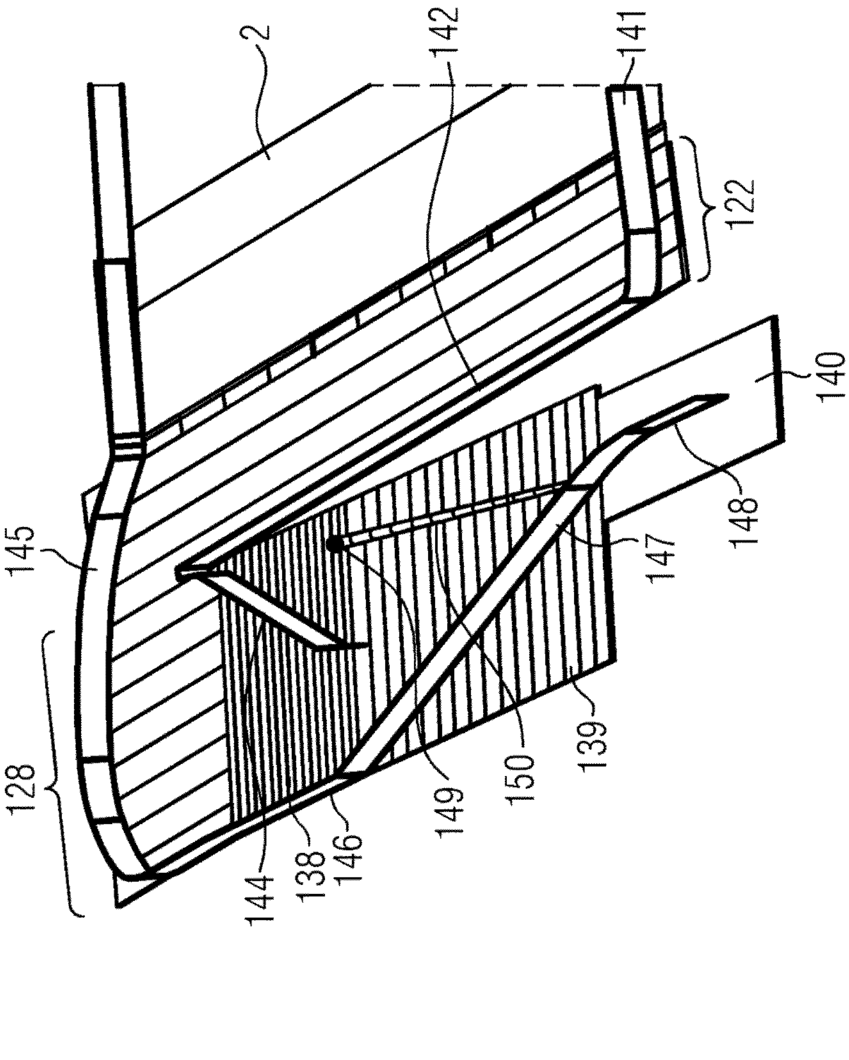
FIG. 7C shows a schematic oblique view of the fifth embodiment of the container discharge apparatus from above with a viewing direction in the first direction.

FIG. 7C shows a schematic oblique view of the fifth embodiment of the container discharge apparatus 121 from above, with a viewing direction in the first direction 127. In addition to the first railing 141, the second railing 142, the third railing 144, the concave railing 145, the fourth railing 146, the fifth railing 147, the sixth railing 148, and the flexible element 150, the first conveyors 123-126, the second conveyors 129-136, the first roller belt 138, the second roller belt 139, and the third conveyor 140 can be seen.

Figure 7D:
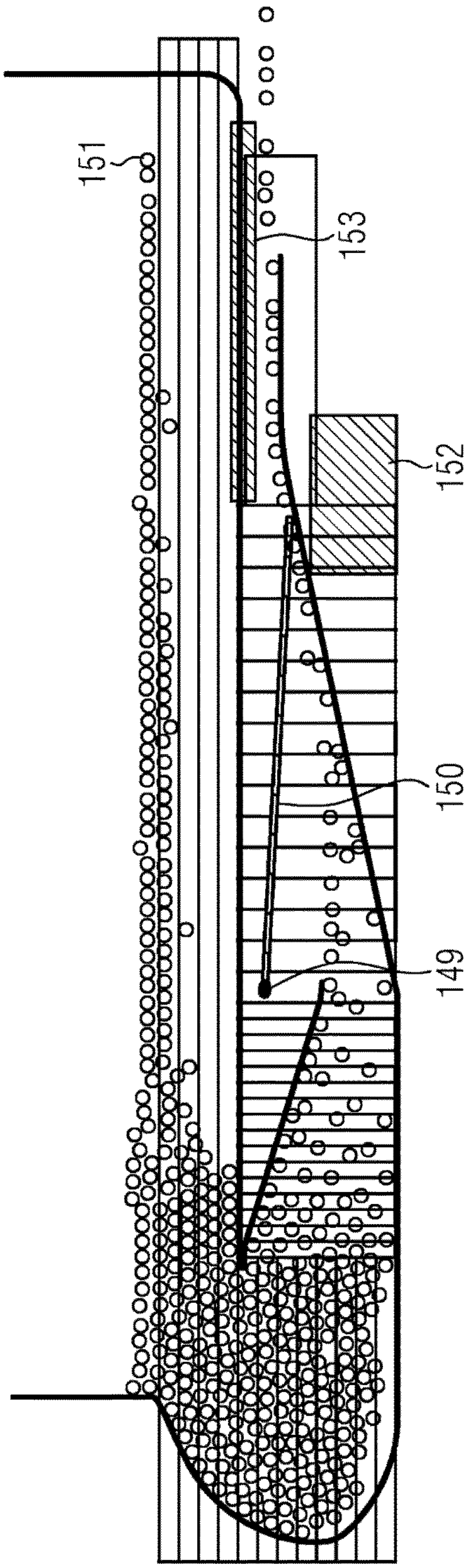
FIG. 7D shows a schematic plan view of the fifth embodiment of the container discharge apparatus with containers arranged therein.

FIG. 7D shows a schematic plan view of the fifth embodiment of the container discharge apparatus with containers 151 arranged therein. Due to the transport of containers 151 by means of the first conveyors 123-126 in the first direction 127, the containers 151 jostle at the end of the first conveyors 123-126 and as a result, and due to the concave railing 145, reach the transition region 143 and move towards the second conveyors 129-136, by which they are moved in the second direction 137. The containers 151 arrive at the first roller belt 138 and are transported due to their inclined arrangement and due to the third railing 144 and the fourth railing 146 to the second roller belt 139. On the second roller belt 139, the containers 151 are transported due to the inclined arrangement of the second roller belt and the fifth railing 147 to the third conveyor 140, which can transport the separated containers 151 away.

Optionally, the container discharge apparatus 121 can comprise a first collecting apparatus 152 below the end of the second roller belt. In addition, a second collecting apparatus 153 can be provided below the third conveyor 140, towards the first conveyors 123-126.

Figure 8A:
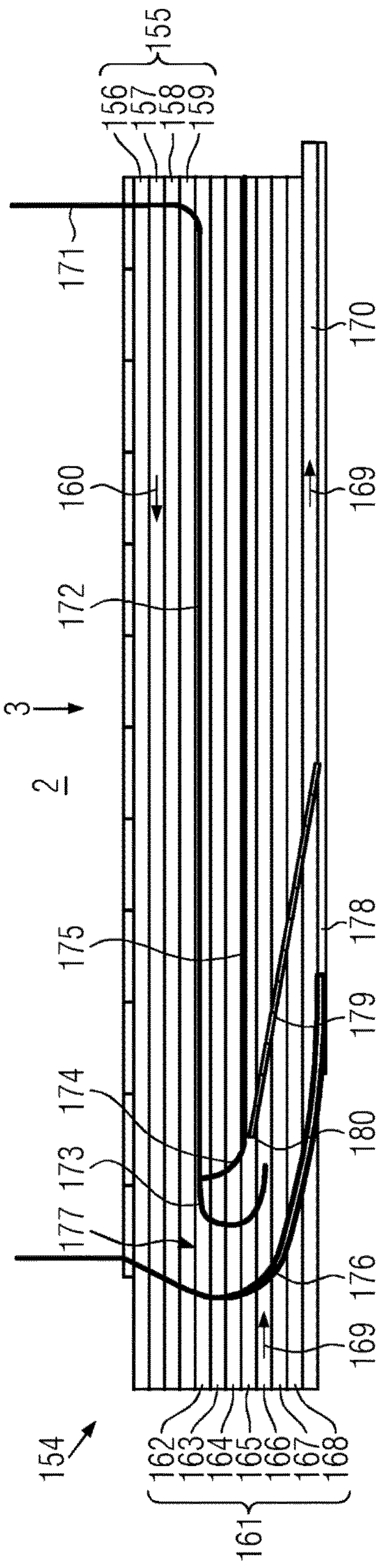
FIG. 8A shows a schematic plan view of a sixth embodiment of the container discharge apparatus.

FIG. 8A shows a schematic plan view of a sixth embodiment of the container discharge apparatus 154 for discharging containers from the above-described buffer 2 and for separating the containers. The container discharge apparatus 154 comprises, downstream of the buffer 2, a first group 155 of, here, four first conveyors 156, 157, 158, 159 arranged in parallel, which can be driven in a first direction 160 transverse to the transport direction 3 of the buffer 2. The first conveyors 156-159 are designed such that they can separate containers and convey them in the first direction 160.

Furthermore, the container discharge apparatus 154 comprises, following in parallel the first group 155, a second group 161 of, here, seven second conveyors 162, 163, 164, 165, 166, 167, 168 arranged in parallel and which can be driven in a second direction 169. The second direction 169 is opposite to the first direction 160. The second conveyors 162-168 are designed such that they can convey the separated containers in the second direction 169.

In addition, the container discharge apparatus 154 here comprises a third conveyor 170 which is designed such that it can transport the separated containers away in the second direction 169.

At the beginning of the first conveyors 156-159, a first railing 171 is arranged above the transport surfaces of the first conveyors 156-159, the straight portion of which railing extends transversely to the first conveyors 156-159, with a 90° curve following the straight portion.

Above the transport surfaces, a second railing 172 is provided between the first group 155 and the second group 161, which railing is straight and is designed in such a way that a transition region 177 for containers is provided between the first group 155 and the second group 161. The second rail 172 is connected to the first rail 171. Following the second railing 172, above the transport surfaces of the second conveyors 162-166, there is arranged a convex railing 173, which is straight and is designed such that the transition region 177 for containers is provided between the first group 155 and the second group 161.

In addition, a curved railing 174 is arranged above the transport surfaces of the second conveyors 162-165, which railing is connected to the second railing 172. Following the curved railing 174, a third railing 175 is arranged above the transport surfaces of the second conveyor 165. The third railing is straight.

At the end of the first conveyors 156-159 and at the beginning of the second conveyors 162-168, a concave railing 176 is provided above the transport surfaces. Here, the concave railing 176 comprises a curve that describes an angle of 180°. Following the concave railing 176, a fourth railing 178 is provided which runs above and to the side of the third conveyor 170.

In addition, a flexible element 179 is arranged above the transport surfaces of the second conveyors 162-168 and the third conveyor 170, which element is designed to be movable at one end about a pivot point 180.

Figure 8B:
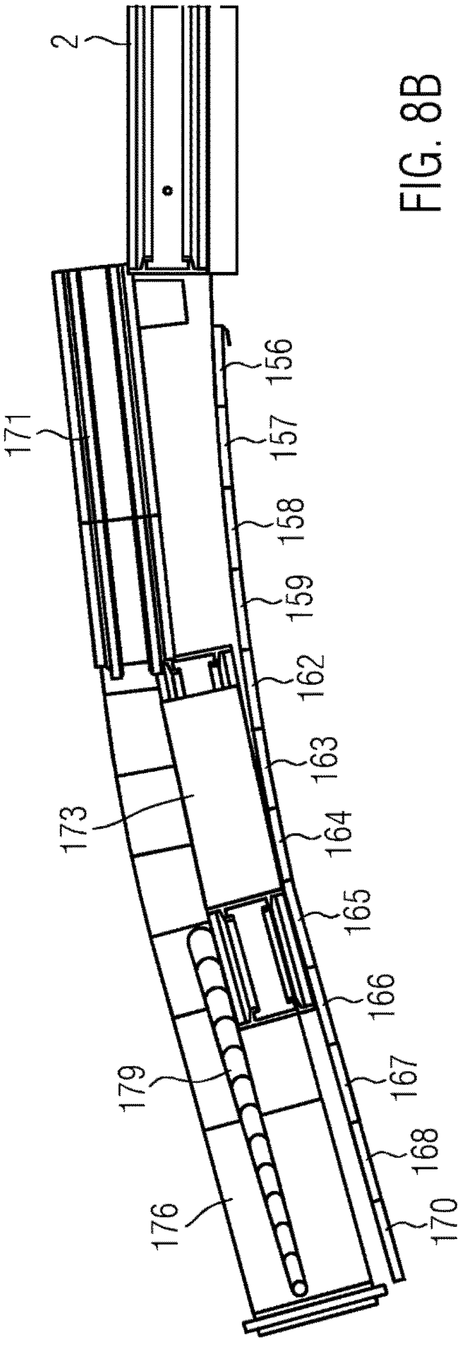
FIG. 8B shows a schematic side view of the sixth embodiment of the container discharge apparatus.

FIG. 8B shows a second schematic side view of the sixth embodiment of the container discharge apparatus 154, viewed in the first direction 160. In addition to the first railing 171, the convex railing 173, the concave railing 176, and the flexible element 179, the first conveyors 156-159, the second conveyors 162-168, and the third conveyor 170 can be seen.

The transport surfaces of the first conveyors 156-159 are arranged without steps in adjacent regions, and the individual transport surfaces enclose an angle of −15° with a plane perpendicular to the direction of action of gravity.

The transport surface of the first conveyor 159 and the transport surface of the second conveyor 162 are arranged without steps in adjacent regions.

The transport surfaces of the second conveyors 162-168 are arranged without steps in adjacent regions, and the individual transport surfaces enclose an angle of −30° with a plane perpendicular to the direction of action of gravity.

The transport surface of the third conveyor 170 encloses an angle of −30° with a plane perpendicular to the direction of action of gravity. The transport surface of the second conveyor 168 and the transport surface of the third conveyor 170 are arranged without steps in adjacent regions.

Figure 8C:
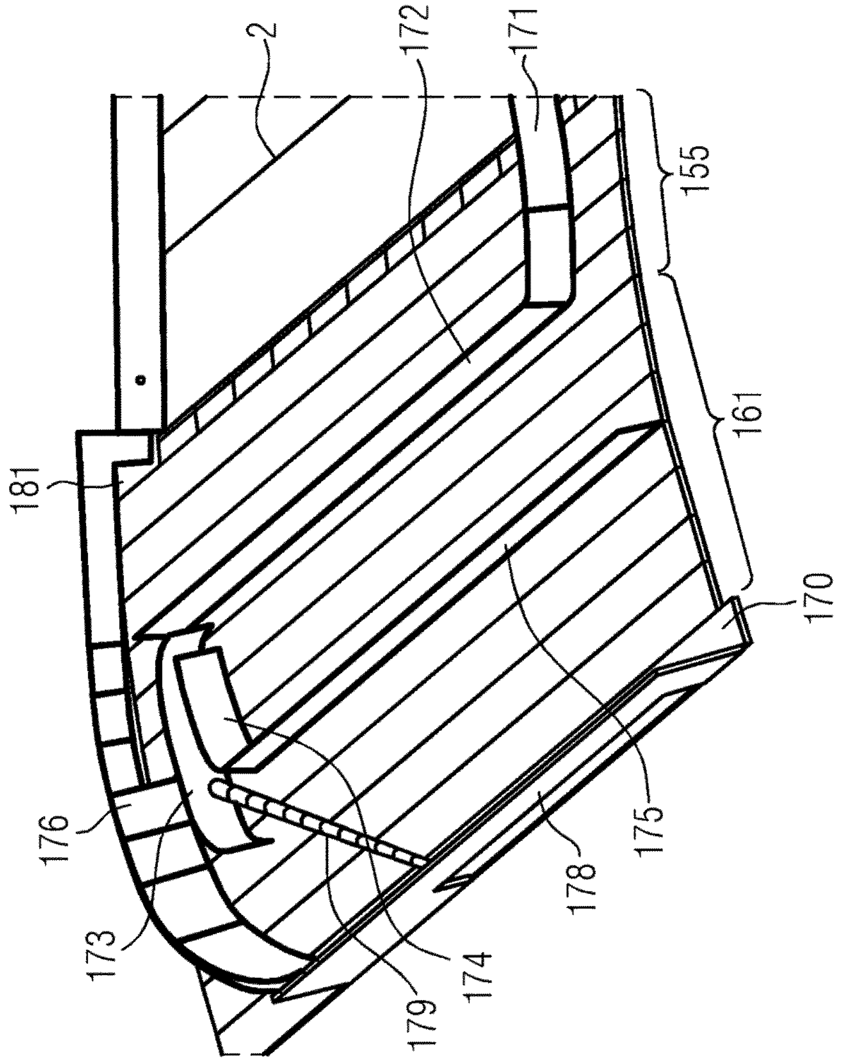
FIG. 8C shows a schematic oblique view of the sixth embodiment of the container discharge apparatus from above with a viewing direction in the first direction.

FIG. 8C shows a schematic oblique view of the sixth embodiment of the container discharge apparatus 154 from above with a viewing direction in the first direction 160. In addition to the first railing 171, the second railing 172, the convex railing 172, the bent railing 174, the third railing 175, the concave railing 176, and the fourth railing 178, the first conveyors 156-159, the second conveyors 162-168, and the third conveyor 170 can be seen. In addition, an opening 181 of the concave railing 176 is clearly visible, through which for example overturned containers or broken containers can be ejected.

Figure 8D:
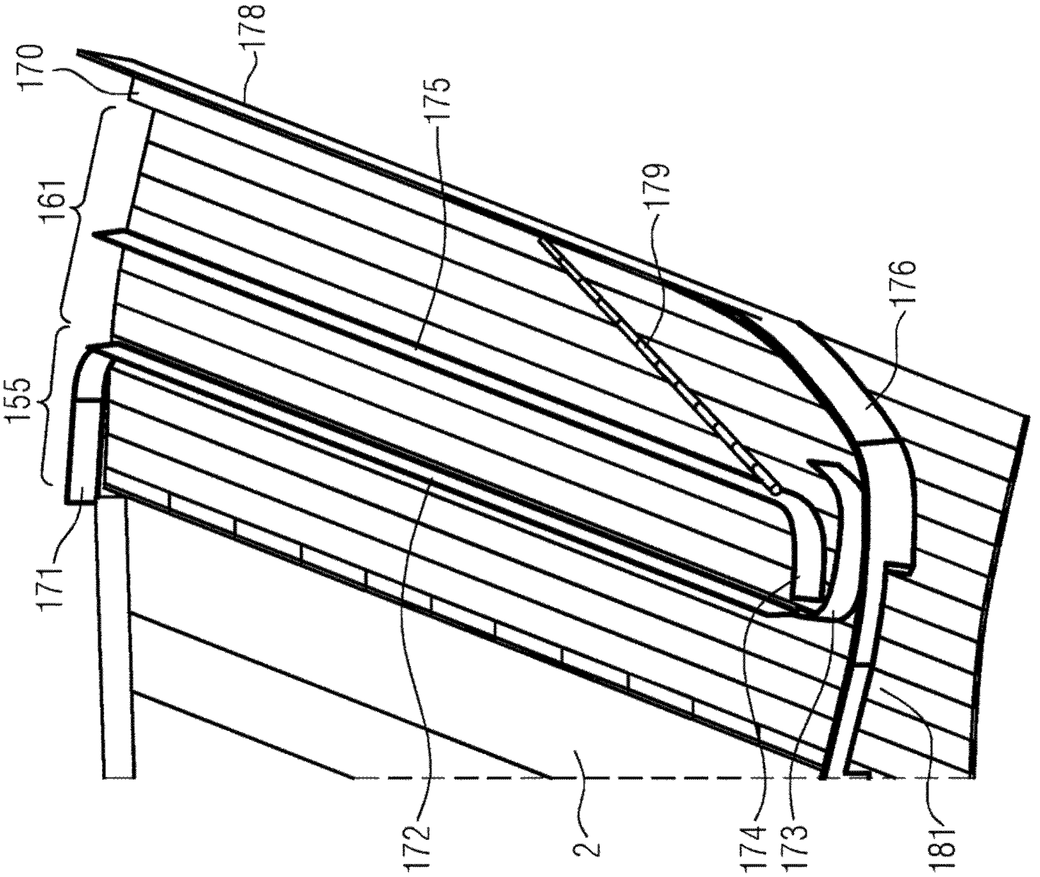
FIG. 8D shows a schematic oblique view of the sixth embodiment of the container discharge apparatus from above with a viewing direction in the first direction.

FIG. 8D shows a schematic oblique view of the sixth embodiment of the container discharge apparatus 154 from above, viewed in the second direction 169. In this representation as well, in addition to the first railing 171, the second railing 172, the convex railing 172, the bent railing 174, the third railing 175, the concave railing 176, and the fourth railing 178, the first conveyors 156-159, the second conveyors 162-168, and the third conveyor 170 can be seen. In addition, the opening 181 of the concave railing 176 is visible, through which for example overturned containers or broken containers can be ejected.

Figure 8E:
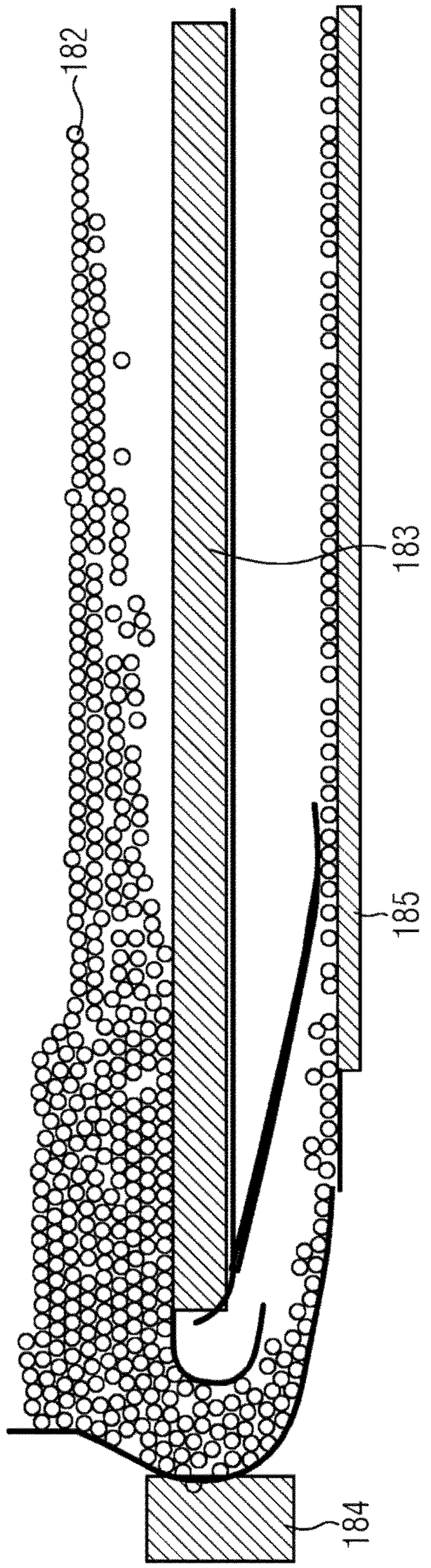
FIG. 8E shows a schematic plan view of the sixth embodiment of the container discharge apparatus with containers arranged therein.

FIG. 8E shows a schematic plan view of the sixth embodiment of the container discharge apparatus 154 with containers 182 located therein. Due to the transport of containers 182 by means of the first conveyors 156-159 in the first direction 160, the containers 182 jostle at the end of the first conveyors 156-159 and as a result, and due to the concave railing 176, reach the transition region 177 and move towards the second conveyors 162-168, by which they are moved in the second direction 169. Due to the convex railing 173, the curved railing 174, the third railing 175, and the fourth railing 178, and the transport in the second direction 169 by the second conveyors 162-168, the containers 182 are transported towards the third conveyor 170, which can transport away the separated containers 182.

Optionally, the container discharge apparatus 154 can comprise a first collecting device 183 which can be arranged below the region between the second railing 172 and the third railing 175. A second collecting apparatus 184 can be arranged partly below the beginning of the second conveyors 162-168. A third collecting apparatus 185 can be arranged partly below and to the side of the third conveyor 170.

Figure 9:
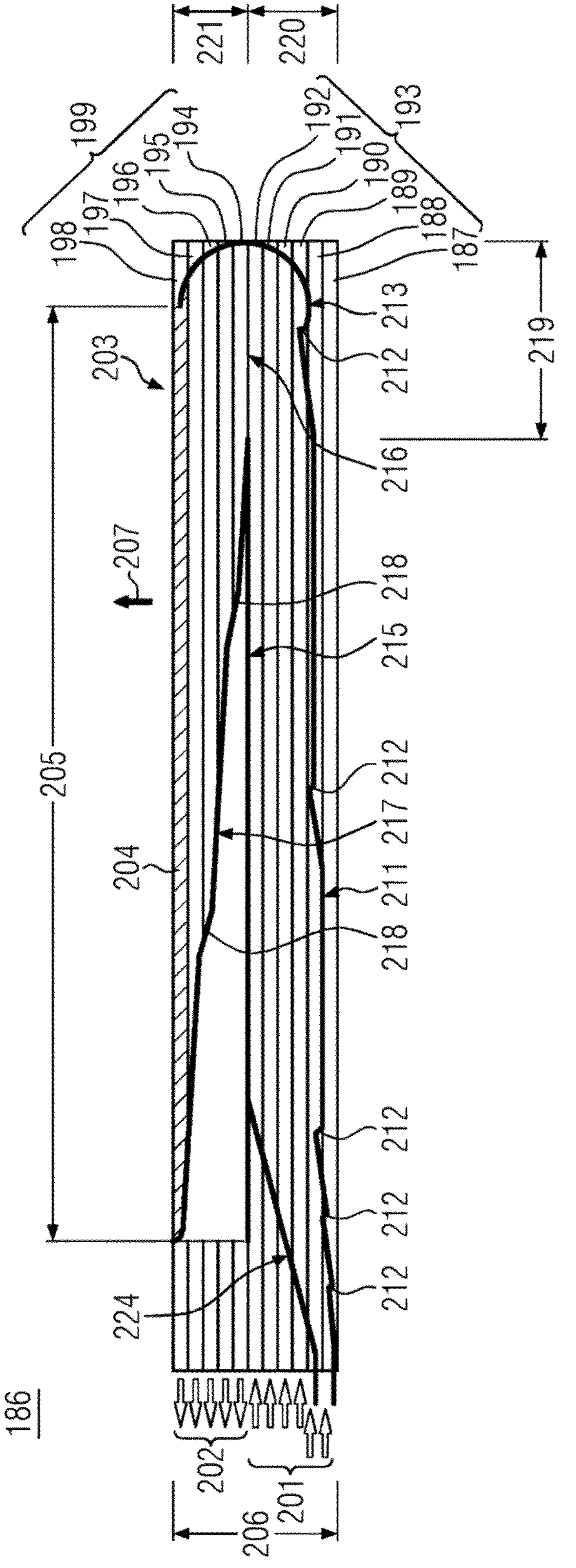
FIG. 9 shows a plan view of a schematic view of a first embodiment of a container feed apparatus.

FIG. 9 shows a top view of a schematic view of a first embodiment of a container feed apparatus 186 for feeding containers to a buffer 203.

The container feed apparatus 186 comprises a single-track infeed conveyor 187, which can be driven in a first direction 201 and can, for example, convey containers transported on its transport surface in the first direction.

A first group 193 of several first conveyors 188, 189, 190, 191, 192 arranged in parallel is provided parallel to the single-track infeed conveyor 187, each of which can be driven in the first direction 201. Containers can be conveyed in the first direction 201 on the respective transport surfaces of the first conveyors 188-192.

Following in parallel to the first group 193, a second group 199 of second conveyors 194, 195, 196, 197, 198 arranged in parallel is provided, which can be driven in a second direction 202. Containers can be conveyed in the second direction 202 on the respective transport surfaces of the second conveyors 194-198. The first and second directions 201, 202 are opposite to each other.

A railing 211 with five deflectors 212 is arranged above a transport surface of the single-track infeed conveyor 187 and the transport surfaces of the first and second of the first conveyors 188, 189. This railing 211 merges above the transportation surface of the end of the second of the first conveyors 189 into a concave railing 213, which is provided above the transportation surfaces at the end of the second, third, fourth and fifth of the first conveyors 189-192 and at the beginning of the first to fifth of the second conveyors 194-198. Here, the concave railing 213 comprises a curve that describes an angle of 180°.

Above the transport surfaces of the first and second group 193, 199, a straight railing 215 is provided between the first group 193 and the second group 199, which is designed in such a way that a transition region 216 for containers is provided between the first group 193 and the second group 199. Above the transportation surfaces of the first and second groups 193, 199 between the first group 193 and the second group 199 can mean above and between the transportation surface of the last of the first conveyors 192 and the first of the second conveyors 194.

The transition region 216, viewed along the first or second direction 201, 202, has a length 219 whose value is greater by a factor of 1.8 to 3 than a value of a conveying width 220, 221 of the first or second group 193, 199.

A railing 217 with two steps 218 is provided above the transport surfaces of the several parallel second conveyors 194-198, which leaves the transition area 216 free for the containers. The straight railing 215 merges into the railing 217 with the two steps 218.

Above the transport surfaces of the several parallel first conveyors 188-192, a further straight railing 224 is arranged, which extends from the single-track infeed conveyor 187 to the straight railing 217.

The containers can be discharged from the second group 199 by several second conveyors 194-198 arranged in parallel transversely to the second direction 202 in the direction 207 towards the buffer 203. For example, the containers can be discharged from the fifth of the second conveyors 198 transversely to the second direction 202 in the direction 207 towards the buffer 203.

A discharge region 204 (indicated by the hatching), in which the containers can be discharged from the fifth of the second conveyors 198 transversely to the second direction 202 in the direction 207 to the buffer 203, has a length 205 which is at least twice as large as a conveying width 206 of the container feed apparatus 186. The conveyor width 206 is made up of the sum of the conveyor widths 220, 221 of the single-track infeed conveyor 187, the first conveyors 188-192 and the second conveyors 194-198.

The drive speeds of the single-track infeed conveyor 187, the first conveyors 188-192 and the second conveyors 194-198 can be controlled individually by means of a control device (not shown). The mathematical amount of drive speeds starting from the single-track infeed conveyor 187 to the several parallel arranged first conveyors 188-192 can decrease in each case, the mathematical amount of drive speeds of the several parallel arranged second conveyors 194-198 can first increase and then decrease again.

A mathematical amount of a drive speed of the buffer 203 in the direction 207 may be the smallest.

Figure 10:
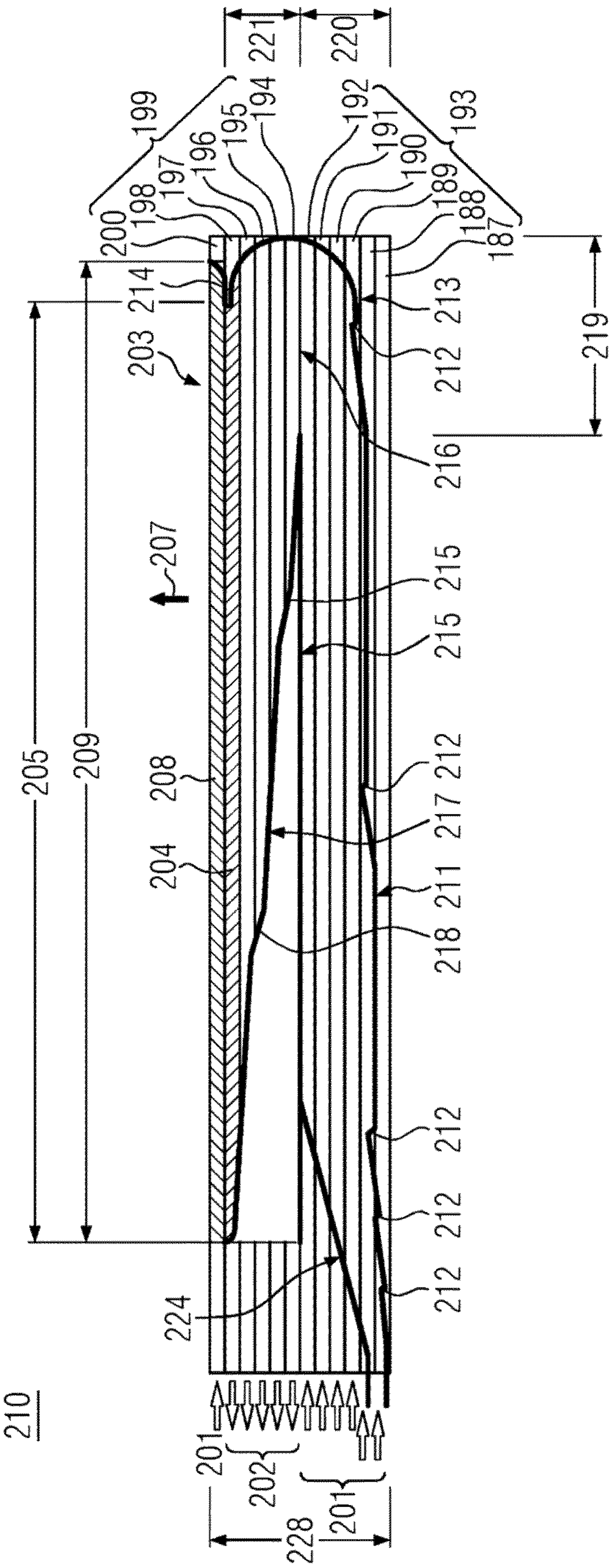
FIG. 10 shows a plan view of a schematic view of a second embodiment of a container feeding device.

FIG. 10 is a plan view of a second embodiment of a container feed apparatus 210. In FIG. 10, elements of the first embodiment of FIG. 9, which also occur in the second embodiment, are designated with the same reference signs. What is described with respect to the first embodiment also applies to these elements in the second embodiment; only the transition to the buffer 203 of the container feed apparatus 210 is different from that of the container feed apparatus 186.

In the second embodiment of the container feed apparatus 210, a further single-track infeed conveyor 200 is provided parallel downstream of the second group 199 of several second conveyors 194-198 arranged in parallel. Several further single-track infeed conveyors can also be provided next to each other, which connect to the second group. The further single-track infeed conveyor 200 is drivable in the first direction 201 and is designed to convey containers in the first direction 201, for example on a transport surface. Containers from the further single-track infeed conveyor 200 can be discharged transversely to the first direction 202 in the direction 207 to the buffer 203. The same applies if several additional single-track infeed conveyors are provided.

The further single-track infeed conveyor 200 comprises a feed length section 208 (indicated by the hatching), along which the containers can be fed from the further single-track infeed conveyor 200 to the buffer 203. The feed length region 208 has a length 209 that is at least twice as great as a conveyor width 228 of the container feed apparatus 210. The same applies if several additional single-track infeed conveyors are provided.

This conveyor width 228 is made up of the sum of the conveyor widths of the single-track infeed conveyor 187, the first conveyors 188-192, the second conveyors 194-198 and the further single-track infeed conveyor 200 or the several further single-track infeed conveyors. The conveyor widths can be measured perpendicular to the first or second direction.

The length 209 of the feed length portion 208 may be measured along the first or second direction 201, 202. The infeed length portion 208 extends along a portion of the transport surface of the further single-track infeed conveyor 200. Since the length 209 of the feed length section 208 is at least twice as large as the conveying width 228 of the container feed apparatus 210, the containers can be delivered to the buffer 203 without a high back pressure forming between the containers.

Above the transport surface at the end of the further single-track infeed conveyor 200, a further concave railing 214 is provided, which comprises a 90° bend. The further concave railing 214 merges into the concave railing 213.

Due to the further concave railing 214, containers that are discharged from the further single-track infeed conveyor 200 to the buffer 203 can also be easily discharged into an area of the buffer 203 that is opposite the end of the further single-track infeed conveyor 200 (in the illustration, the right-hand corner area of the buffer 203).

Figure 11:
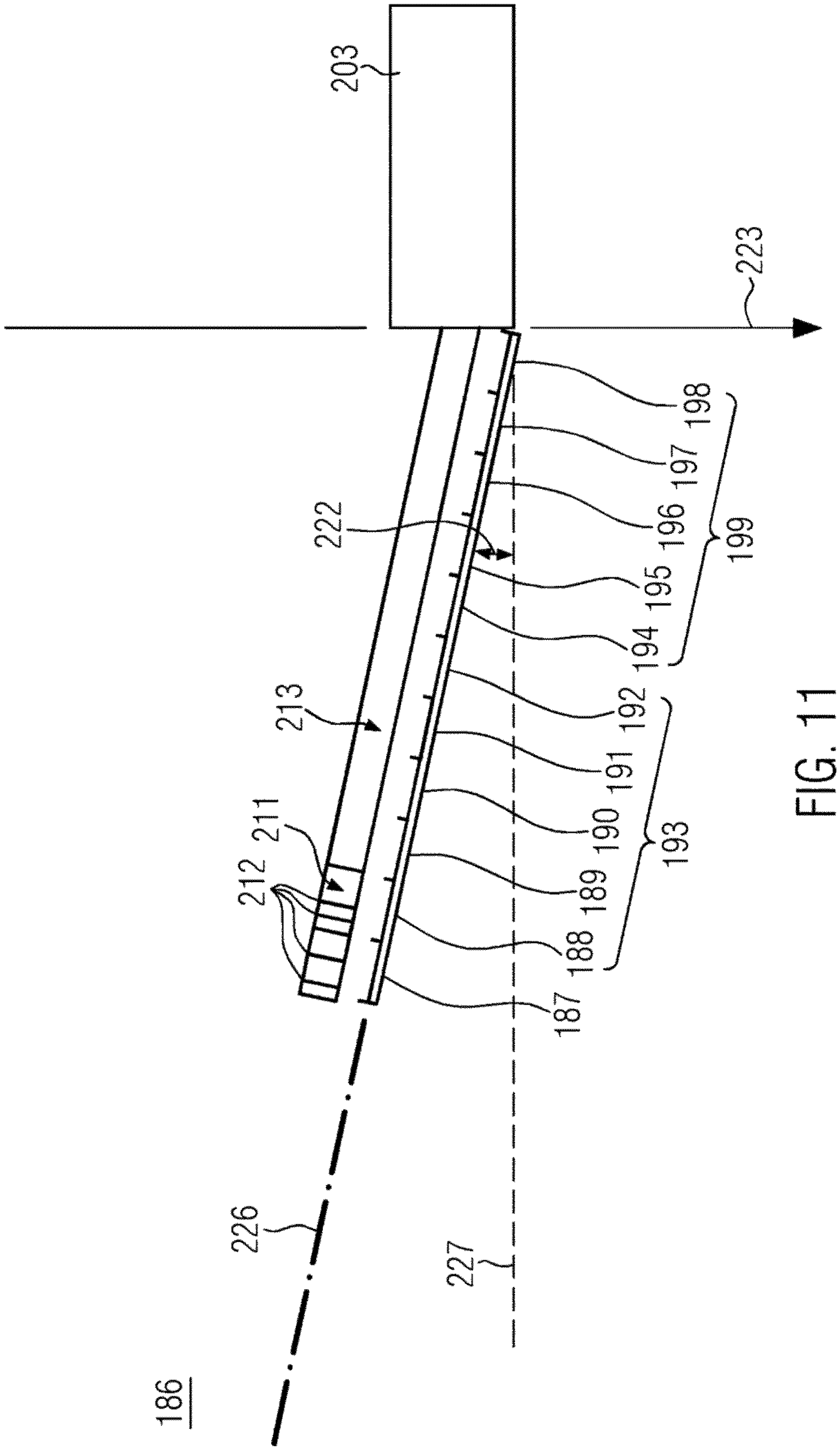
FIG. 11 shows a side view of FIG. 9 looking in the second direction, with the transport surfaces arranged in an inclined manner.

FIG. 11 shows a side view of FIG. 9 looking in the second direction 202, wherein the transport surfaces of the single-track infeed conveyor 187, the first conveyors 188-192 and the second conveyors 194-198 are arranged in an inclined manner. The transport surfaces are arranged coplanar in a plane 226. The plane 226 includes an angle 222 with a plane 227 perpendicular to the direction of action 223 of gravity, which can lie in a range from 0.5° to 14° (range limits included), or for example an angle from 0.5° to 11°, or for example an angle from 0.5° to 8°.

The railing 211 with the deflectors 212, the concave railing 213, the straight railing 215, the railing 217 with the steps 218 and the further straight railing 224 are also inclined and form an angle with a plane 227 perpendicular to the direction of action 223 of gravity, which can lie in a range from 0.5° to 14° (including range limits), or for example an angle from 0.5° to 11°, or for example an angle from 0.5° to 8°.

Figure 12:
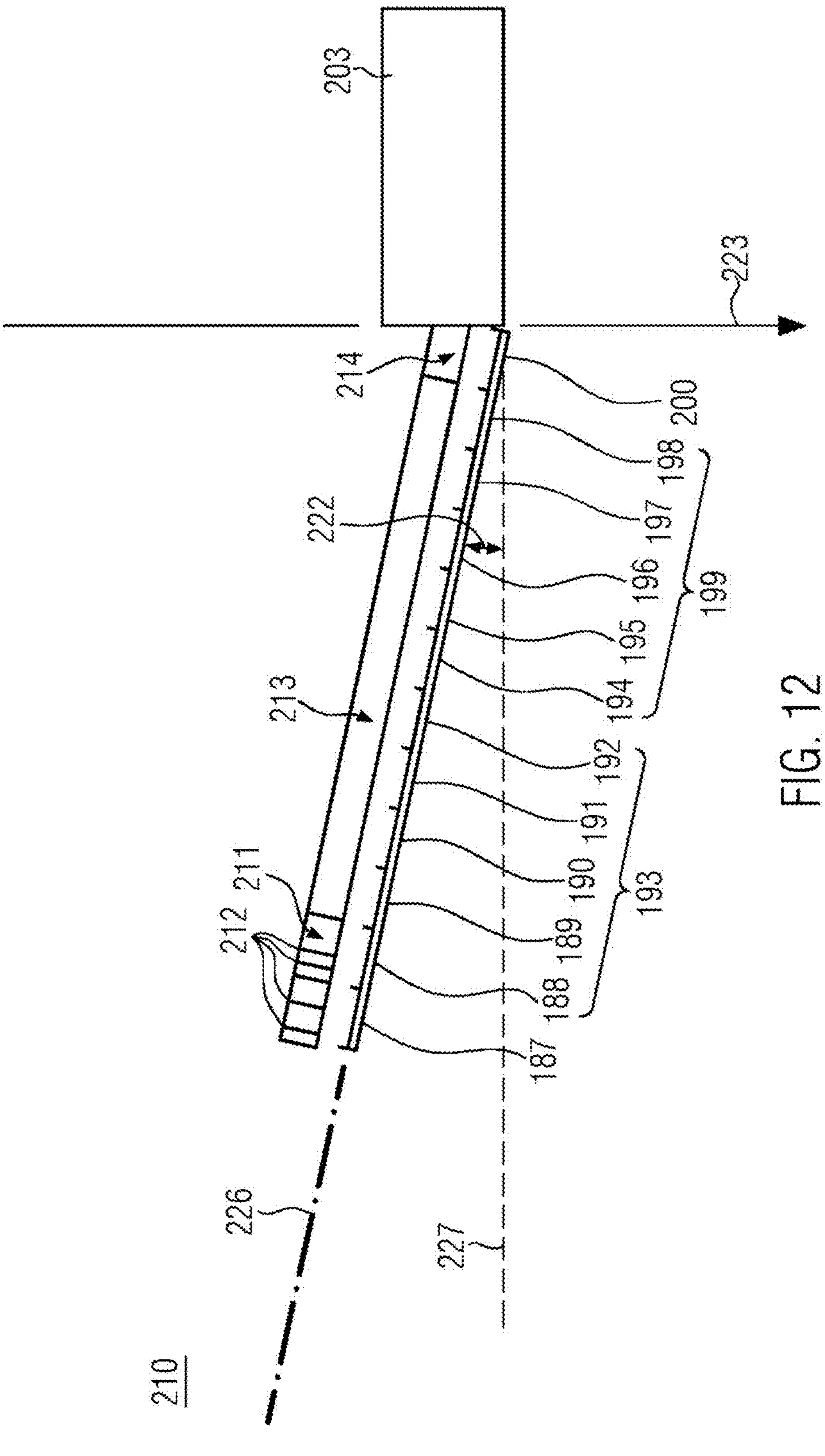
FIG. 12 shows a side view of FIG. 10 looking in the second direction, with the transport surfaces arranged in an inclined manner.

FIG. 12 shows a side view of FIG. 10 looking in the second direction 202, wherein the transport surfaces of the single-track infeed conveyor 187, the first conveyors 188-192, the second conveyors 194-198 and the further single-track infeed conveyor 200 are arranged in an inclined manner. If several additional single-track infeed conveyors are provided, these can also be inclined.

The transport surfaces are arranged coplanar in a plane 226. The plane 226 includes an angle 222 with a plane 227 perpendicular to the direction of action 223 of gravity, which can lie in a range from 0.5° to 14° (range limits included), or for example an angle from 0.5° to 11°, or for example an angle from 0.5° to 8°.

The railing 211 with the deflectors 212, the concave railing 213, the straight railing 215, the railing 217 with the steps 218, the further straight railing 224 and the further concave railing 214 are also arranged in an inclined manner and form an angle with a plane 227 perpendicular to the direction of action 223 of gravity, which can lie in a range from 0.5° to 14° (range limits included), or for example an angle from 0.5° to 11°, or for example an angle from 0.5° to 8°.

Figure 13:
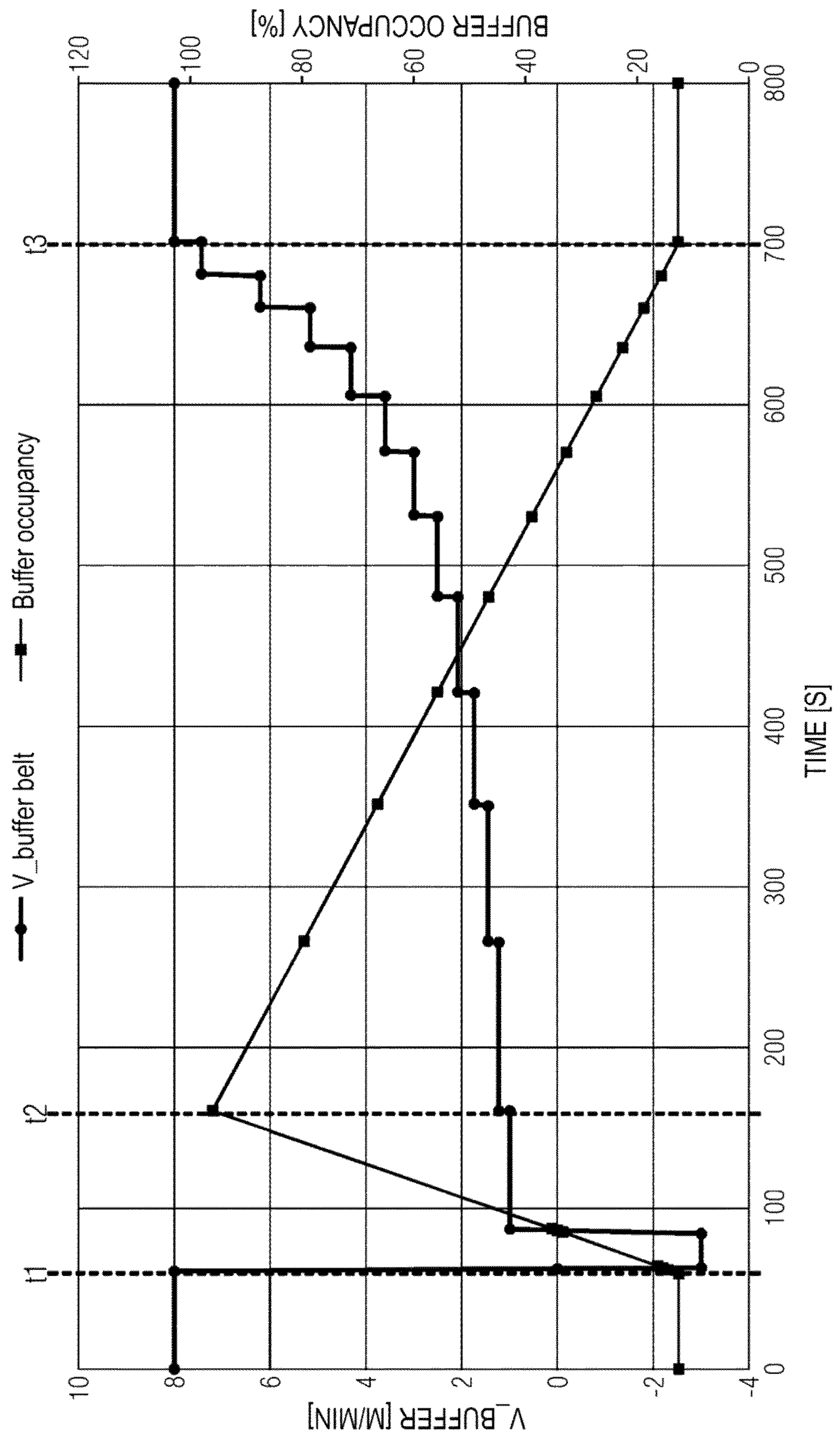
FIG. 13 shows a first time-dependent curve of the speed and the occupancy of the buffer belt.

FIG. 13 shows a first time-dependent curve of the speed and the occupancy of the buffer belt 235. In normal operation, in the illustration at times less than t1 and greater than t3, the buffer belt 235 is driven at a speed of 8 m/min in the first direction. The container feed apparatus 230 is driven continuously, i.e. in normal operation, in buffer operation, when switching from normal to buffer operation and when switching from buffer to normal operation.

After the occurrence of a fault downstream of the buffer 231 at the time t1, it may be necessary to buffer containers on the buffer belt 235. For this purpose, normal operation of buffer 231 is switched to buffer operation of buffer 231. The buffer belt 235 is decelerated from 8 m/min in the first direction 236 continuously or substantially continuously to 0 m/min and accelerated again to 3 m/min in the second direction 237. The acceleration can take place in stages. The buffer belt 235 is thus driven backwards and can transport containers located on the buffer belt 235 back to a starting region of the buffer belt 235, where these containers can come closer to and contact other containers supplied by the container feed apparatus 230.

The speed of the buffer belt 235 of 3 m/min in the second direction 237 is maintained until that container on the buffer belt 235 that is arranged furthest from the container feed apparatus 230 contacts a container following on from the container feed apparatus 230. The speed of the buffer belt of 3 m/min in the second direction 237 is then increased to a speed of 1 m/min in the first direction 236.

In FIG. 13, this is the case, for example, when approximately 35% of the buffer belt 235 is filled with containers.

The speed of 1 m/min is maintained as long as the fault exists and the buffer belt 235 is not completely or substantially not completely filled with containers.

The fault is remedied at the time t2. There is then a switch from buffer operation to normal operation of the buffer 231.

The speed of the buffer belt 235 is increased incrementally over several, in each case higher, intermediate speeds of 1 m/min to 8 m/min in the first direction 236. In the illustration, the intermediate speeds are approximately 1.2 m/min, 1.5 m/min, 1.73 m/min, 2.1 m/min, 2.5 m/min, 3 m/min, 3.6 m/min, 4.25 m/min, 5.1 m/min, 6.1 m/min and 7.5 m/min. The durations for which the different intermediate speeds are used in each case are different. In the illustration, the durations are approximately such that a reduction in the filling/occupancy of the buffer belt 235 is linear or substantially linear as a function of time until the filling of the buffer belt 235 corresponds to a filling/occupancy during normal operation, here approximately 15%. This filling of the buffer belt 235 is achieved at the time t3.

The buffer 231 can then be operated again in normal operation, i.e., the buffer belt 235 is driven at a speed of 8 m/min in the first direction 236.

Figure 14:
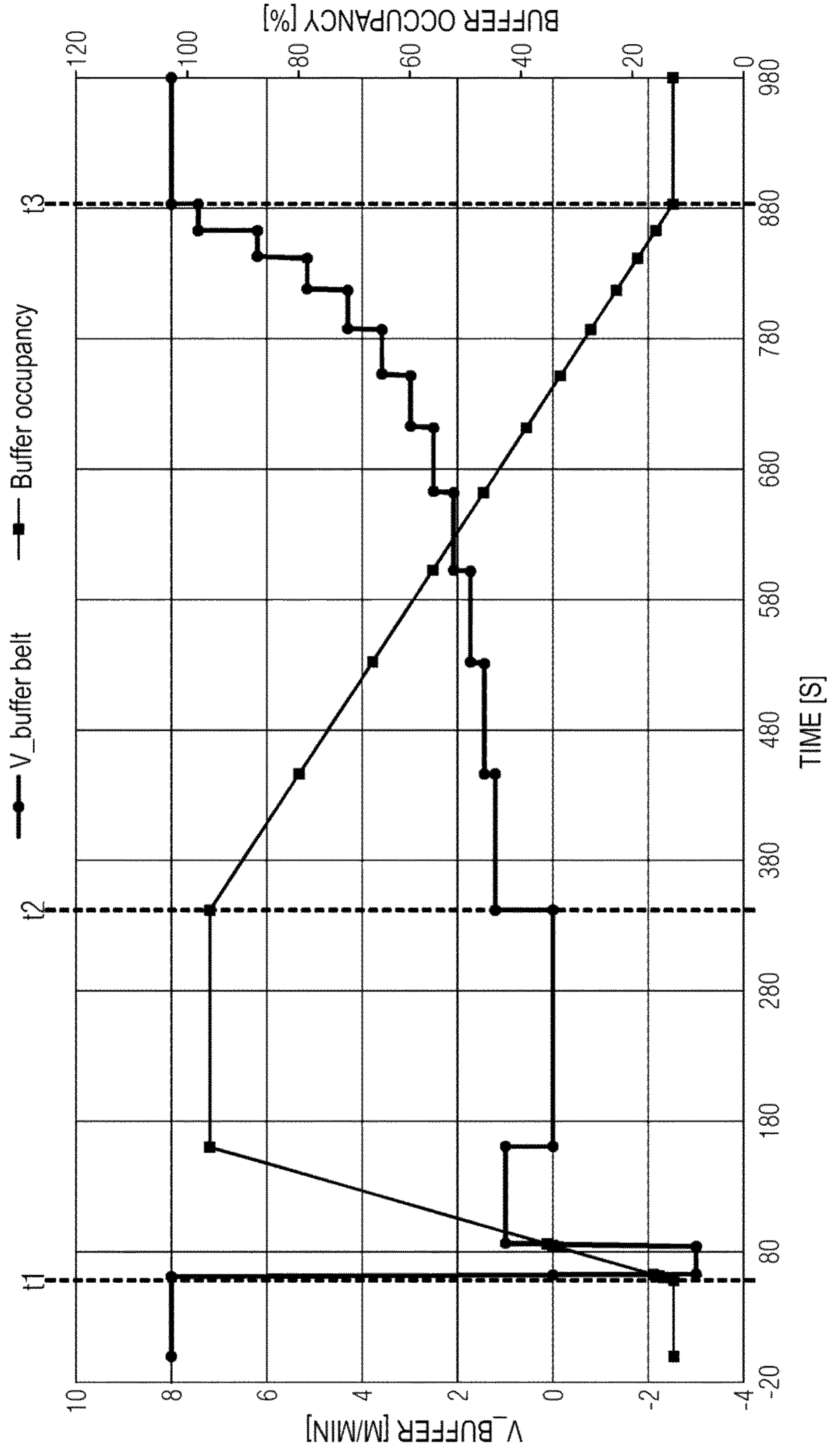
FIG. 14 shows a second time-dependent curve of the speed and the occupancy of the buffer belt.

FIG. 14 shows a second time-dependent curve of the speed and the occupancy of the buffer belt 235. In normal operation, in the illustration at times less than t1 and greater than t3, the buffer belt 235 is driven at a speed of 8 m/min in the first direction 236. The container feed apparatus 230 is driven in normal operation.

After the occurrence of a fault downstream of the buffer 231 at the time t1, it may be necessary to buffer containers on the buffer belt 235. For this purpose, normal operation of buffer 231 is switched to buffer operation of buffer 231. The buffer belt 235 is decelerated from 8 m/min in the first direction 236 continuously or substantially continuously to 0 m/min and accelerated again to 3 m/min in the second direction 237. The buffer belt 235 is thus driven backwards and can transport containers located on the buffer belt 235 back to a starting region of the buffer belt 235, where these containers can come closer to and contact other containers supplied by the container feed apparatus 230 and possibly come into contact with them.

The speed of the buffer belt 235 of 3 m/min in the second direction 237 is maintained until a container on the buffer belt 235 that is arranged furthest from the container feed apparatus 230 contacts a container following on from the container feed apparatus 230. The speed of the buffer belt 235 of 3 m/min in the second direction 237 is then increased to a speed of 1 m/min in the first direction 236.

This is the case, for example, when approximately 35% of the buffer belt 235 is filled with containers.

The speed of 1 m/min is maintained as long as the fault exists and the buffer belt 235 is not completely or substantially not completely filled with containers.

When the buffer belt 235 is approximately 90% filled, the buffer belt 235 stops (speed 0 m/min) and the container feed apparatus 230 stops (speed 0 m/min).

The fault is remedied at the time t2. The speed of the buffer belt 235 is initially increased to 1.2 m/min in the first direction 236, and the speed of the container feed apparatus 230 is increased to that in normal operation.

The speed of the buffer belt 235 is then increased further incrementally over several, in each case higher, intermediate speeds of 1.2 m/min to 8 m/min in the first direction 236. In the illustration, the intermediate speeds are approximately 1.5 m/min, 1.73 m/min, 2.1 m/min, 2.5 m/min, 3 m/min, 3.6 m/min, 4.25 m/min, 5.1 m/min, 6.1 m/min and 7.5 m/min. The durations for which the speed of 1.2 m/min and the different intermediate speeds are used in each case are different. In the illustration, the durations are approximately such that a reduction in the filling/occupancy of the buffer belt 235 is linear or substantially linear as a function of time until the filling of the buffer belt 235 corresponds to a filling/occupancy during normal operation, here approximately 15%. This filling of the buffer belt 235 is achieved at the time t3.

The buffer 231 can then be operated again in normal operation, i.e., the buffer belt 235 is driven at a speed of 8 m/min in the first direction 236.

Figure 15:
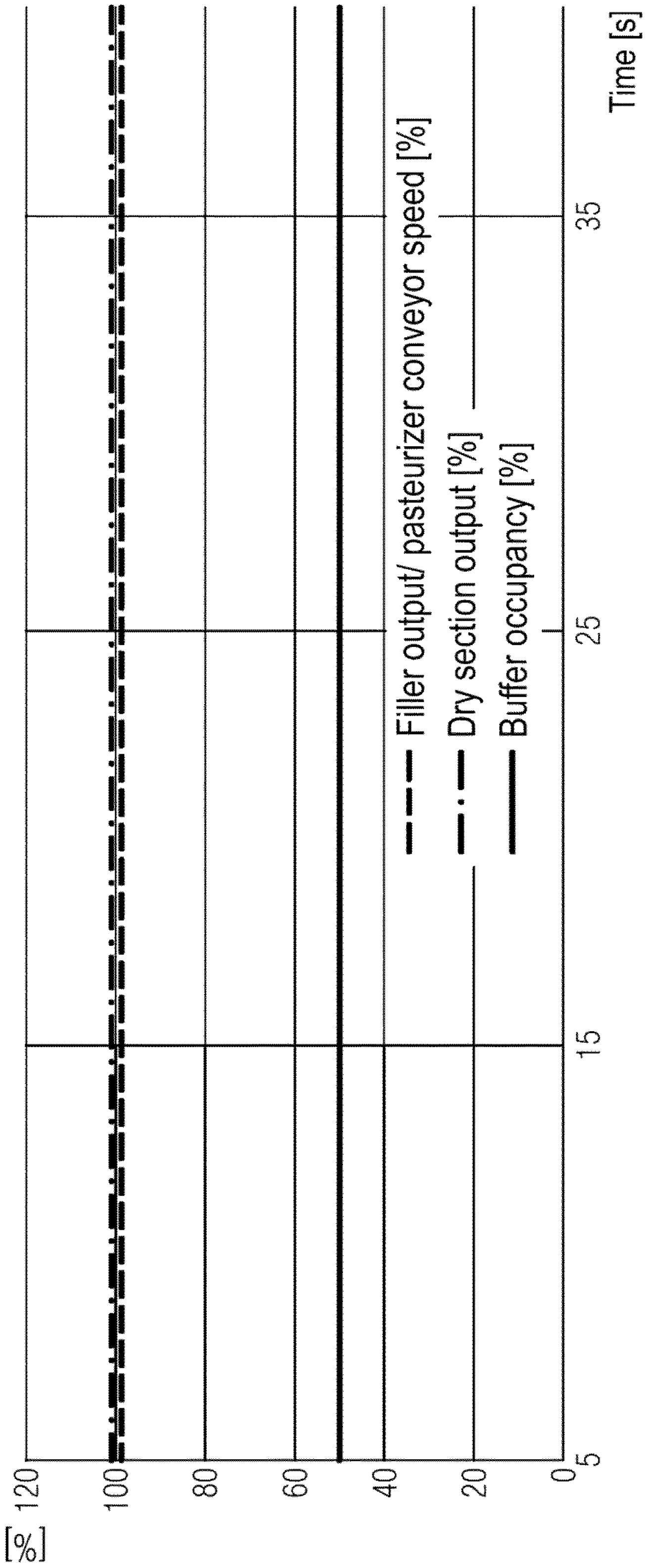
FIG. 15 shows a diagram for normal operation without any faults.

FIG. 15 shows a diagram for normal operation of a filling line without fault, where the filling line comprises a filler and a pasteurizer upstream of the buffer and a drying section downstream of the buffer. Depending on the time in seconds, the occupancy of the buffer in % (solid line), the output of the filler or the conveyor speed of the pasteurizer in % (dashed line) and the output of the dry section in % (dotted line) are shown. The buffer occupancy is consistently at 50%. The output of the filler or the conveyor speed of the pasteurizer and the output of the dry section are each at 100% (they are shown slightly offset in the diagram).

The occupancy of the buffer, also known as the fill level of the buffer conveyor, determines the buffer times that are available for errors upstream and downstream of the buffer conveyor. The higher the fill level of the buffer belt in normal operation, the more time is available for buffering in the event of faults upstream of the buffer, but the less time is available in the event of faults downstream of the buffer. The lower the fill level of the buffer belt in normal operation, the more time is available for buffering in the event of faults downstream of the buffer, but the less time is available in the event of faults upstream of the buffer.

The ratio of buffer times for buffering upstream and downstream of the buffer can be adjusted by the fill level in normal operation. For example, the adjustment can be made during operation of the filling line, taking into account faults upstream and/or downstream of the buffer, their frequency, their duration, and/or their correlation with environmental conditions and/or production conditions.

Figure 16:
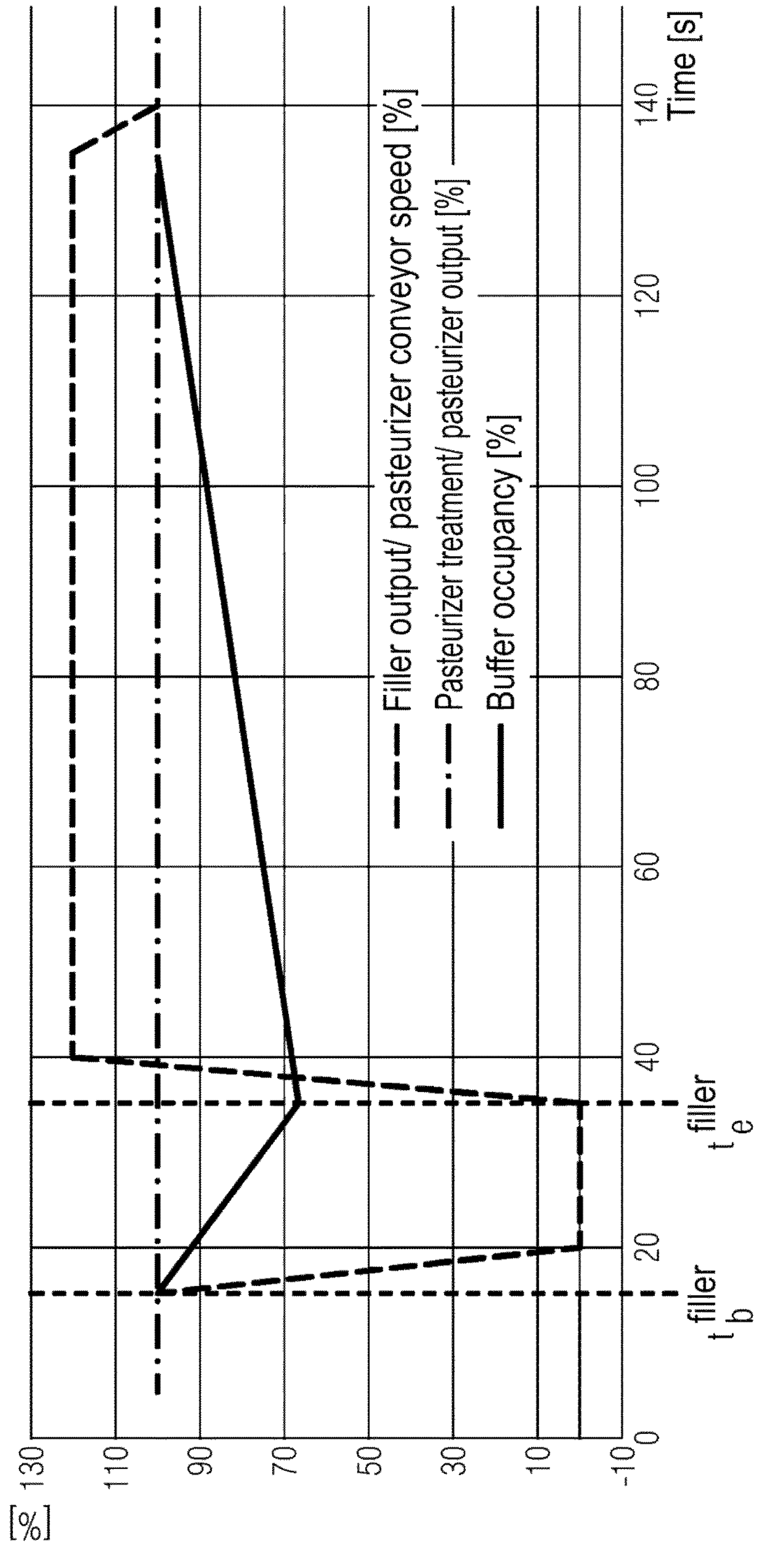
FIG. 16 shows a diagram for operation in the event of a fault upstream of the buffer.

FIG. 16 shows a diagram for operation in the event of a fault upstream from the buffer. Depending on the time in seconds, the occupancy of the buffer in % (solid line), the output of the filler or the belt speed of the pasteurizer in % (dashed line) and the treatment in the pasteurizer or the output of the pasteurizer in % (dotted line) are shown. An error in the filler begins at time to filler and the error in the filler ends at time $t_b^{filler}$. When the fault begins, the main conveyor of the pasteurizer is stopped, but the existing containers in the pasteurizer continue to be treated. The buffer belt continues to transport the containers out of the pasteurizer at 100% of the nominal output, so that the occupancy of the buffer gradually decreases during the fault. As soon as the fault ends, the filler runs at 120% of the nominal output and the buffer belt transports the containers out of the pasteurizer at 120% of the nominal output. When the buffer conveyor returns to the fill level of the buffer conveyor in normal operation, the filler runs at 100% of the nominal output, the main conveyor of the pasteurizer then transports the containers at 100% of the nominal output and the buffer conveyor continues to transport the containers out of the pasteurizer at 100% of the nominal output. Instead of 120% of the nominal output (filler and/or main conveyor of the pasteurizer), 105% or 110% of the nominal output can also be provided.

Figure 17:
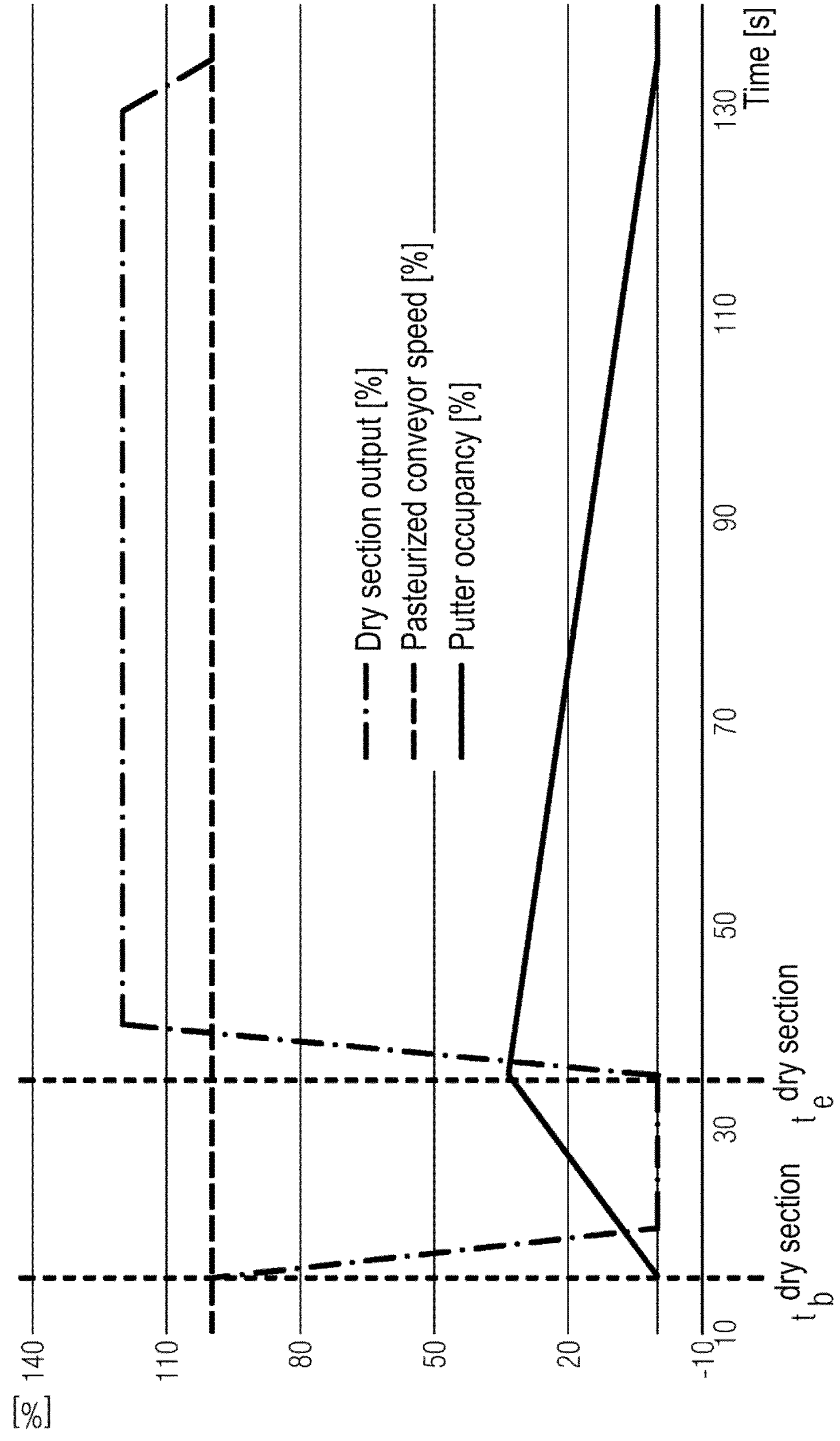
FIG. 17 shows a diagram for operation in the event of a fault downstream of the buffer.

FIG. 17 shows a diagram for operation in the event of a fault downstream from the buffer. Depending on the time in seconds, the occupancy of the buffer in % (solid line), the conveyor speed of the pasteurizer in % (dashed line) and the output of the dry section in % (dotted line) are shown. A fault in the dry section begins at time $t_b^{dry\ section}$ and the fault in the dry section ends at time $t_c^{dry\ section}$. When the fault begins, no more containers are dispensed from the buffer belt to the downstream components and an outfeed downstream of the buffer belt, e.g. the container discharge apparatus, stops. The buffer conveyor begins to buffer containers that are transferred to it, which increases the occupancy of the buffer. The buffer time here is 60 seconds, for example. After the end of the error in the dry section, the outfeed, the inspection device and the dry section start to operate at 120% of the nominal output. When the buffer conveyor has returned to the fill level of the buffer conveyor in normal operation, the outfeed, the inspection device and the dry section run again at 100% of the nominal output. The pasteurizer operates continuously at 100% of its nominal output.

Figure 18:
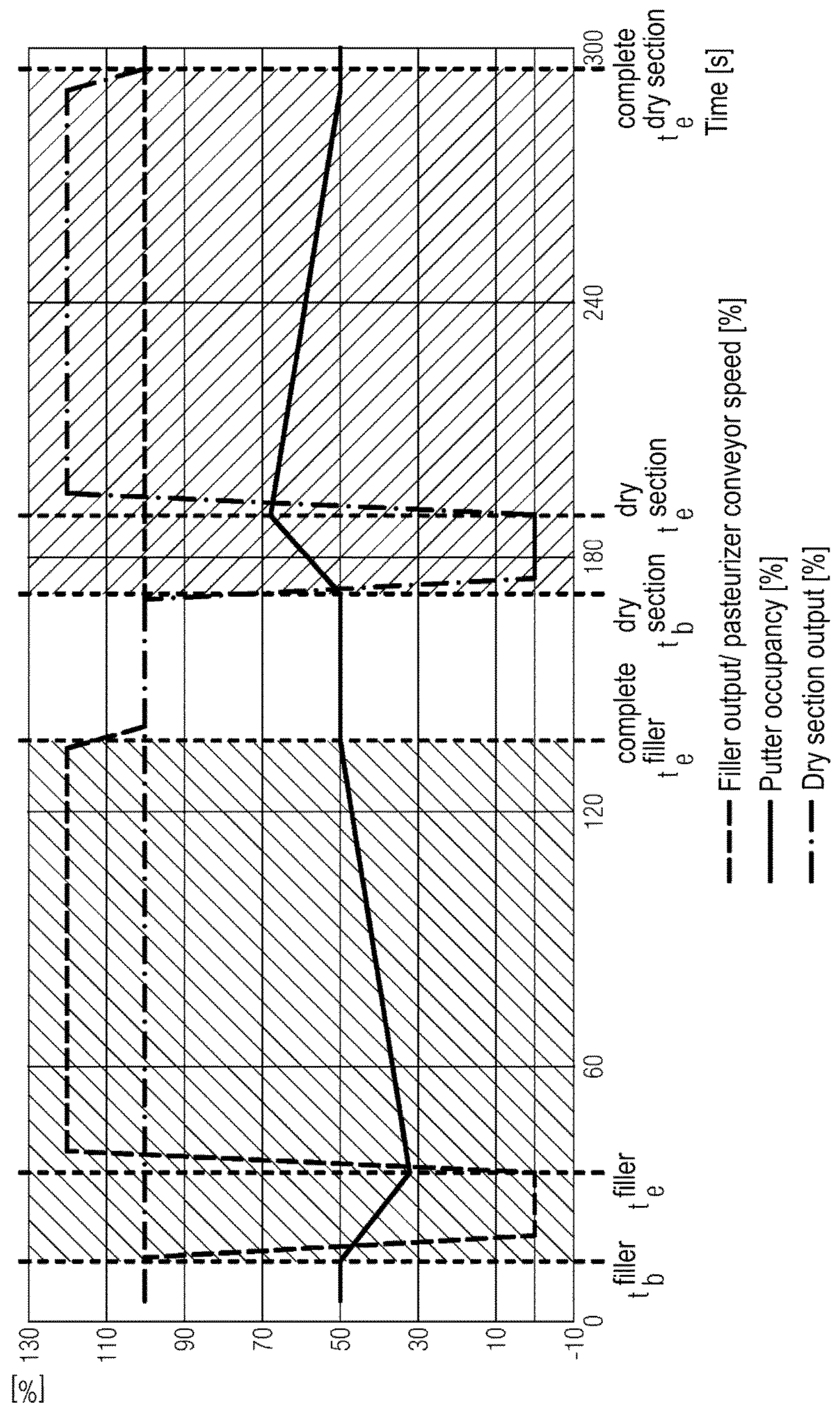
FIG. 18 shows a diagram for operation with errors occurring at different times upstream and downstream of the buffer.

FIG. 18 is a diagram for operation with errors occurring at different times upstream and downstream of the buffer. Depending on the time in seconds, the occupancy of the buffer in % (solid line), the output of the filler or the conveyor speed of the pasteurizer in % (dashed line) and the output of the dry section in % (dotted line) are shown. An error in the filler begins at time $t_b^{filler}$, approximately 15 seconds, and the error ends at time $t_e^{filer}$, approximately 35 seconds. When this error begins, the main conveyor of the pasteurizer is stopped, but the existing containers in the pasteurizer continue to be treated. The buffer belt continues to transport the containers out of the pasteurizer at 100% of the nominal output, so that the occupancy of the buffer belt gradually decreases during the fault. As soon as the fault ends, the filler runs at 120% of the nominal output, the main belt of the pasteurizer transports the containers at 120% of the nominal output and the buffer belt transports the containers out of the pasteurizer at 100% of the nominal output. If the buffer belt is filled again to the fill level of the buffer belt in normal operation (here, for example, 50%) at time $t_e^{complete,\ filler}$, approximately 120 seconds, the filler runs at 100% of the nominal output, the main belt of the pasteurizer then transports the containers at 100% of the nominal output and the buffer belt transports the containers out of the pasteurizer at 100% of the nominal output.

An error in the dry section begins at time $t_b^{dry\ section}$, approximately 175 seconds, and the error in the dry section ends at time $t_e^{dry\ section}$, approximately 195 seconds. When the fault begins, no more containers are dispensed from the buffer belt to the downstream components and an outfeed downstream of the buffer belt, e.g. the container discharge apparatus, stops. The buffer conveyor begins to buffer containers that are transferred to it, which increases the occupancy of the buffer conveyor. The buffer time here is 60 seconds, for example. After the end of the error in the dry section, the outfeed, the inspection device and the dry section start to operate at 120% of the nominal output. When the buffer conveyor has been reduced to the fill level of the buffer conveyor in normal operation at time $t_e^{complete,\ dry\ section}$, approximately 295 seconds, the outfeed, inspection device and dry section run again at 100% of the nominal output. The pasteurizer operates continuously at 100% of its nominal output.

The buffer time is 60 seconds respectively for the fault upstream of the buffer and for the fault downstream of the buffer, resulting in a total buffer time of 120 seconds.

Figure 19:
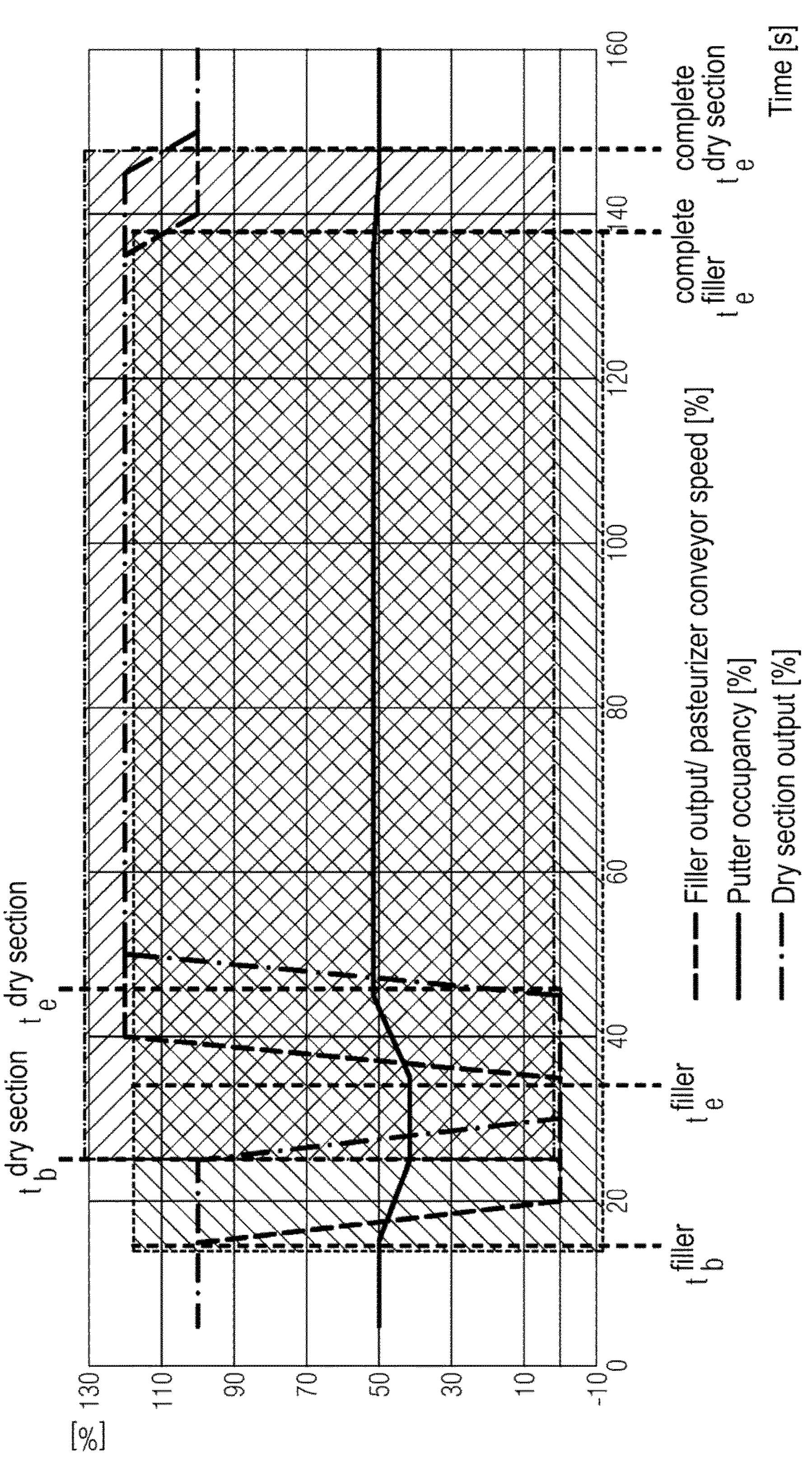
FIG. 19 shows a diagram for operation with faults occurring at the same time upstream and downstream of the buffer.

FIG. 19 is a diagram for operation with faults occurring at the same time upstream and downstream of the buffer. At time $t_b^{filler}$, a fault in the filler begins and when the fault in the filler begins, the main conveyor of the pasteurizer is stopped, but the existing containers in the pasteurizer continue to be treated. The buffer belt continues to transport the containers out of the pasteurizer at 100% of the nominal output, so that the occupancy of the buffer belt gradually decreases during the fault in the filler. An error in the dry section begins at time $t_b^{dry\ section}$. When the error in the dry section begins, no more containers are dispensed from the buffer conveyor to the downstream components and an outfeed downstream of the buffer conveyor stops. The buffer conveyor begins to buffer containers that are transferred to it. Since the fault in the filler and in the dry section occur at the same time, the occupancy of the buffer conveyor remains constant during the time in which both errors are present.

The fault in the filler ends at time $t_e^{filler}$. As soon as the fault ends, the filler runs at 120% of the nominal output. The main conveyor belt of the pasteurizer transports the containers at 120% of the nominal output. The buffer gradually fills up as no containers are dispensed from the buffer belt due to the ongoing fault in the dry section.

The fault in the dry section ends at time $t_e^{dry\ section}$. After the end of the fault in the dry section, the buffer (incl. e.g. the buffer outfeed), the inspection device and the dry section start to operate at 120% of the nominal output. The fill level of the buffer belt is still a few %, for example 3%, above the fill level in normal operation. At time $t_e^{complete, filler}$, approximately 135 seconds, the filler is brought back to 100% of the nominal output. At time $t_e^{complete, filler}$, approximately 148 seconds, the buffer (incl. e.g. the buffer outfeed), the inspection device and the dry section are brought back to 100% of the nominal output. The fill level of the buffer belt has been reduced to such an extent that it corresponds to the fill level in normal operation. The different times at which the output of the filler is brought back to 100% of the nominal output or the output of the dry section is brought back to 100% of the nominal output can result from the design and dimensioning of the buffer belt and the filling line.

Figure 20:
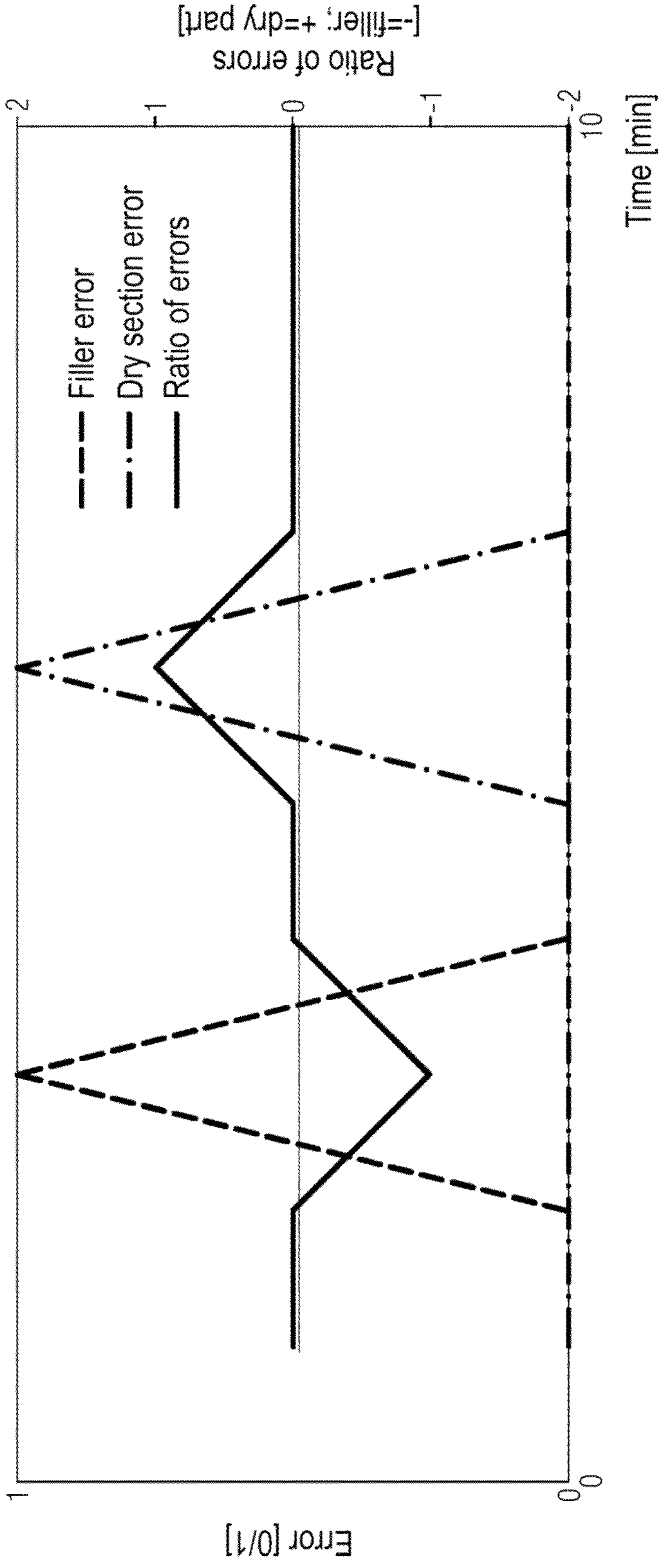
FIG. 20 shows a diagram for a first ratio of errors over a period of time.

FIG. 20 is a diagram for a first ratio of errors over a period of time. The first ratio of errors is 1:1 for faults buffer to faults downstream of the buffer. By way of example, there is an error in the filler (dashed line) and an error in the dry section (dotted line), each with the same duration. In the "ratio of errors" shown, negative values are assigned to the filler and positive values to the dry section.

Figure 21:
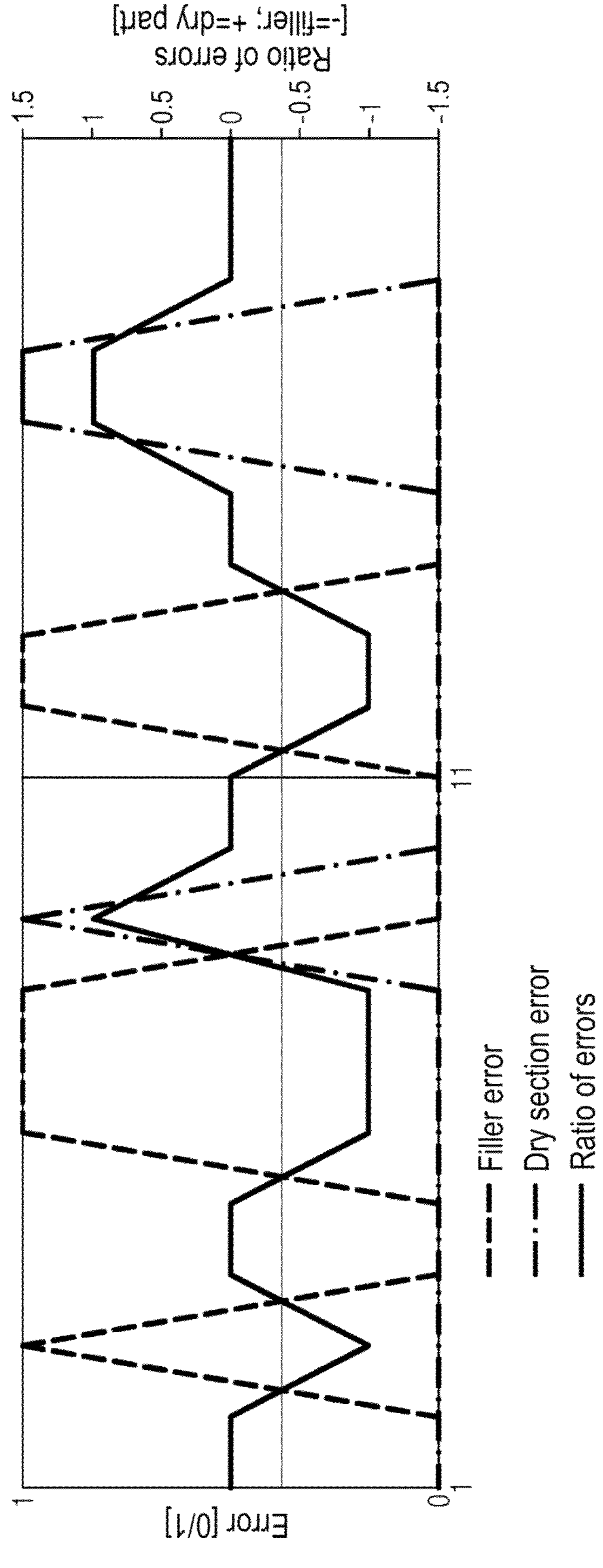
FIG. 21 shows a diagram for a second ratio of errors over a period of time.

FIG. 21 is a diagram for a second ratio of errors over a period of time. The second ratio of errors is 2:1 for faults upstream of the buffer to faults downstream of the buffer. By way of example, there are three errors in the filler (dashed line) and two errors in the dry section (dotted line), with the durations resulting in a ratio of 67%:33%. In the "ratio of errors" shown, negative values are assigned to the filler and positive values to the dry section. Since many faults occur upstream of the buffer, it may make sense to select the fill level of the buffer belt in normal operation such that a large part of the buffer time can be used for errors upstream of the buffer.

Figure 22:
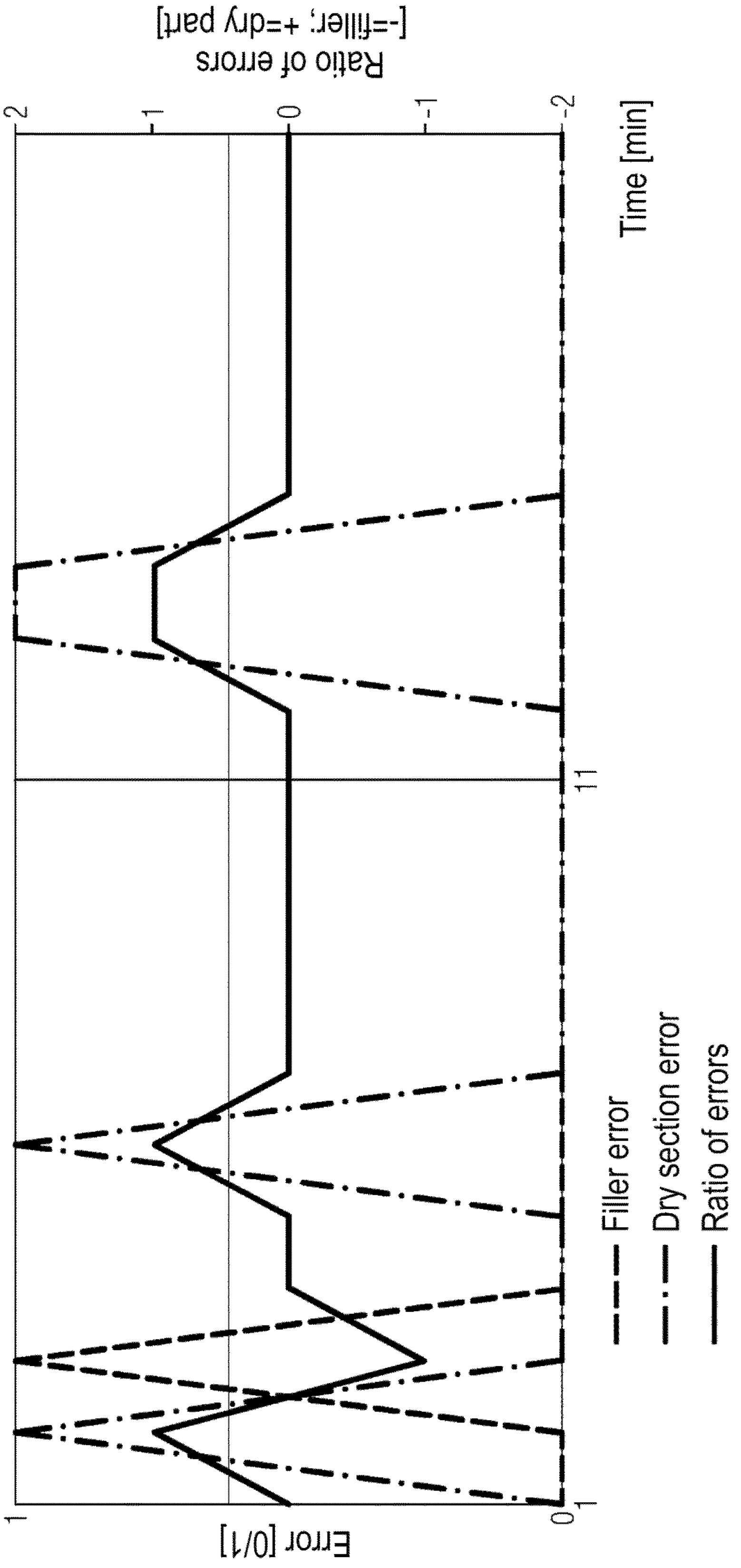
FIG. 22 shows a diagram for a third ratio of errors over a period of time.

FIG. 22 is a diagram for a third ratio of errors over a period of time. The third ratio of errors is 1:4 for faults upstream of the buffer to faults downstream of the buffer. By way of example, there is one error in the filler (dashed line) and three errors in the dry section (dotted line), with the durations resulting in a ratio of 20%:80%. In the "ratio of errors" shown, negative values are assigned to the filler and positive values to the dry section. Since many faults occur upstream of the buffer, it may make sense to select the fill level of the buffer belt in normal operation such that a large part of the buffer time can be used for faults upstream of the buffer.

Figure 23:
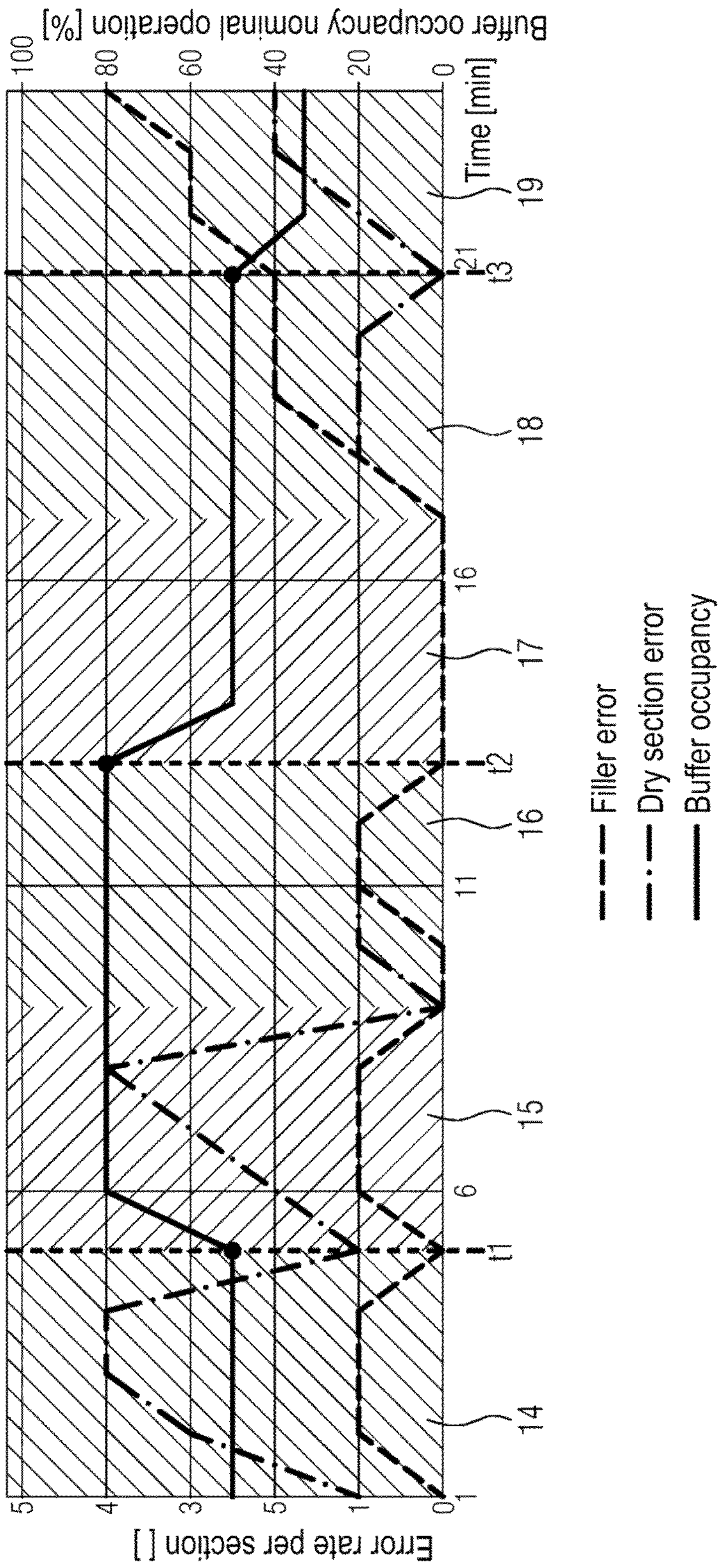
FIG. 23 shows a diagram for an exemplary dynamic buffer control with adjustment of the buffer times.

FIG. 23 shows a diagram for an exemplary dynamic buffer control with adjustment of the buffer times. A susceptibility to errors, in this case in the filler and the dry section, is determined in various time periods 14-19. In the first period 14, the maximum susceptibility to errors of the filler, i.e. the number of errors occurring in the filler, is four and the maximum susceptibility to errors of the dry section, i.e. the number of errors occurring in the dry section, is one.

In the second period 15, the maximum susceptibility to errors of the filler, i.e. the number of errors occurring in the filler, is also four and the maximum susceptibility to errors of the dry section, i.e. the number of errors occurring in the dry section, is also one, although the duration of the errors in the filler is different to that of the first period 14.

In the third period 16, the maximum susceptibility to errors of the filler and the dry section is one each.

No errors occur in the fourth period 17.

In the fifth period 18, the maximum susceptibility to errors of the filler is one and the maximum susceptibility to errors of the dry section is two.

In the sixth period 19, the maximum susceptibility to errors of the filler, i.e. errors occurring in the filler, is two and the maximum susceptibility to errors of the dry section is four.

At times t1, t2 and t3, the buffer times are adjusted on the basis of the determined susceptibilities to errors by adjusting the fill level of the buffer during normal operation. Since the errors upstream of the buffer predominate in the first period 14, the fill level of the buffer is increased during normal operation. Since the errors upstream and downstream of the buffer are equally frequent in the third period 16, the fill level of the buffer is reduced during normal operation. Since the errors downstream of the buffer predominate in the fifth period 18, the fill level of the buffer is further reduced during normal operation.

FIGS. 24A, 24B, 25A, 25B and 25C show various embodiments of a buffer apparatus, each comprising a container cleaning machine, a buffer with a drivable buffer belt or several drivable buffer belts arranged in parallel and a container discharge apparatus.

Figure 24A:
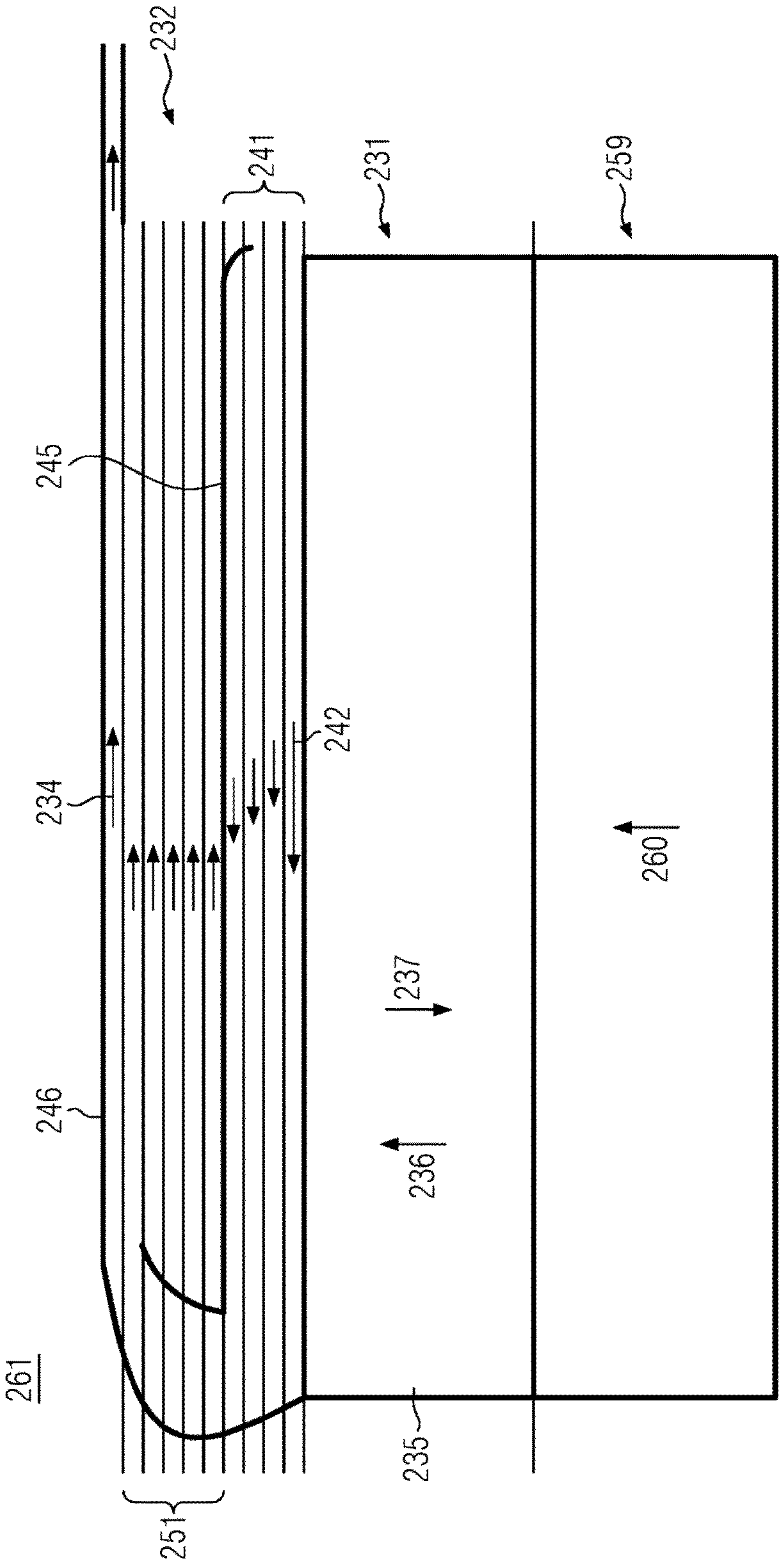
FIG. 24A shows a schematic plan view of a sixth embodiment of a buffer apparatus.

FIG. 24A shows a schematic top view of a sixth embodiment of a buffer apparatus 261. The buffer apparatus 229 comprises a container cleaning machine 259, a buffer 231 downstream of the container cleaning machine 259 and a container discharge apparatus 232 downstream of the buffer 231. The container cleaning machine 259 is designed to transport containers to be cleaned, for example reusable glass containers, in a first direction 260. The buffer 231 comprises a drivable buffer belt 235 which is designed to transport containers in a second direction 236 or to transport containers in a third direction 237, wherein the second 236 and the third direction 237 are opposite to each other and the first direction 260 and the second direction 236 run in the same direction. Alternatively, it may be provided that the buffer belt 235 is not designed to transport containers in the third direction, i.e. that it is not drivable in the third direction, the drivable buffer belt 235 may also be stationary. The container discharge apparatus 232 is designed to remove and separate containers from the buffer 231 in a fourth direction 242, which runs transversely to the first 260, the second 236 and the third direction 237.

The container discharge apparatus was explained in more detail in FIGS. 3A to 8E.

Figure 24B:
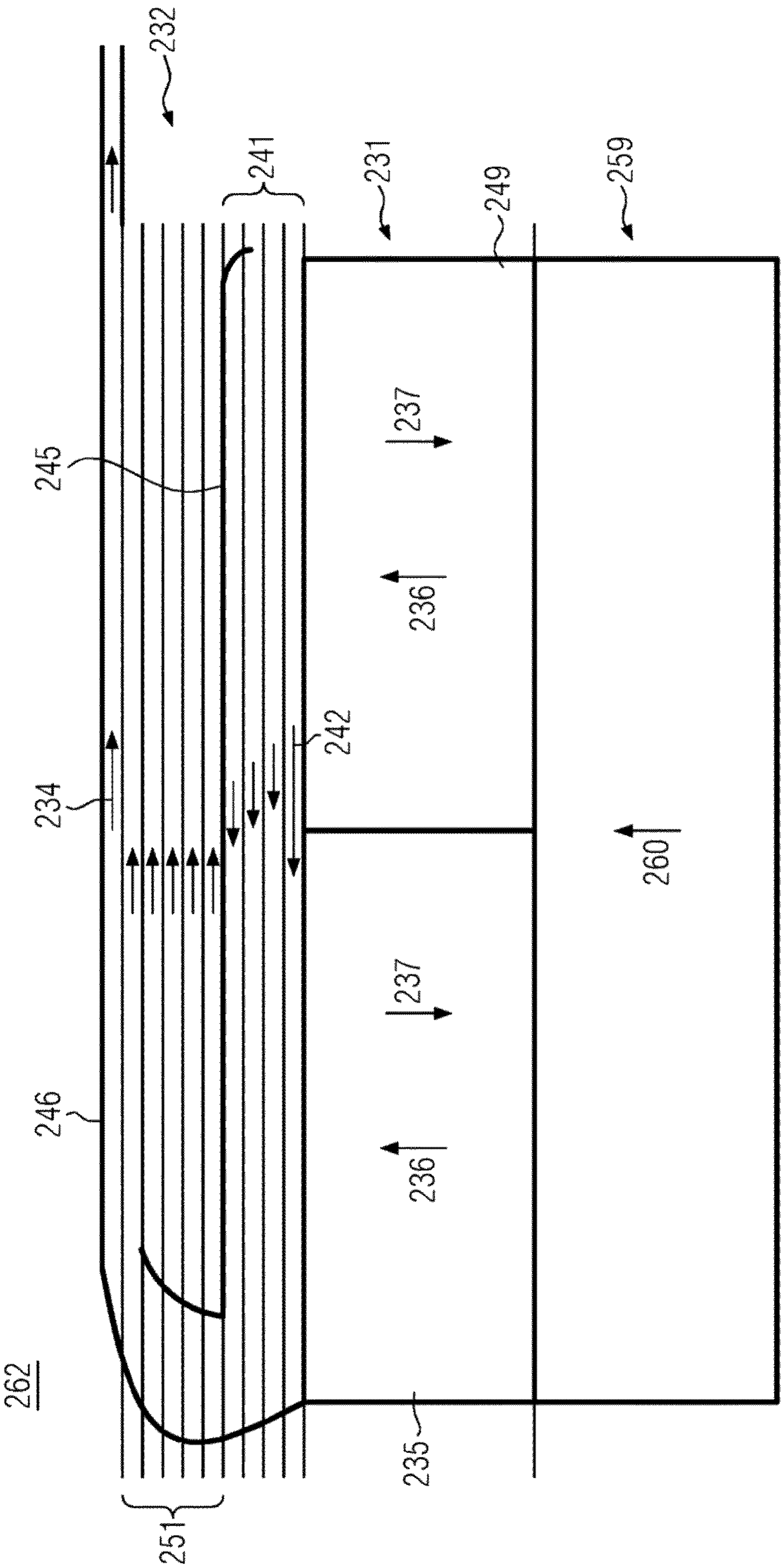
FIG. 24B shows a schematic plan view of a seventh embodiment of the buffer apparatus.

FIG. 24B is a schematic pan view of a seventh embodiment of a buffer apparatus 262. The container cleaning machine 259 and the container discharge apparatus 232 are identical in construction to those of FIG. 24A. However, the buffer 248 here comprises two drivable buffer belts 249, 250 arranged in parallel, which are each designed to transport containers in the second direction 236 or to transport containers in the third direction 237. Alternatively, it may be provided that the two buffer belts 249, 250 are not designed to transport containers in the third direction, i.e. that they cannot be driven in the third direction; the buffer belts 249, 250 may also be stationary.

Figure 25A:
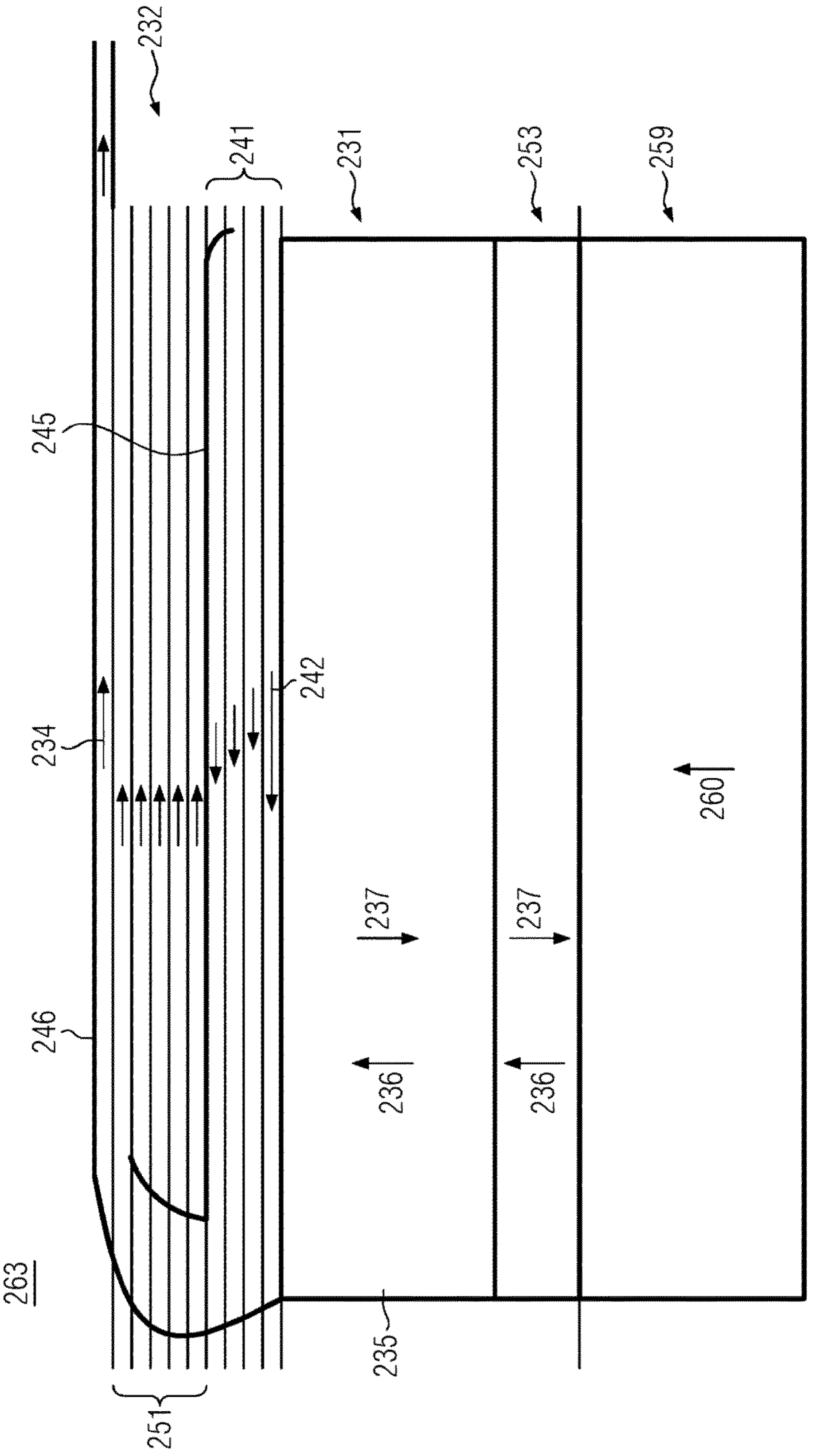
FIG. 25A shows a schematic plan view of an eighth embodiment of a buffer apparatus.

FIG. 25A is a schematic plan view of an eighth embodiment of a buffer apparatus 263. The container cleaning machine 259, the buffer 231 and the container discharge apparatus are identical in construction to those of FIG. 24A. A transition region 253 is arranged between the container cleaning machine 259 and the buffer 231, which is designed as a single drivable belt that can transport containers in the second direction 236 or in the third direction 237. Alternatively, it may be provided that the buffer belt 235 is not designed to transport containers in the third direction, i.e. that it is not drivable in the third direction, but only in the second direction; the drivable buffer belt 235 may also be stationary. The transition region 253 can be designed such that it can only transport containers in the second direction 236, but not in the third direction; the transition region 253 can also be stationary.

Figure 25B:
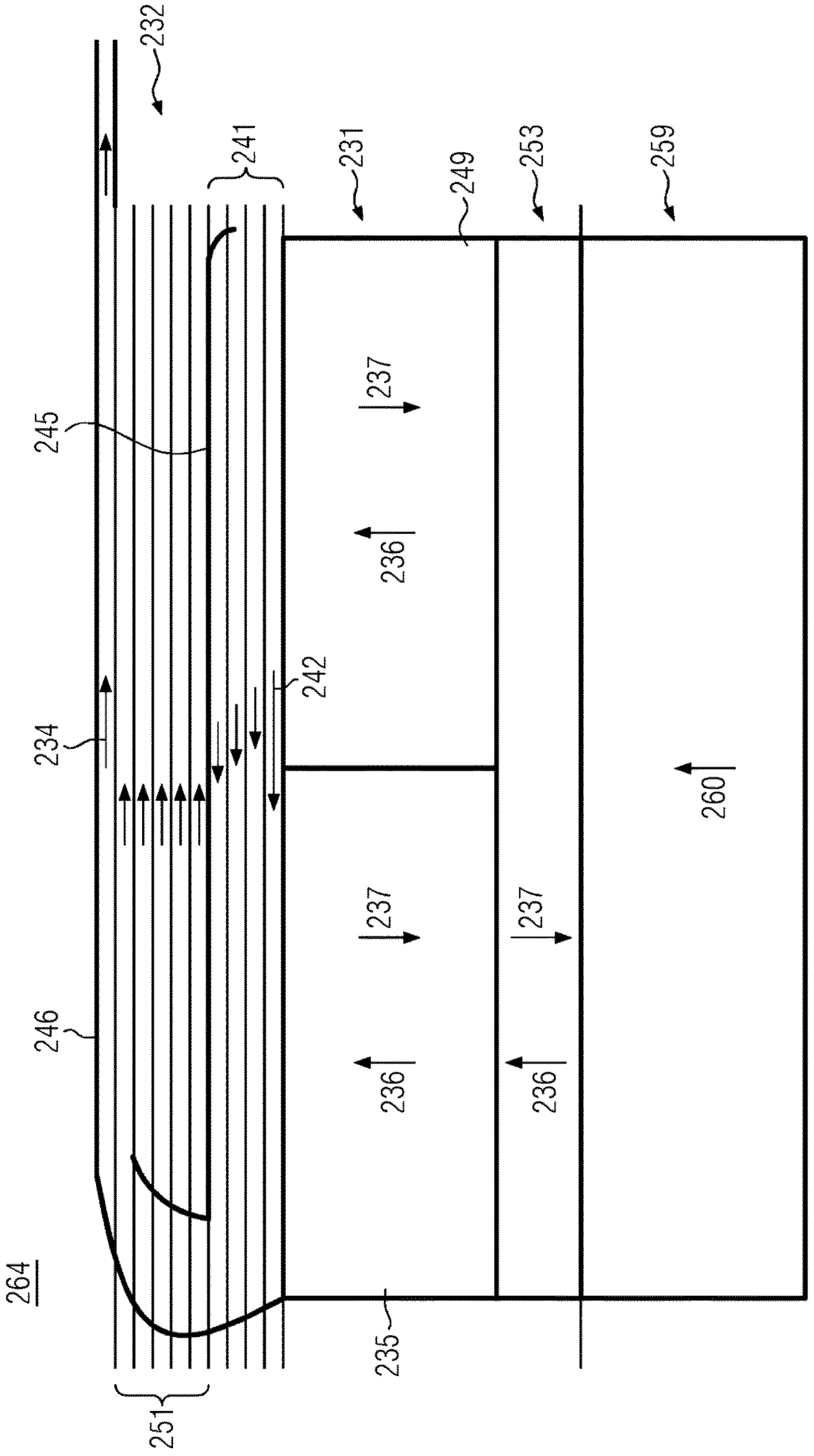
FIG. 25B shows a schematic plan view of a ninth embodiment of a buffer apparatus.

FIG. 25B is a schematic plan view of a ninth embodiment of a buffer apparatus 264. The container cleaning machine 259, the buffer 248 and the container discharge apparatus 232 are identical in construction to those of FIG. 24B. A transition region 253 is arranged between the container cleaning machine 259 and the buffer 231, which is designed as a single drivable belt that can transport containers in the second direction 236 or in the third direction 237. Alternatively, it may be provided that the two buffer belts 249, 250 are not designed to transport containers in the third direction, i.e. that they cannot be driven in the third direction, but only in the second direction; the drivable buffer belt 235 may also be stationary. The transition region 253 can be designed such that it can only transport containers in the second direction 236, but not in the third direction; the transition region 253 can also be stationary.

Figure 25C:
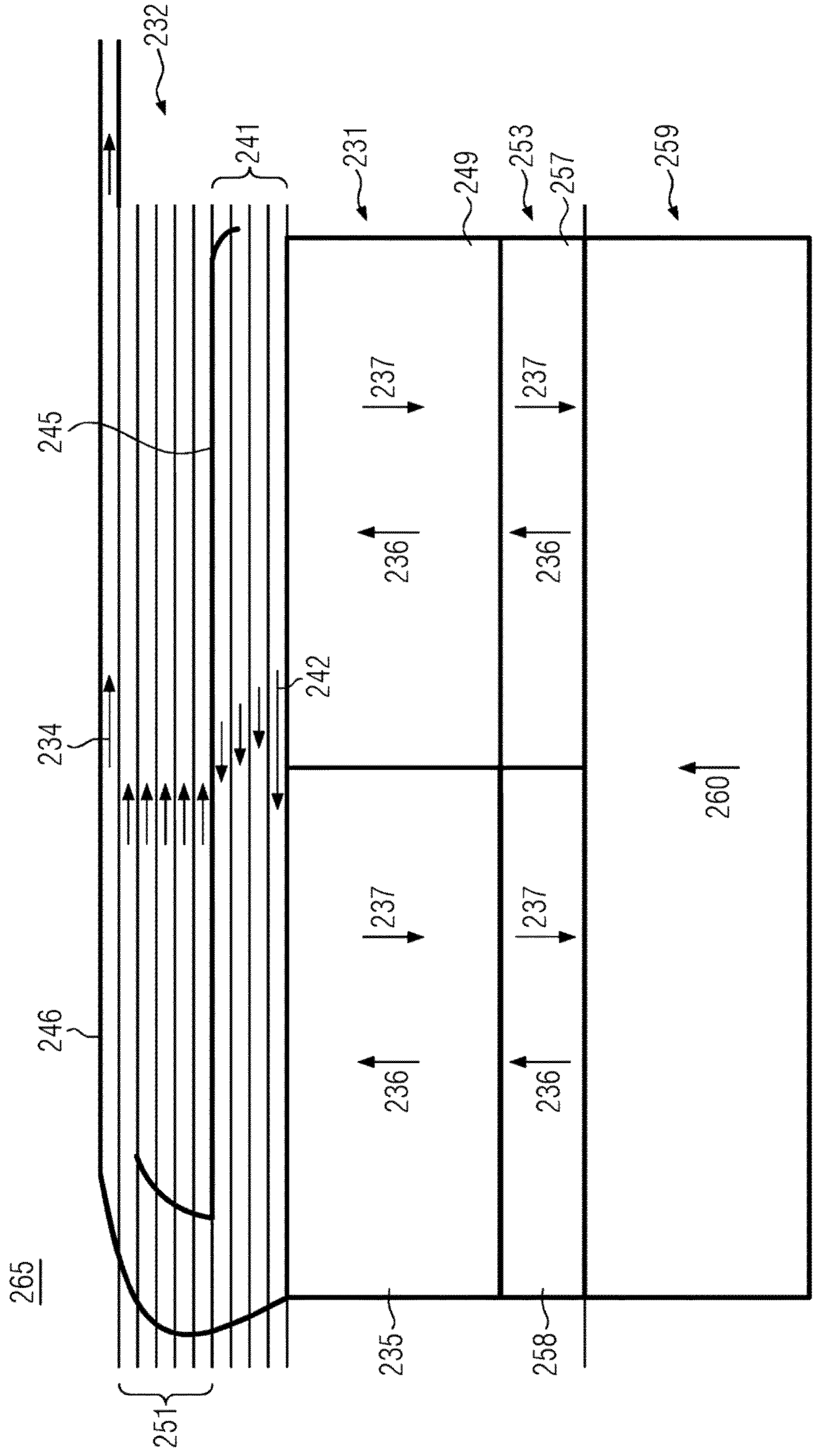
FIG. 25C shows a schematic plan view of a tenth embodiment of a buffer apparatus.

FIG. 25C is a schematic plan view of a tenth embodiment of a buffer apparatus 265. The container cleaning machine 259, the buffer 248 and the container discharge apparatus 232 are identical in construction to those of FIG. 24B. A transition region 256 is arranged between the container cleaning machine 259 and the buffer 248, which comprises the same number of drivable belts 257, 258, in this case two, as the buffer 248, wherein the drivable belts 257, 258 are designed to transport containers in the second 236 or in the third direction 237. Alternatively, it may be provided that the two buffer belts 249, 250 are not designed to transport containers in the third direction, i.e. that they cannot be driven in the third direction, but only in the second direction; the buffer belts 249, 250 may also be stationary. The belts 257, 258 of the transition region 256 can be designed in such a way that they can only transport containers in the second direction 236, but not in the third direction; the belts 257, 258 of the transition region 256 can also be stationary.

The invention claimed is:

1. A buffer apparatus comprising:

a container feed apparatus;

a buffer downstream of the container feed apparatus; and a container discharge apparatus downstream of the buffer, wherein the container feed apparatus is for feeding containers to the buffer and is configured to transport containers in a first direction by first conveyor belts, wherein the buffer comprises a drivable buffer belt or several drivable buffer belts arranged in parallel, which is/are each configured to transport containers in a second direction, the second direction running transversely to the first direction, and wherein the container discharge apparatus is for discharging and separating containers from the buffer in the first direction or in a third direction opposite to the first direction by second conveyor belts, further comprising a control device for the buffer adapted to execute a method for controlling the buffer, wherein the control device is further configured to:

after an occurrence of a fault downstream from the buffer requiring buffering of containers on the buffer belt or belts, switch a normal operation of the buffer to a buffer operation of the buffer, including:

when the buffer comprises the drivable buffer belt, maintain a first speed of the container feed apparatus in the first direction, wherein the first speed has a first value, and simultaneously decelerate the buffer belt from a second speed at a second value in the second direction to a third speed at a third value in the second direction; or when the buffer comprises the several drivable buffer belts arranged in parallel, maintain the first speed of the container feed apparatus in the first direction, wherein the first speed has the first value, and simultaneously decelerate the buffer belts from the second speed at the second value in the second direction to the third speed at the third value in the second direction.

2. The buffer apparatus of claim 1, wherein the drivable buffer belt is further configured or the several drivable buffer belts are further configured respectively to transport containers in a fourth direction, wherein the second and fourth directions are opposite to each other and the fourth direction is transverse to the first direction.

3. The buffer apparatus according to claim 2, wherein the buffer belt or the buffer belts are driven at a speed of 0 m/min to 20 m/min in the second direction or in the fourth direction.

4. The buffer apparatus of claim 3, wherein at least one transition region is arranged between the container feed apparatus and the buffer, wherein a length of the transition region is shorter than a length of the buffer, wherein the transition region is a single drivable belt in order to transport containers in the second direction or in the fourth direction, or wherein the transition region comprises a same number of drivable belts as the buffer, wherein the drivable belts are configured to transport containers in the second direction or in the fourth direction.

5. The buffer apparatus of claim 1, wherein the buffer belt or the buffer belts are drivable at a speed of −20 m/min to 60 m/min.

6. The buffer apparatus of claim 1, wherein a length of the buffer belt or the buffer belts is dimensioned such that, in a buffer operation, buffering of containers on the buffer belt or the buffer belts is possible for a period of 0 to 30 minutes, 0 to 20 minutes, 0 to 10 minutes, 0.15 to 15 minutes, 0.1 to 10 minutes, or 0.1 to 5 minutes.

7. The buffer apparatus of claim 1, wherein, to switch the normal operation of the buffer to the buffer operation of the buffer, the control device is further configured to:

if the fault has been corrected, switch from the buffer operation of the buffer to the normal operation, including:

when the buffer comprises the drivable buffer belt, further maintain the first speed of the container feed apparatus in the first direction, wherein the first speed has the first value, and simultaneously increase the third speed of the buffer belt back to the second speed in the second direction and maintaining the second speed in the second direction; or when the buffer comprises the several drivable buffer belts arranged in parallel, further maintain the first speed of the container feed apparatus in the first direction, wherein the first speed has the first value, and simultaneously increase the respective third speed of the buffer belts back to the second speed in the second direction and maintaining the second speed in the second direction.

8. The buffer apparatus of claim 7, wherein the simultaneous increase takes place incrementally over one or more, in each case higher, intermediate speeds, wherein an increase of 15 to 20% is provided in each case, wherein one of the intermediate speeds is, in each case, maintained for a given or adjustable period of time before increasing to a next intermediate speed, and wherein the respectively given or adjustable period of time is different or the same for the different intermediate speeds.

9. The buffer apparatus of claim 1, wherein to switch the normal operation of the buffer to the buffer operation of the buffer, the control device is further configured to:

when the buffer comprises the drivable buffer belt, further maintain the first speed of the container feed apparatus in the first direction, wherein the first speed has the first value, and simultaneously decelerate the buffer belt from the third speed at the third value in the second direction to a speed of 0 m/min and subsequently accelerating the buffer belt from the speed of 0 m/min to a fourth speed in the fourth direction, wherein the fourth speed has a fourth value that is smaller than the second value, and maintaining the fourth speed in the fourth direction; or when the buffer comprises the several drivable buffer belts arranged in parallel, further maintain the first speed of the container feed apparatus in the first direction, wherein the first speed has the first value, and simultaneously decelerate the buffer belts from the third speed at the third value in the second direction to a speed of 0 m/min and subsequently accelerating the buffer belts from the speed of 0 m/min to a respective fourth speed in the fourth direction, wherein the fourth speed has a respective fourth value that is smaller than the second value, and maintain the fourth speed in the fourth direction.

10. The buffer apparatus of claim 9, wherein to switch the normal operation of the buffer to the buffer operation of the buffer, the control device is further configured to:

when the buffer comprises the drivable buffer belt, if the containers transported from the container feed apparatus to the buffer belt and the containers returned from the buffer belt fill a starting region of the buffer belt, further maintain the first speed of the container feed apparatus in the first direction, wherein the first speed has the first value, and simultaneously decelerate the buffer belt from the fourth speed in the fourth direction to a fifth speed at a fifth value of 0 m/min and subsequent acceleration of the buffer belt from the fifth speed to a sixth speed in the second direction, wherein the sixth speed has a sixth value that is equal to the first value; or when the buffer comprises the several drivable buffer belts arranged in parallel, if the containers transported from the container feed apparatus to the buffer belts and the containers returned from the buffer belts fill, for each of the buffer belts, a starting region of the buffer belts, further maintain the first speed of the container feed apparatus in the first direction, wherein the first speed has the first value, and simultaneously decelerate the buffer belts from the respective fourth speed in the fourth direction to the fifth speed at the fifth value of 0 m/min and subsequently accelerating the buffer belts from the fifth speed to the sixth speed in the second direction.

11. The buffer apparatus of claim 10, wherein the control device is further configured to:

if the fault has been corrected, switch from the buffer operation of the buffer to the normal operation, including:

when the buffer comprises the drivable buffer belt, further maintain the first speed of the container feed apparatus in the first direction, wherein the first speed has the first value, and simultaneously increase the sixth speed of the buffer belt to a seventh speed at a seventh value in the second direction, the seventh value being equal to the second value, and maintaining the seventh speed in the second direction; or when the buffer comprises the several drivable buffer belts arranged in parallel, further maintain the first speed of the container feed apparatus in the first direction, wherein the first speed has the first value, and simultaneously increase the sixth speed of the buffer belts to a respective seventh speed at a respective seventh value in the second direction, the respective seventh value being equal to the respective second value, and maintain the respective seventh speed in the second direction.

12. The buffer apparatus of claim 10, further comprising:

if the fault downstream of the buffer has not been corrected and the buffer belt or buffer belts is/are completely or substantially completely filled with containers, the control device is further configured to:

decelerate the container feed apparatus from the first speed in the first direction to a ninth speed at a ninth value of 0 m/min, and simultaneously decelerate the buffer belt or buffer belts from the sixth speed in the second direction to a tenth speed at a tenth value of 0 m/min.

13. The buffer apparatus of claim 12, wherein the control device is further configured to:

if the fault has been corrected, switch from the buffer operation of the buffer to the normal operation, including:

when the buffer comprises the drivable buffer belt, increase the ninth speed of the container feed apparatus to an eleventh speed at an eleventh value in the first direction, wherein the eleventh value is equal to the first value, and maintain the eleventh speed in the first direction, and simultaneously increase the tenth speed of the buffer belt to a twelfth speed in the second direction; or when the buffer comprises the several drivable buffer belts arranged in parallel, increase the ninth speed of the container feed apparatus to an eleventh speed at an eleventh value in the first direction, wherein the eleventh value is equal to the first value, and maintain the eleventh speed in the first direction, and simultaneously increase the tenth speed of the buffer belts to a respective twelfth speed in the second direction.

14. The buffer apparatus of claim 1, wherein the control device is further configured to:

acquire error data from a fault upstream or downstream of the buffer, analyze the error data and obtain control data to control the buffer, and control a fill level of the buffer belt(s) during normal operation using the control data.

15. The buffer apparatus of claim 14, wherein, when controlled to a first fill level of 30%, a fault upstream from the buffer is buffered by the buffer belt or buffer belts for at least 20, 30, 40, 50 or 60 seconds and a fault downstream from the buffer is buffered by the buffer belt or buffer belts for at least 20, 30, 40, 50, 60, 70, 80, 90, 100, 110 or 120 seconds, or wherein, with a control to a second fill level that is less than the first fill level, a fault upstream from the buffer is buffered by the buffer belt or buffer belts for less than 60 seconds and a fault downstream from the buffer is buffered by the buffer belt or buffer belts for more than 120 seconds, or wherein, with a control to a third fill level which is greater than the first fill level, a fault upstream from the buffer is buffered by the buffer belt(s) for more than 60 seconds and a fault downstream from the buffer is buffered by the buffer belt(s) for less than 120 seconds.

16. The buffer apparatus of claim 14, wherein the control device is further configured to adjust the fill level of the buffer belt or buffer belts to 30%, wherein:

a buffer time for a fault upstream from the buffer is at least 60 seconds;

a buffer time for a fault downstream from the buffer is at least 120 seconds; or a first buffer time for a first fault upstream from the buffer is at least 60 seconds and a second buffer time for a second fault downstream from the buffer is at least 60 seconds.

17. The buffer apparatus of claim 14, wherein the error data comprise:

information that a fault has occurred upstream or downstream from the buffer;

information on downtimes;

information on time dependencies of errors during production;

information on ambient pressure and/or ambient temperature and/or time of day during errors;

a number of faults upstream and/or downstream of the buffer;

a number of errors upstream and/or downstream of the buffer that have caused the buffer belt or belts to run completely empty or completely full;

accumulated duration of faults; and/or classified error data, wherein the control data can be obtained by means of automatic analysis including an analysis program and/or machine learning.

18. The buffer apparatus of claim 14, wherein a setpoint value for the fill level of the buffer belt or buffer belts is increased or decreased on a basis of the error data and the increased or decreased setpoint value is used for controlling the fill level.

19. The buffer apparatus of claim 14, wherein acquiring the error data, analyzing the error data and obtaining the control data and controlling the fill level of the buffer belt during a normal operation based on the control data is performed at regular intervals wherein the regular intervals include:

every 10 seconds to 20 seconds;

every 5 minutes to 45 minutes;

once per hour;

once per day; or once per week; or wherein controlling the fill level of the buffer belt(s) during a normal operation is performed based on the control data after exceeding a first given maximum number of faults upstream and/or downstream from the buffer and/or after exceeding a second given maximum number of faults upstream and/or downstream of the buffer, which have caused the buffer belt or buffer belts to run completely empty or completely full, or wherein the control of the fill level of the buffer belt or belts during a normal operation takes place on the basis of the control data after exceeding a given maximum number of accumulated fault durations of faults upstream and/or downstream from the buffer.

20. The buffer apparatus of claim 1, wherein the container feed apparatus comprises:

a single-track infeed conveyor drivable in the fourth direction and configured to convey containers in the fourth direction;

a first group of several first conveyors, which are arranged in parallel, drivable in the fourth direction, and are configured to convey containers in the fourth direction, parallel adjoining the single-track infeed conveyor; and a second group of several second conveyors arranged in parallel following the first group of the several first conveyors arranged in parallel, which conveyors are drivable in the first direction (202) and are configured to convey containers in the first direction, wherein the containers can be discharged from the second group by the several second conveyors arranged in parallel transversely to the first direction in the second direction to the buffer.

21. The buffer apparatus of claim 1, wherein the container discharge apparatus comprises:

downstream of the buffer, a first group of several first conveyors arranged in parallel, which can be driven in the third direction transverse to the second direction and are configured to separate containers and to convey them in the third direction, following in parallel to the first group of the several first conveyors arranged in parallel, a second group of several second conveyors arranged in parallel, which can be driven in the first direction and are configured to convey the separated containers in the first direction, one or more third conveyors, whose number is smaller than the number of second conveyors, wherein the third conveyor or third conveyors is/are configured to transport the separated containers.

22. The buffer apparatus of claim 1, wherein, when the buffer comprises the several drivable buffer belts arranged in parallel, a separate drive is provided for each of the buffer belts or a common drive is provided for the buffer belts.

23. A buffer apparatus comprising:

a container feed apparatus;

a buffer downstream of the container feed apparatus; and a container discharge apparatus downstream of the buffer, wherein the container feed apparatus is for feeding containers to the buffer and is configured to transport containers in a first direction by first conveyor belts, wherein the buffer comprises a drivable buffer belt or several drivable buffer belts arranged in parallel, which is/are each configured to transport containers in a second direction, the second direction running transversely to the first direction, wherein the container discharge apparatus is for discharging and separating containers from the buffer in the first direction or in a third direction opposite to the first direction by second conveyor belts, wherein the container feed apparatus comprises:

a single-track infeed conveyor drivable in the fourth direction and configured to convey containers in the fourth direction;

a first group of several first conveyors, which are arranged in parallel, drivable in the fourth direction, and are configured to convey containers in the fourth direction, parallel adjoining the single-track infeed conveyor; and a second group of several second conveyors arranged in parallel following the first group of the several first conveyors arranged in parallel, which conveyors are drivable in the first direction and are configured to convey containers in the first direction, wherein the containers can be discharged from the second group by the several second conveyors arranged in parallel transversely to the first direction in the second direction to the buffer.

* * * * *